US012621494B2

(12) United States Patent (10) Patent No.: US 12,621,494 B2
Chen et al. (45) Date of Patent: May 5, 2026

(54) SEI MESSAGE FOR GENERATIVE FACE VIDEO

(71) Applicant: Alibaba Innovation Private Limited, Singapore (SG)

(72) Inventors: Bolin Chen, Kowloon Tong (HK); Jie Chen, Beijing (CN); Yan Ye, San Diego, CA (US); Shiqi Wang, Kowloon Tong (HK)

(73) Assignee: Alibaba Innovation Private Limited, Singapore (SG)

( * ) Notice: Subject to any disclaimer, the term of this patent is extended or adjusted under 35 U.S.C. 154(b) by 56 days.

(21) Appl. No.: 18/622,621

(22) Filed: Mar. 29, 2024

(65) Prior Publication Data

US 2024/0340456 A1 Oct. 10, 2024

Related U.S. Application Data

(60) Provisional application No. 63/618,387, filed on Jan. 8, 2024, provisional application No. 63/587,763, filed
(Continued)

(51) Int. Cl.
*H04N 19/70* (2014.01)
*H04N 19/136* (2014.01)
(Continued)

(52) U.S. Cl.
CPC ........... *H04N 19/70* (2014.11); *H04N 19/136* (2014.11); *H04N 19/157* (2014.11);
(Continued)

(58) Field of Classification Search
CPC .... H04N 19/136; H04N 19/463; H04N 19/70; H04N 19/157; H04N 19/80; H04N 19/42; H04N 19/172
See application file for complete search history.

(56) References Cited

U.S. PATENT DOCUMENTS 12,315,205 B2 * 5/2025 Deshpande ............. G06T 9/002
2022/0191561 A1 * 6/2022 Hinds .............. H04N 21/85406
(Continued)

OTHER PUBLICATIONS

Blanz et al., "A morphable model for the synthesis of 3d faces," in Proceedings of the 26th annual conference on Computer graphics and interactive techniques, 1999, pp. 187-194.
(Continued)

*Primary Examiner* — Tsion B Owens
(74) *Attorney, Agent, or Firm* — Finnegan, Henderson, Farabow, Garrett & Dunner, LLP

(57) ABSTRACT

Methods and apparatuses are provided for processing video data by using generative face video supplemental enhancement information (SEI) messages. An exemplary method for generating a face picture includes: receiving a bitstream; decoding coded information of the bitstream to obtain a base picture and a supplemental enhancement information (SEI) message; determining whether the SEI message applies to a neural network for generating a face picture; in response to the SEI message applies to the neural network for generating the face picture, determining a mode and a corresponding face information parameter used to code the face picture based on the SEI message; and generating the face picture based on the base picture and the face information parameter by the neural network.

20 Claims, 13 Drawing Sheets

700

Related U.S. Application Data on Oct. 4, 2023, provisional application No. 63/511,200, filed on Jun. 30, 2023, provisional application No. 63/494,493, filed on Apr. 6, 2023.

(51) Int. Cl.

| | |
|---|---|
| *H04N 19/157* | (2014.01) |
| *H04N 19/172* | (2014.01) |
| *H04N 19/42* | (2014.01) |
| *H04N 19/463* | (2014.01) |
| *H04N 19/80* | (2014.01) |

(52) U.S. Cl.
CPC ........... *H04N 19/172* (2014.11); *H04N 19/42* (2014.11); *H04N 19/463* (2014.11); *H04N 19/80* (2014.11)

(56) References Cited

U.S. PATENT DOCUMENTS

| | | | | |
|---|---|---|---|---|
| 2022/0337853 | A1* | 10/2022 | Li | H04N 19/31 |
| 2022/0337857 | A1* | 10/2022 | Choi | H04N 19/176 |
| 2023/0007067 | A1* | 1/2023 | Hinds | H04L 65/1096 |
| 2024/0114170 | A1* | 4/2024 | Maharana | G06T 7/246 |
| 2025/0088636 | A1 | 3/2025 | Chen et al. | |
| 2025/0088675 | A1 | 3/2025 | Yin et al. | |

OTHER PUBLICATIONS

Bross et al., "Overview of the Versatile Video Coding (VVC) Standard and Its Applications," IEEE Transactions on Circuits and Systems for Video Technology, vol. 31, No. 10, pp. 3736-3764, 2021.

Chen et al., "Beyond key-point coding: Temporal evolution inference with compact feature representation for talking face video compression," in Proceedings of the IEEE Data Compression Conference, 10 pages, 2022.

Chen et al., "AHG9: Generative Face Video SEI Message," JVET-AC0088, 29th Meeting, by teleconference, Jan. 11-20, 2023, 2023, 6 pages.

Chen et al., "Interactive Face Video Coding: A Generative Compression Framework," IEEE Transactions on Pattern Analysis and Machine Intelligence, 14 pages, 2023.

Feng et al., "A generative compression framework for low bandwidth video conference," in ICME Workshop, 6 pages, 2021.

Goodfellow et al., "Generative adversarial nets," Advances in neural information processing systems, vol. 27, 9 pages, 2014.

Siarohin et al., "First Order Motion Model for Image Animation," Advances in Neural Information Processing Systems, vol. 32, pp. 7137-7147, 2019.

Siarohin et al., "Motion Representations for Articulated Animation," Motion representations for articulated animation, Proceedings of the IEEE/CVF Conference on Computer Vision and Pattern Recognition, 13653-13662, 2021.

Sullivan et al., "Overview of the High Efficiency Video Coding (HEVC) Standard," IEE Transactions on Circuits and Systems for Video Technology, vol. 22, No. 12, pp. 1649-1668 (2012).

Wang et al., "One-shot free-view neural talking-head synthesis for video conferencing," in Proceedings of the IEEE/CVFConference on Computer Vision and Pattern Recognition, 2021, pp. 10039-10049.

* cited by examiner

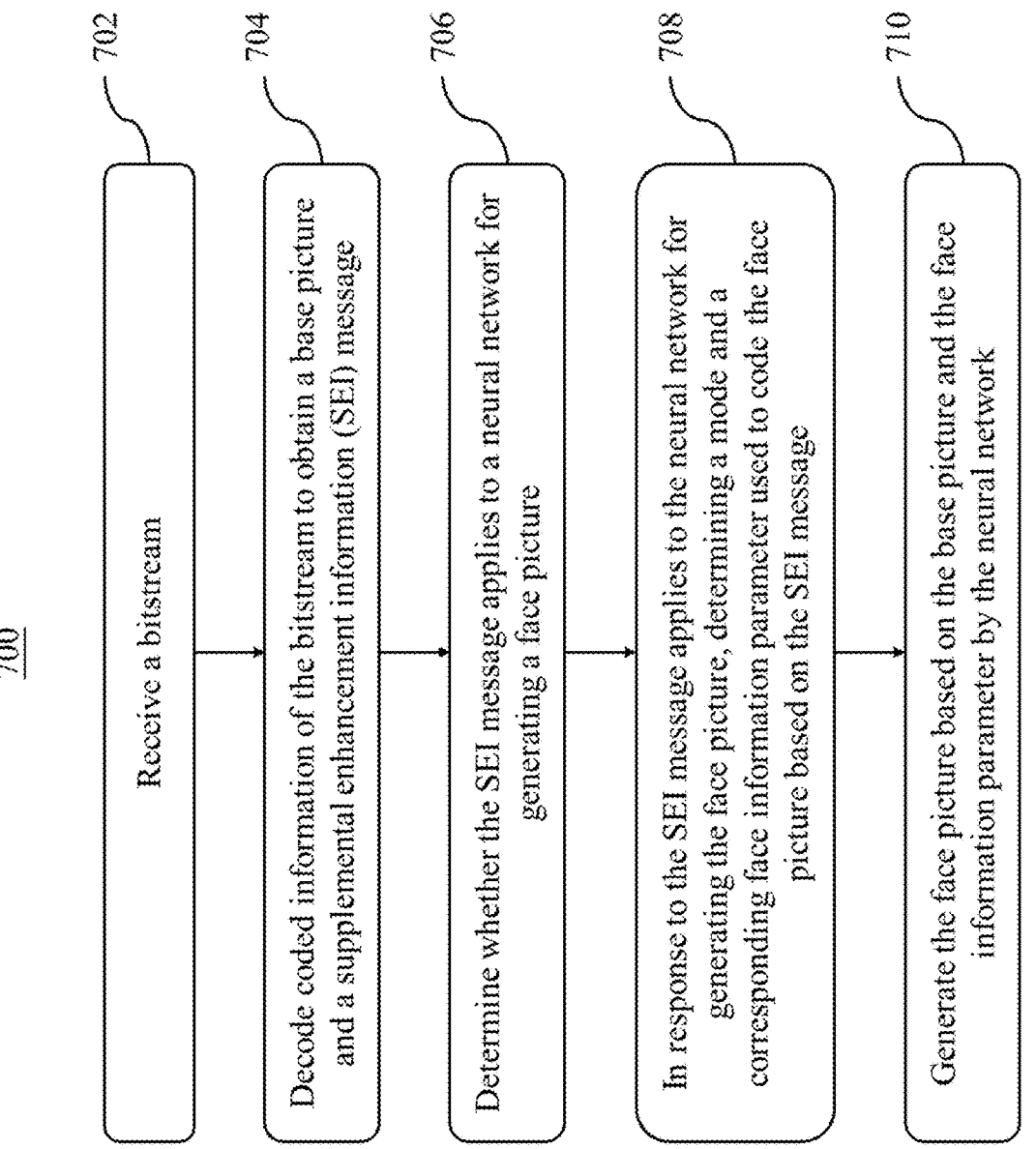

700

702 — Receive a bitstream

704 — Decode coded information of the bitstream to obtain a base picture and a supplemental enhancement information (SEI) message 706 — Determine whether the SEI message applies to a neural network for generating a face picture 708 — In response to the SEI message applies to the neural network for generating the face picture, determining a mode and a corresponding face information parameter used to code the face picture based on the SEI message 710 — Generate the face picture based on the base picture and the face information parameter by the neural network

FIG. 7A

Face Picture (Reconstructed)

Generative Neural Network

Base Picture

Facial Landmarks

Receive a video sequence

1304

Encode one or more pictures of the video sequence to generate a bitstream, including: encoding a base picture from the one or more pictures and a supplemental enhancement information (SEI) message, the SEI message indicating a mode and a corresponding face information parameter used to code a face picture

SEI MESSAGE FOR GENERATIVE FACE VIDEO

CROSS-REFERENCE TO RELATED APPLICATIONS

The disclosure claims the benefits of priority to U.S. Provisional Application No. 63/494,493, filed on Apr. 6, 2023, U.S. Provisional Application No. 63/511,200, filed on Jun. 30, 2023, U.S. Provisional Application No. 63/587,763, filed on Oct. 4, 2023, and U.S. Provisional Application No. 63/618,387, filed on Jan. 8, 2024, all of which are incorporated herein by reference in their entireties.

TECHNICAL FIELD

The present disclosure generally relates to video processing, and more particularly, to methods and apparatuses for using supplemental enhancement information (SEI) messages to perform face video generative compression.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for processing video data by using generative face video supplemental enhancement information (SEI) messages.

According to some exemplary embodiments, there is provided a method for generating a face picture, the method including: receiving a bitstream; decoding coded information of the bitstream to obtain a base picture and a supplemental enhancement information (SEI) message; determining whether the SEI message applies to a neural network for generating a face picture; in response to the SEI message applies to the neural network for generating the face picture, determining a mode and a corresponding face information parameter used to code the face picture based on the SEI message; and generating the face picture based on the base picture and the face information parameter by the neural network.

According to some exemplary embodiments, there is provided a method for encoding a video sequence into a bitstream, the method including: receiving a video sequence; and encoding one or more pictures of the video sequence to generate a bitstream, including: encoding a base picture of the one or more pictures and a supplemental enhancement information (SEI) message, the SEI message indicating a mode and a corresponding face information parameter used to code a face picture, and wherein the bitstream is used for generating the face picture by a neural network based on the base picture and the face information parameter.

According to some exemplary embodiments, there is provided a non-transitory computer readable storage medium storing a bitstream of a video. The bitstream includes: a base picture and a supplemental enhancement information (SEI) message, the SEI message indicating a mode and a corresponding face information parameter used to code a face picture, and wherein the bitstream is used for generating the face picture by a neural network based on the base picture and the face information parameter.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7A is a flowchart of an exemplary method for generating a face picture, according to some embodiments of the present disclosure.

FIG. 11 is a schematic diagram illustrating another exemplary SEI message, according to some embodiments of the present disclosure.

FIG. 12 is a schematic diagram illustrating another exemplary SEI message, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth. The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

The neural network post-processing filter has been adopted in image processing. Some existing techniques utilize supplemental enhancement information (SEI) messages for specifying post-processing filter characteristics for the neural network post-processing filter. However, temporal upsampling towards machine vision is not considered when generating the SEI messages. Therefore, there is a need for realizing the temporal upsampling for machine vision based on SEI messages.

Figure 1:
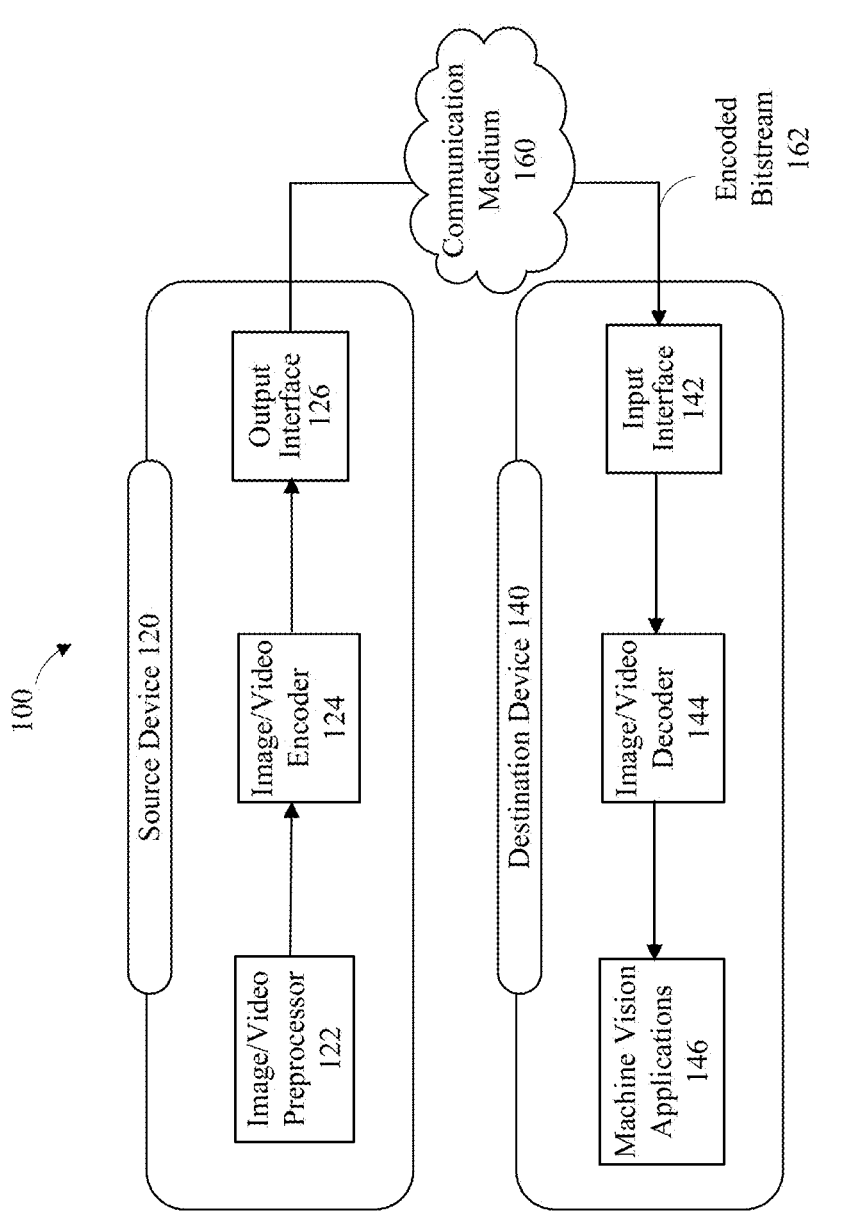
FIG. 1 is a schematic diagram illustrating an exemplary system for coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/ video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/ video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/ video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques (such as those implemented by encoder 124 and decoder 144 of FIG. 1) are described in connection with FIGS. 2A-2B and FIGS. 3A-3B.

Figure 2A:
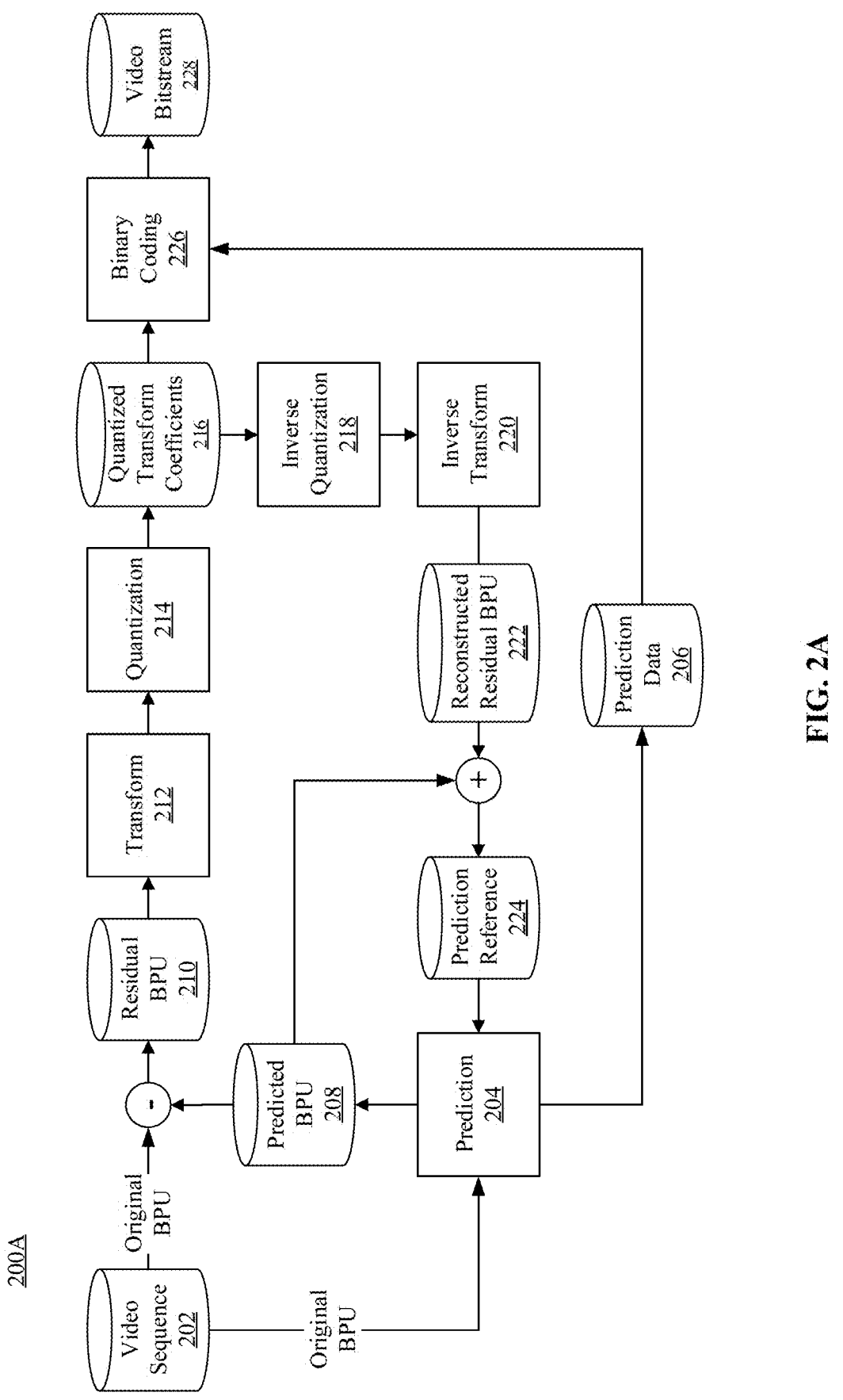
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
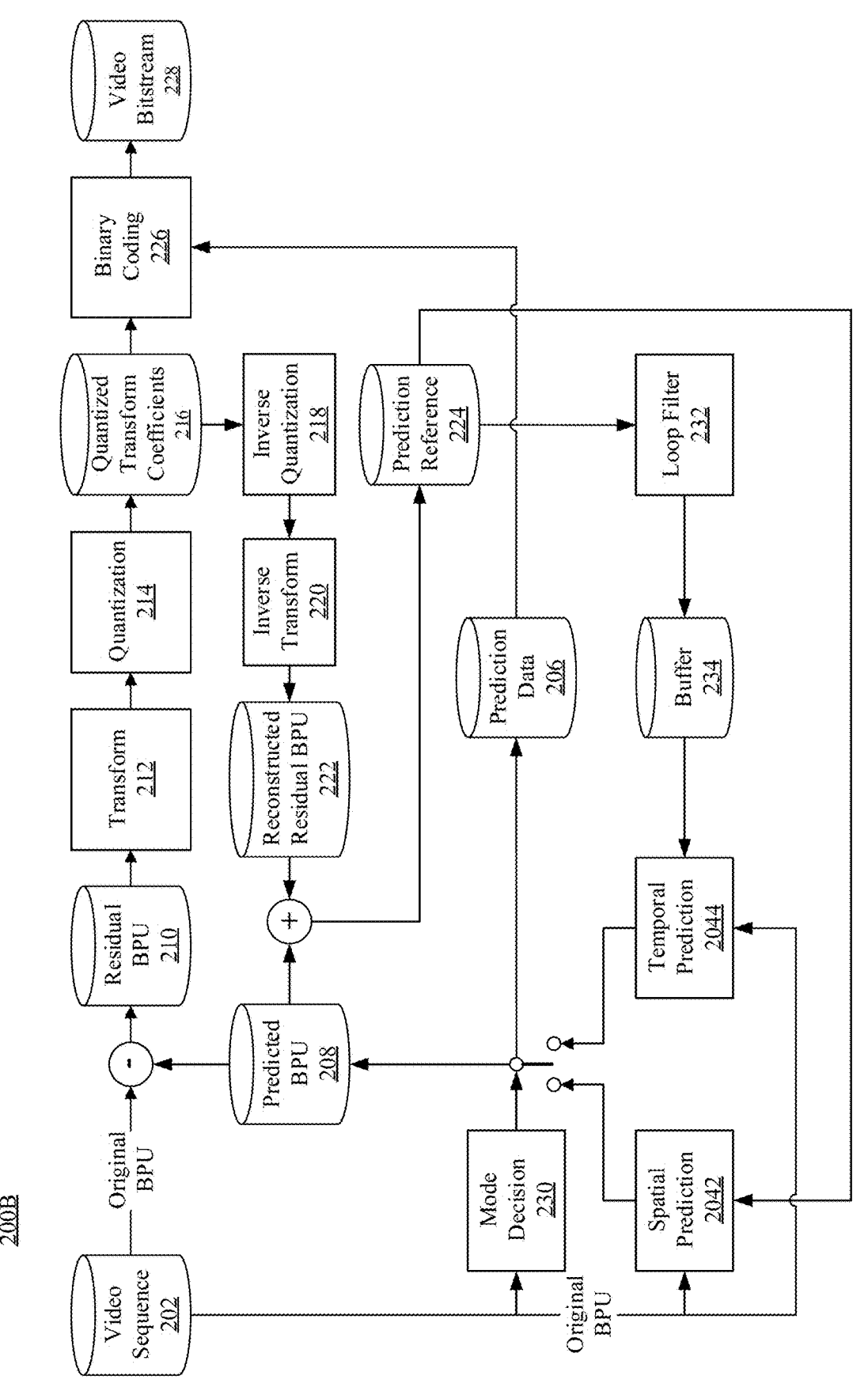
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

In some embodiments, the input video sequence 202 is processed block by block according to encoding process 200B. In VVC, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or ternary tree. At the leaf nodes of the partitioning structure, coding information such as coding mode (intra mode or inter mode), motion information (reference index, motion vector difference, etc.) if inter coded, and quantized transform coefficients 216 are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision stage 230 choose the best prediction mode for the current block, for example based on the rate-distortion optimization method. Based on the best prediction mode, predicted BPU 208 is generated and subtracted from the input video block.

Still referring to FIG. 2B, the prediction residual BPU 210 is sent to the transform stage 212 and quantization stage 214 to generate quantized transform coefficients 216. Quantized transform coefficients 216 will then be inverse quantized at inverse quantization stage 218 and inverse transformed at inverse transform stage 220 to obtain the reconstructed residual BPU 222. Predicted BPU 208 and reconstructed residual BPU 222 are added together to form prediction reference 224 before loop filtering, which is used to provide reference samples for intra prediction. Loop filtering such as deblocking, sample adaptive offset (SAO), and adaptive loop filter (ALF) may be applied at loop filter stage 232 to prediction reference 224 to form the reconstructed block, which is stored in buffer 234, and used to provide reference samples for inter prediction. Coding information, which is generated at mode decision stage 230, such as coding mode (intra or inter prediction), intra prediction mode, motion information, quantized residual coefficients, and the like, are sent to binary coding stage 226 to further reduce the bit rate before being packed into the output video bitstream 228.

Figure 3A:
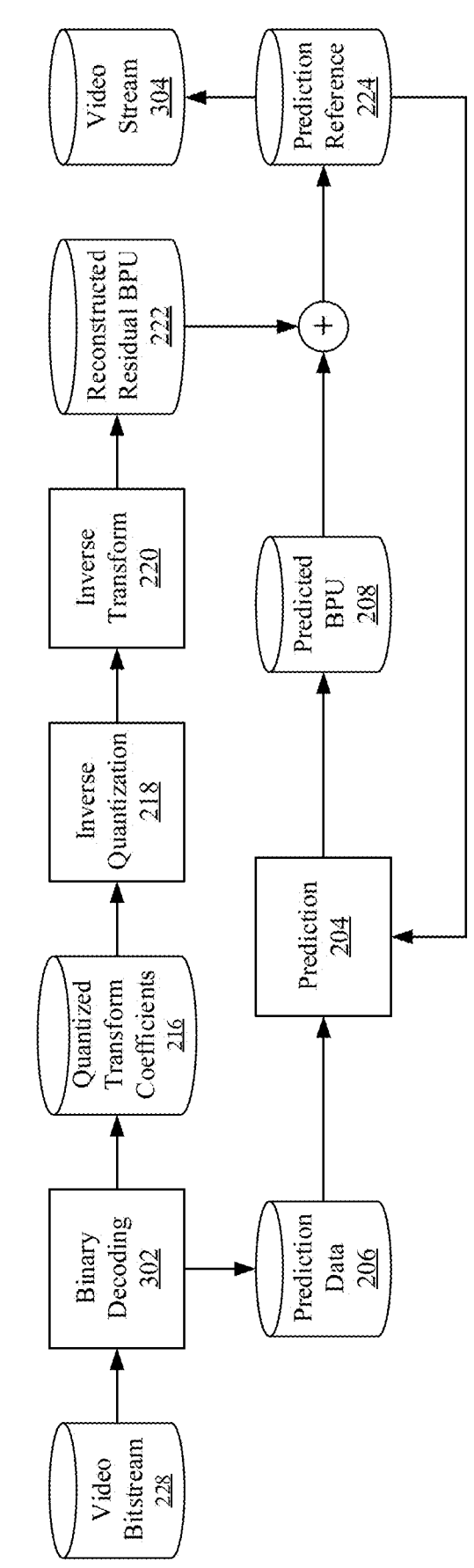
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
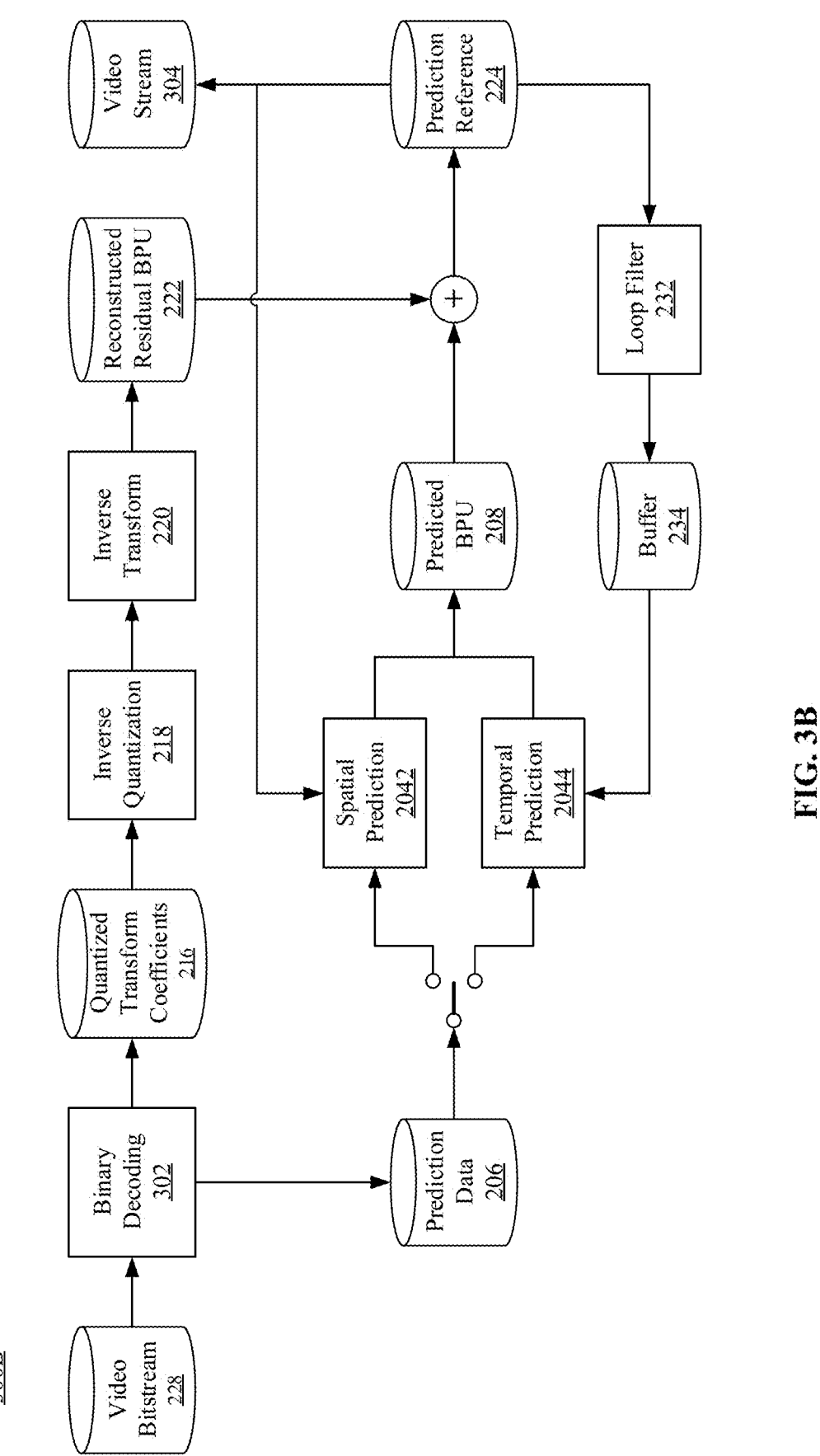
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
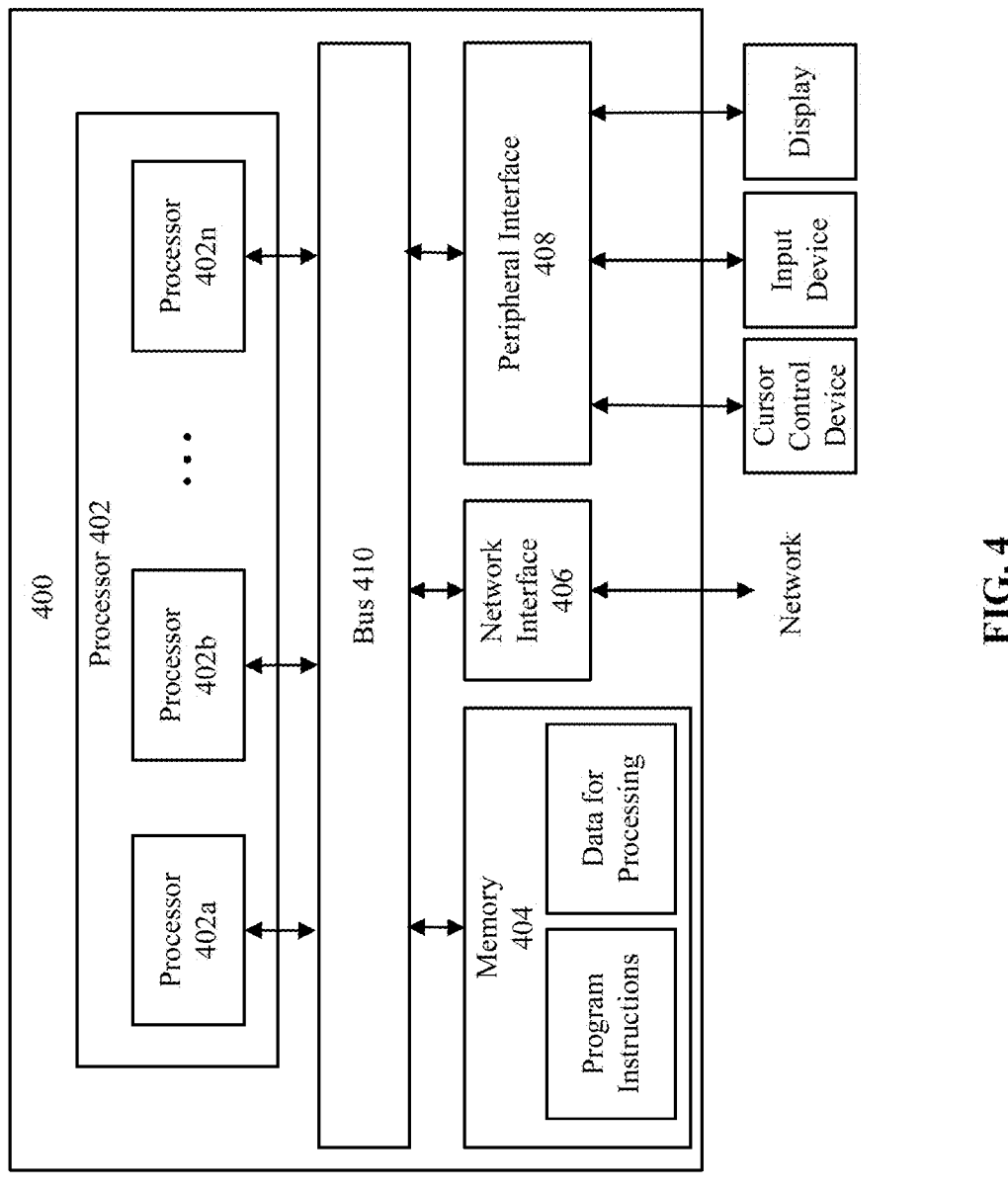
FIG. 4 is a block diagram of an exemplary apparatus for coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

SEI messages are intended to be conveyed within coded video bitstream in a manner specified in a video coding specification or to be conveyed by other means determined by the specifications for systems that make use of such coded video bitstream. SEI messages can contain various types of data that indicate the timing of the video pictures or describe various properties of the coded video or how it can be used or enhanced. SEI messages are also defined as containing arbitrary user-defined data. SEI messages do not affect the core decoding process but can indicate how the video is recommended to be post-processed or displayed.

With the emergence of deep generative models including Variational Auto-Encoding (VAE) and Generative Adversarial Networks (GAN), the facial video compression has achieved promising performance improvement. For example, X2Face can be used to control face generation via images, audio, and pose codes. Besides, realistic neural talking head models can be used via few-shot adversarial learning. For Video-to-video synthesis tasks, Face-vidtovid (a.k.a., "Face_vid2vid") can be used. Moreover, schemes that leverage compact 3D keypoint representation to drive a generative model for rendering the target frame can also be used. Moreover, mobile-compatible video chat systems based on FOMM can be used. VSBNet that utilizes the adversarial learning to reconstruct origin frames from the landmarks can also be used. In addition, an end-to-end talking-head video compression framework based upon compact feature learning (CFTE), designed for high efficiency talking face video compression towards ultra low bandwidth scenarios can be used. The CFTE scheme leverages the compact feature representation to compensate for the temporal evolution and reconstruct the target face video frame in an end-to-end manner. Moreover, the CFTE scheme can be incorporated into the video coding framework with the supervision of rate-distortion objective. In addition, facial semantics can be utilized via the 3DMM template to character the face video and endow the face video coding with the face manipulation ability.

Figure 5:
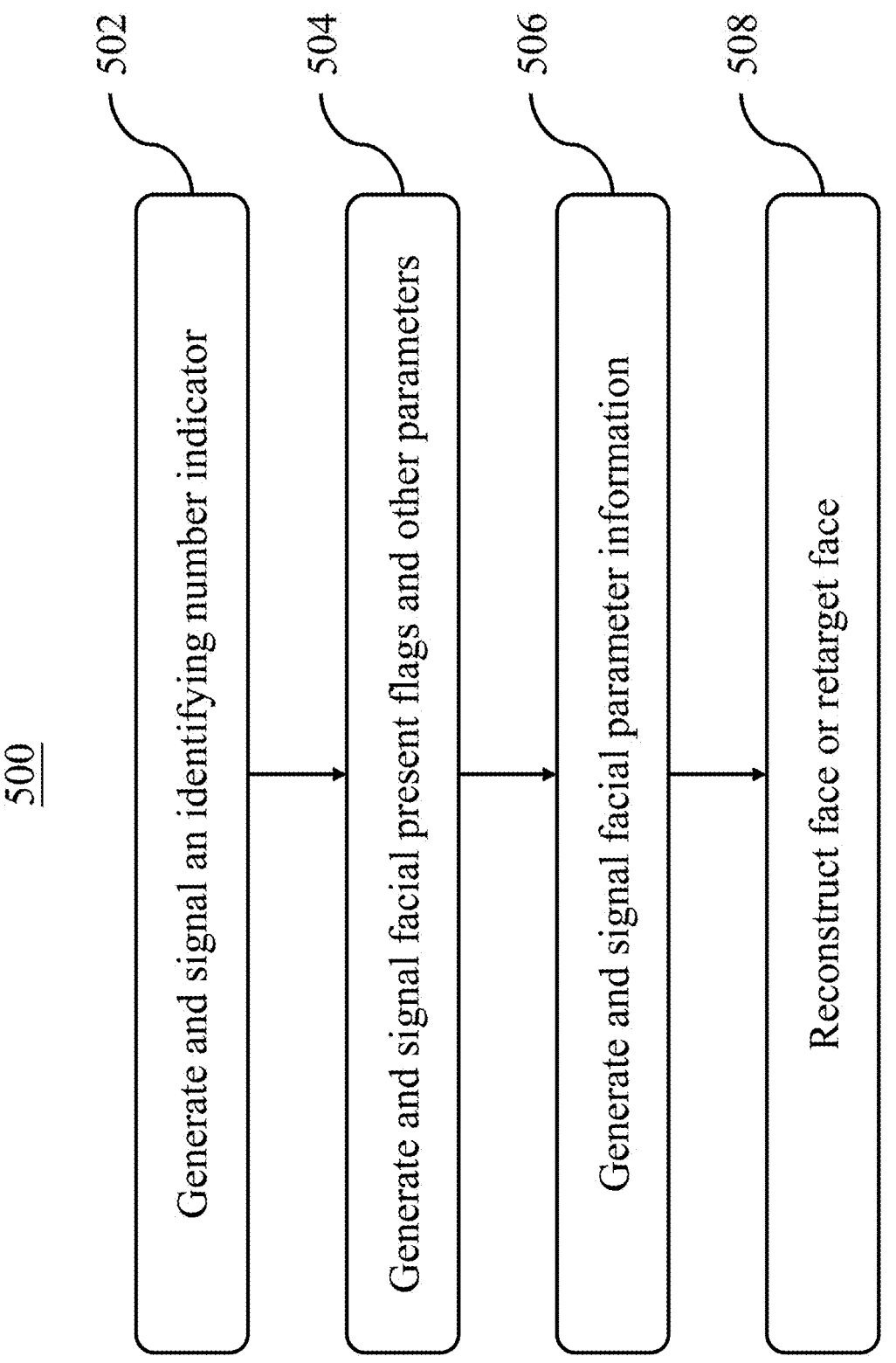
FIG. 5 is a flowchart of an exemplary method for processing video based on generative face video SEI messages, according to some embodiments of the present disclosure.

FIG. 5 is a flowchart of an exemplary method 500 for processing video based on generative face video SEI messages, according to some embodiments of the present disclosure. Method 500 describes the general syntax structure and an order for generating some syntax elements of the generative face video SEI message. As shown in FIG. 5, method 500 may include steps 502 to 508.

In step 502, an encoder (e.g., image/video encoder 124 in FIG. 1 or apparatus 400 in FIG. 4) may generate and signal an identifying number indicator in the SEI message to a decoder (e.g., image/video decoder 144 in FIG. 1 or apparatus 400 in FIG. 4). The signaled identifying number indicator could be used for identifying the SEI message and could also be used to indicate whether the current generative face video SEI message matches with the generative network in the decoder.

In step 504, the encoder may generate multiple (e.g., three) facial information type present flags and other parameters and signal them to indicate the presence and the length of certain syntax elements associated with the face video generative compression scheme, when the identifying number indicator indicates that the face video generative compression scheme is used.

In step 506, the encoder may generate the corresponding facial parameter information to the facial present flags generated in step 504 and signal it to the decoder.

In step 508, the decoder may use the signaled corresponding facial parameter information to reconstruct or retarget the related face image based on a base picture.

Figure 6:
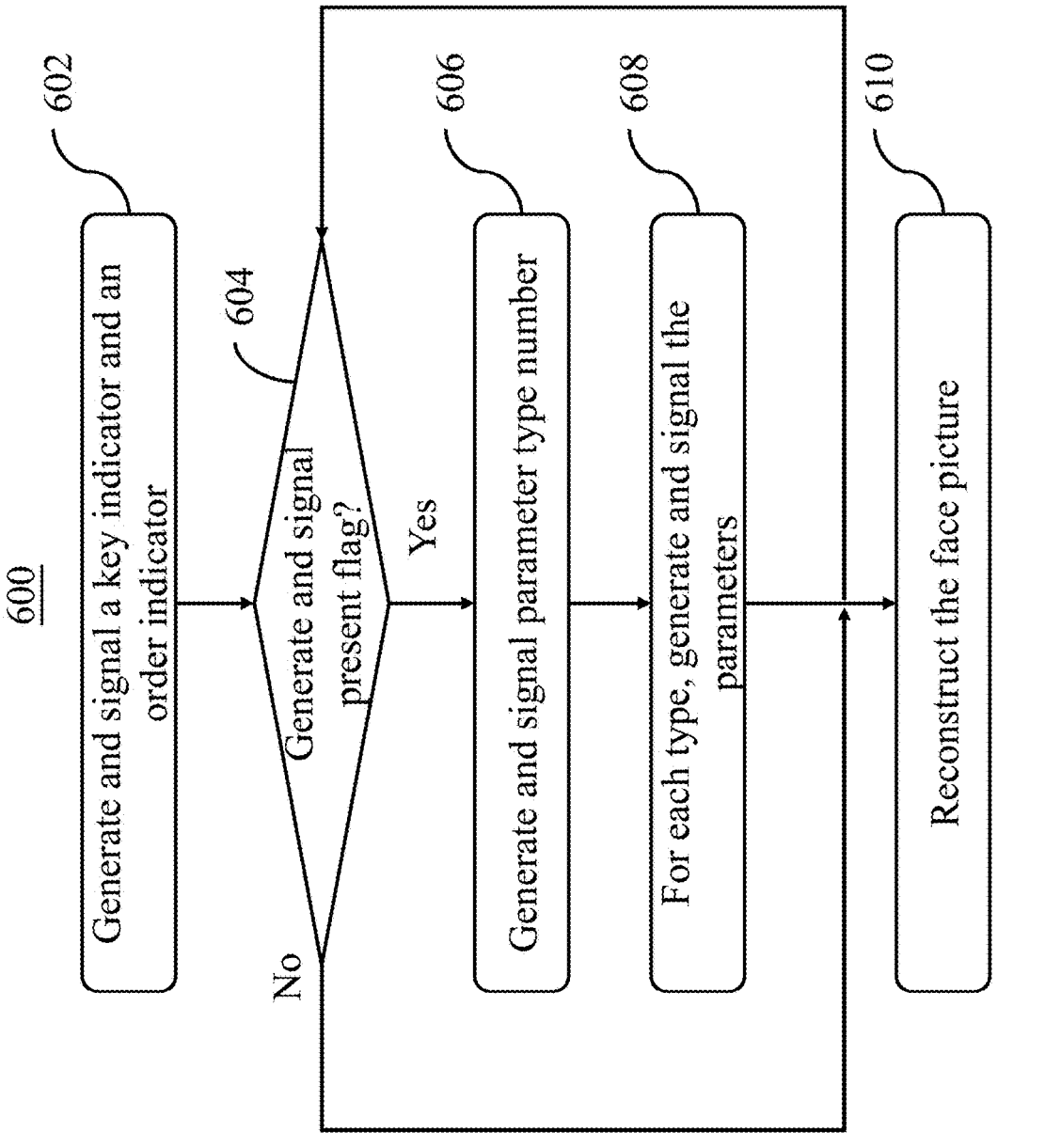
FIG. 6 is another flowchart of an exemplary method for processing video based on generative face video SEI messages, according to some embodiments of the present disclosure.

FIG. 6 is another flowchart of an exemplary method 600 for processing video based on generative face video SEI messages, according to some embodiments of the present disclosure. Method 600 describes the general syntax structure and an order for generating some syntax elements of the generative face video SEI message. As shown in FIG. 6, method 600 may include steps 602 to 610.

In step 602, an encoder (e.g., image/video encoder 124 in FIG. 1 or apparatus 400 in FIG. 4) may generate an identifying number indicator or other indicator for identifying the SEI message. For example, a key indicator can be generated and signaled to identify the analysis network used to generate the syntax elements of the current generative face video SEI message. The value of key indicator (e.g., gfv_key as described below) may be used to determine whether the analysis network at the encoder matches with the generative network at a decoder (e.g., image/video decoder 144 in FIG. 1 or apparatus 400 in FIG. 4). In addition, a picture order count that specifies the display order count modulo 1<<31 of the picture generated with the current SEI message. In some embodiments, as the analysis network at the encoder is also expected to be the generative network at the decoder for decoding the bitstream sent by the encoder, the analysis network at the encoder is also referred to as a target (neural) network.

In step 604, the encoder may determine whether or not to generate and signal a parameter present flag for the current parameter group (mode). In addition, the following parameters can be generated and signaled to the decoder in subsequent steps only if the flag is true. If the flag is false, the parameters of the current group (mode) will not be generated and signaled. As shown in FIG. 6, step 604 can be implemented in polling form for each mode until finding a true flag.

In step 606, if the parameter present flag is determined to be signaled, the encoder may generate and signal the number of parameter types first when signaling the current group of the parameters.

In step 608, for each parameter type, the encoder can generate and signal the detailed parameters accordingly.

In step 610, after receiving the SEI message, the decoder may decode the parameters to reconstruct the face picture. As such, the face pictures can be generated with the decoded parameters based on the base picture.

In some embodiments, the base picture is a picture that can be coded with a conventional coding method. For example, it could be with H.264, H.265 and H.266. The base picture provides the texture information of the human face and based on this picture, the generative network can generate the additional face pictures with the help of parameters indicating the differences among the pictures to be generated and the base picture. The base picture is usually the first picture of a video sequence, and the following picture can be generated by the neural network. The parameters needed to generate the following pictures are signaled in the SEI message. One SEI message contains the parameters needed for generating one picture or multiple pictures.

FIG. 7A is a flowchart of an exemplary method 700 for generating a face picture, according to some embodiments of the present disclosure. As shown in FIG. 7A, method 700 may include steps 702 to 710, which can be implemented by a decoder (e.g., image/video decoder 144 in FIG. 1 or apparatus 400 in FIG. 4).

In step 702, the decoder may receive a bitstream from an encoder (e.g., image/video encoder 124 in FIG. 1 or apparatus 400 in FIG. 4) or content distribution operator. As appreciated, the bitstream may include coded information of a series of pictures. In some embodiments, the SEI message can be signalled before a GOP (Group of Pictures), which can be decoded along with the pixel content of the picture.

In step 704, the decoder may decode the coded information of the bitstream to obtain a base picture and an SEI message. As describe above, the base picture can be a reference picture and can provide the texture information of the human face. The generative network can generate a current face picture by referencing the base picture and based on parameters indicating the difference between the current face picture and the base picture. The parameters mentioned here can be conveyed in the SEI message.

Figure 7B:
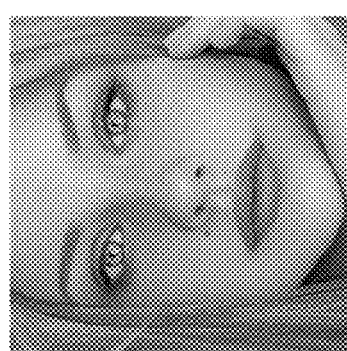
FIG. 7B is a schematic diagram illustrating a neural network for generating a face picture, according to some embodiments of the present disclosure.
Figure 7B:
Figure 7B:
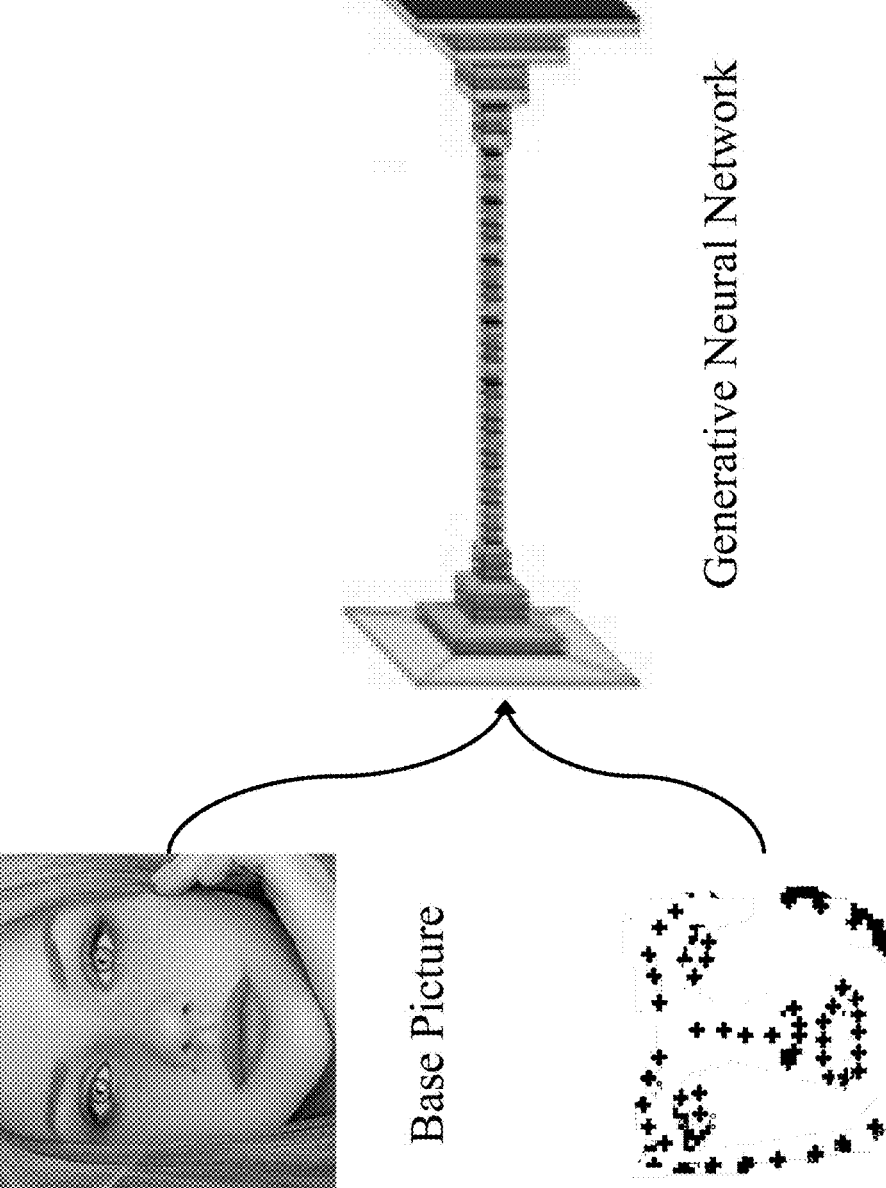

In step 706, the decoder may determine whether the SEI message applies to a neural network for generating a face picture. In some embodiments, the SEI message may apply to the neural network of the decoder for generating the face In step 710, the decoder may generate the face picture based on the base picture and the face information parameter by the neural network. FIG. 7B is a schematic diagram illustrating a neural network for generating a face picture, according to some embodiments of the present disclosure. As shown in FIG. 7B, a base picture and a face information parameter (e.g., facial landmarks) can be input into the generative neural network of the decoder. The generative neural network will produce a reconstructed face picture as an output. As appreciated, a face picture is coded as the face information parameter with respect to the base picture. Compared with transmitting the entire face picture, the proposed approach of solely exchanging coded face information parameter proves advantageous for the bandwidth.

The following Table 1 summarizes facial representations for generative face video compression algorithms. In the present disclosure, the algorithms may also be referred to as modes, methods or approaches. In particular, the face images exhibit strong statistical regularities, which can be economically characterized with 2D landmarks, 2D keypoints, region matrix, 3D keypoints, compact feature matrices, or facial semantics. Such facial description strategies can lead to reduced coding bitrate and improve the coding efficiency, thus applicable to video conferencing and live entertainment.

TABLE 1

| Examples of facial representations for generative face video compression algorithms (modes) | |
|---|---|
| Facial Representation | Interpretation |
| 2D landmarks | VSBNet is a representative model which can utilize 98 groups of 2D facial landmarks $\mathbb{R}^{2\times98}$ to depict the key structure information of human face, where the total number of encoding parameters for each inter frame is 196. |
| 2D keypoints + affine transformation matrix | FOMM is a representative model which adopts 10 groups of learned 2D keypoints $\mathbb{R}^{2\times10}$ along with their local affine transformations $\mathbb{R}^{2\times2\times10}$ to characterize complex motions. The total number of encoding parameters for each inter frame is 60. |
| region matrix | MRAA is a representative model which extracts consistent regions of talking face to describe locations, shape, and pose, mainly represented with shift matrix $\mathbb{R}^{2\times10}$, covar matrix $\mathbb{R}^{2\times2\times10}$ and affine matrix $\mathbb{R}^{2\times2\times10}$. As such, the total number of encoding parameters for each inter frame is 100. |
| 3D keypoints | Face_vid2vid is a representative model which can estimate 12-dimension head parameters (i.e., rotation matrix $\mathbb{R}^{3\times3}$ and translation parameters $\mathbb{R}^{3\times1}$) and 15 groups of learned 3D keypoint perturbations $\mathbb{R}^{3\times15}$ due to facial expressions, where the total number of encoding parameters for each inter frame is 57. |
| compact feature matrix | CFTE is a representative model which can model the temporal evolution of faces into learned compact feature representation with the matrix $\mathbb{R}^{4\times4}$, where the total number of encoding parameters for each inter frame is 16. |
| facial semantics | IFVC is a representative model which adopts a collection of transmitted facial semantics to represent the face frame, including mouth parameters $\mathbb{R}^{6}$, eye parameter $\mathbb{R}^{1}$, rotation parameters $\mathbb{R}^{3}$, translation parameters $\mathbb{R}^{3}$ and location parameter $\mathbb{R}^{1}$. Totally, the number of encoding parameters for each inter frame is 14. | picture when fulfilling two criteria: (1) the SEI message contains information regarding the face picture intended to be reconstructed; and (2) the information within the SEI message can be utilized by the decoder.

In step 708, the decoder may determine a mode and a corresponding face information parameter used to code the face picture based on the SEI message, when it is determined that the SEI message applies to the neural network for generating the face picture in step 706.

In the 29th meeting of Joint Video Experts Team (JVET), a generative face video SEI message was proposed. The generative face video SEI message can employ a series of facial semantic information to represent the status of head posture and face expression. The initially proposed SEI message only considered one facial representation in face generative compression. However, face video can be described by the variations of feature structures with strong priors, such as landmarks, 2D keypoints, region matrix, 3D keypoints, compact feature matrix, facial semantics, or other formats. These facial representations can provide a greater freedom to implement the syntax design and semantic description of SEI message for face video compression. It is desirable for the SEI messages in the VVC standard to consider different facial representations at the task of face video compression.

Nowadays, face video communication has called for more common usage scenarios, such as face video retargeting or animation, in addition to face video reconstruction. For example, with the popularity of metaverse-activities, real-world facial movement may need to be transferred to the virtual metaverse world and represented by another person. Moreover, the reconstruction of face video is expected to be more in line with the real situation and make corresponding retargeting. Establishing SEI messages can be important for compressing facial videos that can incorporate diverse forms of data for specifying the timing of video frames, characterizing the encoded video's properties, elucidating its potential uses or enhancements. Doing so would ensure that the reconstructed facial video can be efficiently post-processed and displayed in a user-friendly manner to cater to the users' actual requirements.

To solve at least one of the above problems, a new SEI message called generative face video SEI message is proposed in this disclosure. The proposed SEI can work with different facial representations, such as 2D keypoints, 2D landmarks, 3D keypoints, or facial semantics, which can be utilized to reconstruct high-quality talking face video at ultra-low bitrate or to manipulate the talking face video towards personalized characterization. As such, the proposed generative face video SEI message can be applicable to video conferencing, live entertainment, face animation and metaverse-related functionalities.

Table 2 below shows an exemplary syntax of the SEI message. The process of implementing the SEI message can be performed as follows. As shown in Table 2, an identifying number indicator gfv_id can be generated by an encoder and signaled to a decoder. In some embodiments, gfv_id can be used to indicate whether the SEI is used to code the face picture. In some embodiments, a traditional SEI message may be signaled and is not used to code the face picture, while a generative face video SEI message as shown in Table 2 may be signaled as well. Hence, gfv_id can be used to distinguish between a traditional SEI message and a generative face video SEI message. Referencing back to FIG. 7A, the decoder may determine whether the SEI message is used to code the face picture based on the identifying number indicator in step 706. In some embodiments, the identifying number indicator may be used to indicate a generative face video filter.

With further reference to Table 2, the SEI message may include a mode indicator gfv_feature_mode. The mode used to code the face picture can be determined based on gfv_feature_mode in step 708 by the decoder. Under different gfv_feature_mode's (gfv_feature_mode=0, gfv_feature_mode=1, gfv_feature_mode=0, etc.), a parameter indicator can be included in the SEI message to convey the face information parameters. For example, if gfv_feature_mode=0, which means 2D facial landmarks has been chosen as the feature mode in the SEI message, then parameter indicators (1) 2d_landmark_quantization_factor, (2) 2d_landmark_num, and (3) x[i], y[i] can be included in the SEI message and can be decoded as the face information parameters.

It can be summarized here, in some embodiments, the SEI message in Table 2 can be utilized by the following operations. First, the generative face video SEI message contains an identifying number gfv_id that can be used to identify the generative face video SEI message. Second, a mode indicator gfv_feature_mode is signaled in the SEI message to determine which mode is used. Then, according to the mode used, the corresponding parameters are signaled. Third, after receiving and decoding the SEI message, the face video can be reconstructed towards high-quality or user-friendly manner via the generation ability of generative adversial network with the parameters signaled in the SEI message and the base picture decoded previously as inputs.

TABLE 2

| Exemplary syntax of a generative face video SEI message | |
|---|---|
| Generative_face_video ( payloadSize ) { | Descriptor |
|   gfv_id | ue(v) |
|   gfv_feature_mode | ue(v) |
|   if(gfv_feature_mode == 0){ | |
|     2d_landmark_quantization_factor | ue(v) |
|     2d_landmark_num | ue(v) |
|     for(i=0; i< 2d_landmark_num;i++){ | |
|       x[i] | ue(v) |
|       y[i] | ue(v) |
|     } | |
|   } | |
|   else if(gfv_feature_mode == 1){ | |
|     2d_keypoint_quantization_factor | ue(v) |
|     2d_keypoint_num | ue(v) |
|     is_affine_transformation_matrix_flag | u(1) |
|     for(i=0; i< 2d_keypoint_num;i++){ | |
|       x[i] | ue(v) |
|       y[i] | ue(v) |
|       if(is_affine_transformation_matrix_flag){ | |
|         for(j=0; j< 2;j++){ | |
|           for(k=0;k<2;k++){ | |
|             affine_ transformation _matrix[i][j][k] | ue(v) |
|         } | |
|       } | |
|     } | |
|   } | |
|   } | |
|   else if(gfv_feature_mode == 2){ | |
|     region_quantization_factor | ue(v) |
|     region_keypoint_num | ue(v) |
|     is_affine_ transformation_matrix_flag | u(1) |
|     is_covariance_matrix_flag | u(1) |
|     for(i=0; i< region_keypoint_num;i++){ | |
|       x[i] | ue(v) |
|       y[i] | ue(v) |
|       if(is_affine_transmation_matrix_flag){ | |
|         for(j=0; j< 2;j++){ | |
|           for(k=0;k<2;k++){ | |
|             affine_ transformation_matrix[i][j][k]; | ue(v) |
|         } | |
|       if( is_covariance_matrix_flag){ | |
|         for(m=0;m< 2;m++){ | |
|           for(n=0;n<2;n++){ | |
|             covariance_matrix[i][m][n]; | ue(v) |
|         } | |
|       } | |
|     } | |
|   } | |
|   } | |
|   else if(gfv_feature_mode == 3){ | |
|     3d_keypoint_quantization_factor | ue(v) |
|     3d_keypoint_num | ue(v) |
|     is_rotation_matrix_flag | u(1) |
|     is_translation_matrix_flag | u(1) |
|     for(i=0; i< 3d_keypoint_num;i++){ | |
|       x[i] | ue(v) |
|       y[i] | ue(v) |
|       z[i] | ue(v) |
|     } | |
|     if(is_rotation_matrix_flag){ | |
|       for(j=0; j< 3;j++){ | |
|         for(k=0;k<3;k++){ | |

TABLE 2-continued

Exemplary syntax of a generative face video SEI message

| Generative_face_video ( payloadSize ) { | Descriptor |
|---|---|
|         rotation_matrix[j][k]; | ue(v) |
|       } | |
|     } | |
|   if(is_translation_matrix_flag){ | |
|     for(1=0; 1< 3;1++){ | |
|     translation_matrix[1]; | ue(v) |
|     } | |
|   } | |
| } | |
| else if(gfv_feature_mode == 4){ | |
|   compact_feature_quantization_factor | ue(v) |
|   matrix_channel | ue(v) |
|   matrix_width | ue(v) |
|   matrix_height | ue(v) |
|   for(k=0; k< matrix_channel; k++){ | |
|     for(m=0; m< matrix_height;m++){ | |
|       for(n=0;n<matrix_width;n++){ | |
|         compact_feature_matrix_element[k][m][n]; | ue(v) |
|       } | |
|     } | |
|   } | |
| } | |
| else if(gfv_feature_mode == 5){ | |
|   semantic_quantization_factor | ue(v) |
|   semantic_type_num | ue(v) |
|   for(1=0; 1<semantic_type_num;1++){ | |
|     semantic_idx[1] | ue(v) |
|     semantic_width[1] | ue(v) |
|     semantic_height[1] | ue(v) |
|     for(y=0; y< semantic_width[1];y++){ | |
|       for(z=0; z< semantic_height[1];z++){ | |
|       semantic_element[1][y][z]; | ue(v) |
|       } | |
|     } | |
|   } | |
| } | |
| else if(gfv_feature_mode>5 && gfv_feature_mode <128){ | |

TABLE 2-continued

Exemplary syntax of a generative face video SEI message

| Generative_face_video ( payloadSize ) { | Descriptor |
|---|---|
|     data_quantization_factor | ue(v) |
|     data_length | ue(v) |
|     for(i=0;i<data_length;i++){ | |
|       data_element[i] | ue(v) |
|     } | |
|   } | |
| } | |

The semantics for the above syntax are described as follows.

In some embodiments, the SEI message may carry facial parameters for different feature representations, such as 2D keypoints, 2D landmarks, 3D keypoints, or facial semantics, which may be used for face generative compression. For these facial representations, they can be categorized into different types, and gfv_feature_mode can be signaled to determine which type of facial representation is utilized. Based on the base picture, the facial parameters in the SEI message can be used to reconstruct the face picture, and each SEI message is used to generate one face picture.

In some embodiments, gfv_id contains an identifying number that may be used to identify a generative face video SEI message. The value of gfv_id can be in the range of 0 to $2^{32}-2$, inclusive.

In some embodiments, the value of gfv_feature_mode can be in the range of 0 to 5, inclusive. Values of 6 to 128, inclusive, for feature code can be reserved for future use by ITU-T|ISO/IEC and may not be present in bitstreams. Decoders may ignore GFV SEI messages with gfv_feature_mode in the range of 6 to 128, inclusive. Values of feature code greater than 1023 may not be present in bitstreams and are not reserved for future use.

TABLE 3

Definition of gfv_feature_mode

| Value | Interpretation |
|---|---|
| 0 | Choose 2D facial landmarks as feature mode in the GFV SEI messages. Herein, VSBNet [1] is the representative model which can utilize 98 groups of 2D facial landmarks $\mathbb{R}^{2\times98}$ to depict the key structure information of human face, where the total number of encoding parameters for each inter frame is 196. |
| 1 | Choose 2D keypoints as feature mode in the GFV SEI messages. Herein, FOMM [2] is the representative model which adopts 10 groups of learned 2D keypoints $\mathbb{R}^{2\times10}$ along with their local affine transformations $\mathbb{R}^{2\times2\times10}$ to characterize complex motions. The total number of encoding parameters for each inter frame is 60. |
| 2 | Choose consistent regions as feature mode in the GFV SEI messages. Herein, MRAA [3] is the representative model which extracts consistent regions of talking face to describe locations, shape, and pose, mainly represented with shift matrix $\mathbb{R}^{2\times10}$, covar matrix $\mathbb{R}^{2\times2\times10}$ and affine matrix $\mathbb{R}^{2\times2\times10}$. As such, the total number of encoding parameters for each inter frame is 100. |
| 3 | Choose 3D keypoint as feature mode in the GFV SEI messages. Herein, Face_vid2vid [4] is the representative model which can estimate 12-dimension head parameters (i.e., rotation matrix $\mathbb{R}^{3\times3}$ and translation parameters $\mathbb{R}^{3\times1}$) and 15 groups of learned 3D keypoint perturbations $\mathbb{R}^{3\times15}$ due to facial expressions, where the total number of encoding parameters for each inter frame is 57. |
| 4 | Choose compact feature as feature mode in the GFV SEI messages. Herein, CFTE [5] is the representative model which can model the temporal evolution of faces into learned compact feature representation with the matrix $\mathbb{R}^{4\times4}$, where the total number of encoding parameters for each inter frame is 16. |
| 5 | Choose facial semantics as feature mode in the GFV SEI messages. Herein, IFVC [6] is the representative model which adopts a collection of transmitted compact facial semantics to represent the face frame, including mouth parameters $R^6$, eye parameter $R^1$, rotation parameters $R^3$, translation parameters $R^3$ and location parameter $R^1$. Totally, the number of encoding parameters for each inter frame is 14. |

[1] Benjamin Bross, Ye-Kui Wang, Yan Ye, Shan Liu, Jianle Chen, Gary J Sullivan, and Jens-Rainer Ohm, "Overview of the versatile video coding (vvc) standard and its applications," IEEE Transactions on Circuits and Systems for Video Technology, 2021.

[2] G. J. Sullivan, J. R. Ohm, W. J. Han, T. Wiegand, "Overview of the high efficiency video coding (HEVC) standard," IEEE Trans. Circuits and Systems for Video Technology, vol. 22, no. 12, pp. 1649-1668, December 2012

[3] Ian Goodfellow, Jean Pouget-Abadie, Mehdi Mirza, Bing Xu, David WardeFarley, Sherjil Ozair, Aaron Courville, and Yoshua Bengio, "Generative adversarial nets," Advances in neural information processing systems, vol. 27, 2014.

[4] Aliaksandr Siarohin, St_ephane Lathuili_ere, Sergey Tulyakov, Elisa Ricci, and Nicu Sebe, "First order motion model for image animation," Advances in Neural Information Processing Systems, vol. 32, pp. 7137-7147, 2019.

[5] Ting-Chun Wang, Arun Mallya, and Ming-Yu Liu, "One-shot free-view neural talking-head synthesis for video conferencing," in Proceedings of the IEEE/CVFConference on Computer Vision and Pattern Recognition, 2021, pp. 10039-10049.

[6] Bolin Chen, Zhao Wang, Bin Li, Rongqun Lin, Shiqi Wang, and Yan Ye, "Beyond key-point coding: Temporal evolution inference with compact feature representation for talking face video compression," in Proceedings of the IEEE Data Compression Conference, 2022.

Regarding the definition of gfv_feature_mode in Table 3, if there are other facial feature modes that are different from the given six types, the gfv_feature_mode can be further expanded. In addition, when there are other or future generative compression models that can show better rate-distortion performance than the representative models given above, these existing models can be replaced.

The definition and possible values of the parameter indicators under respective modes are illustrated as follows.

In some embodiments, when it is decided that 2D facial landmarks as the mode used to code the face picture, the parameter indicators indicate a facial representation of 2D facial landmarks can be generated and signaled by the encoder and then received by the decoder, wherein:

2d_landmark_quantization_factor specifies quantization factor to process the facial semantic parameters (i.e., x[i] and y[i]) in the mode 0 (i.e., gfv_feature_mode equals to 0). The values of parameters used for face generation are equal to the values of corresponding syntax elements divided by 2d_landmark_quantization_factor.

2d_landmark_num specifies the number of facial landmarks in the 2D coordinate.

x[i] specifies the quantized x-axis value for $i^{th}$ point in the 2D coordinate.

y[i] specifies the quantized y-axis value for $i^{th}$ point in the 2D coordinate.

In some embodiments, when it is decided that 2D keypoints as the mode used to code the face picture, the parameter indicators indicate a facial representation of 2D keypoints can be generated and signaled by the encoder and then received by the decoder, wherein:

2d_keypoint_quantization_factor specifies quantization factor to process the facial semantic parameters (i.e., x[i], y[i] and affine_transmation_matrix[i][j][k]) in the mode 1 (i.e., gfv_feature_mode equals to 1). The values of parameters used for face generation are equal to the values of corresponding syntax elements divided by 2d_keypoint_quantization_factor.

2d_keypoint_num specifies the number of facial keypoints in the 2D coordinate.

is_affine_transformation_matrix_flag equals 1 indicates the SEI message carries the affine transformation parameters. is_affine_transformation_matrix_flag equals 0 indicates the SEI message does not carry the affine transformation matrix parameters.

affine_transformation_matrix[i][j][k] specifies the quantized element value from the corresponding affine transformation matrix.

In some embodiments, when it is decided that consistent regions as the mode used to code the face picture, the parameter indicators indicate a facial representation of consistent regions can be generated and signaled by the encoder and then received by the decoder, wherein:

region_quantization_factor specifies quantization factor to process the facial semantic parameters (i.e., x[i], y[i], affine_transmation_matrix[i][j][k] and covariance_matrix[i][m][n]) in the mode 2 (i.e., gfv_feature_mode equals to 2). The values of parameters used for face generation are equal to the values of corresponding syntax elements divided by region_quantization_factor.

region_keypoint_num specifies the number of facial keypoints in the 2D coordinate.

is_covariance_matrix_flag equals 1 indicates that the SEI message carries the covariance matrix parameters. is_covariance_matrix_flag equals 0 indicates that the SEI message does not carry the covariance matrix parameters.

covariance_matrix[i][m][n] specifies the quantized element value from the corresponding covariance matrix.

In some embodiments, when it is decided that 3D keypoints as the mode used to code the face picture, the parameter indicators indicate a facial representation of 3D keypoints can be generated and signaled by the encoder and then received by the decoder, wherein:

3d_keypoint_quantization_factor specifies quantization factor to process the facial semantic parameters ( ) in the mode 3 (i.e., gfv_feature_mode equals to 3). The values of parameters used for face generation are equal to the values of corresponding syntax elements divided by 3d_keypoint_quantization_factor.

3d_keypoint_num specifies the number of facial keypoints in the 3D coordinate.

is_rotation_matrix_flag equals 1 indicates that the SEI message carries the rotation matrix parameters. is_rotation_matrix_flag equals 0 indicates that the SEI message does not carry the rotation matrix parameters.

is_translation_matrix_flag equals 1 indicates that the SEI message carries the translation matrix parameters. is_translation_matrix_flag equals 0 indicates that the SEI message does not carry the translation matrix parameters.

z[i] specifies the quantized z-axis value for it point in the 3D coordinate.

rotation_matrix[j][k] specifies the quantized element value from the corresponding rotation matrix.

translation_matrix[l] specifies the quantized element value from the corresponding translation matrix.

In some embodiments, when it is decided that compact features as the mode used to code the face picture, the parameter indicators indicate a facial representation of compact features can be generated and signaled by the encoder and then received by the decoder, wherein:

compact_feature_quantization_factor specifies quantization factor to process the facial semantic parameters (i.e., compact_feature_matrix_element[k][m][n]) in the mode 4 (i.e., gfv_feature_mode equals to 4). The values of parameters used for face generation are equal to the values of corresponding syntax elements divided by compact_feature_ quantization_factor.

matrix_channel specifies the channel of compact feature and matrix_channel can be equal to or larger than 1.

matrix_width specifies the width (the number of row) of compact feature and matrix_width can be equal to or larger than 1.

matrix_height specifies the height (the number of column) of compact feature and matrix_height can be equal to or larger than 1.

compact_feature_matrix_element specifies the quantized element value from the corresponding facial compact feature.

In some embodiments, when it is decided that facial semantics as the mode used to code the face picture, the parameter indicators indicate a facial representation of facial semantics can be generated and signaled by the encoder and then received by the decoder, wherein:

semantic_quantization_factor specifies quantization factor to process the facial semantic parameters (i.e., semantic_element[l][y][z]) in the mode 5 (i.e., gfv_feature_mode equals to 5). The values of parameters used for face generation are equal to the values of corresponding syntax elements divided by semantic_quantization_factor.

semantic_type_num specifies the number of facial semantic type in the SEI message. The value of semantic_type_num can be in the range of 0 to $2^6$, inclusive. In some embodiments, in the SEI message, the facial semantic type can be categized into mouth parameters, eye parameters, head rotation parameters, head translation parameters and head location parameters.

semantic_idx contains an identifying number regarding which facial semantic may be used in the SEI message.

TABLE 4

| Definition of semantic_idx | |
| --- | --- |
| Value | Interpretation |
| 0 | Mouth parameters with 1*6 dimension |
| 1 | Eye parameters with 1*1 dimension, representing the open-close status. |
| 2 | Head rotation parameters with 1*3 dimension, including yaw, roll and pitch |
| 3 | Head translation parameters with 1*3 dimension, including x-axis, y-axis and z-axis |
| 4 | Head location index with 1*1 dimension used for locate the face from the input image |

Regarding the definition of semantic_idx in Table 4, if there are other facial semantic representations that are different from the given semantic types, the semantic_idx can be further expanded.

semantic_width[l] specifies the width (the number of row) of the $l^{th}$ semantic type and semantic_width[l] can be equal to or larger than 1.

semantic_height[l] specifies the height (the number of column) of the $l^{th}$ semantic type and semantic_height[l] can be equal to or larger than 1.

semantic_element[l][y][z] specifies the quantized element value from the corresponding facial semantic.

data_quantization_factor specifies quantization factor to process the facial semantic parameters (i.e., data_element[i]) in the other potential mode. The values of parameters used for face generation are equal to the values of corresponding syntax elements divided by data_quantization_factor.

data_length specifies the length of feature parameters that may be used in other gfv_feature_mode except the given modes.

data_element[i] specifies the quantized value for it feature in the data_length.

Figures 8, 9, 10:
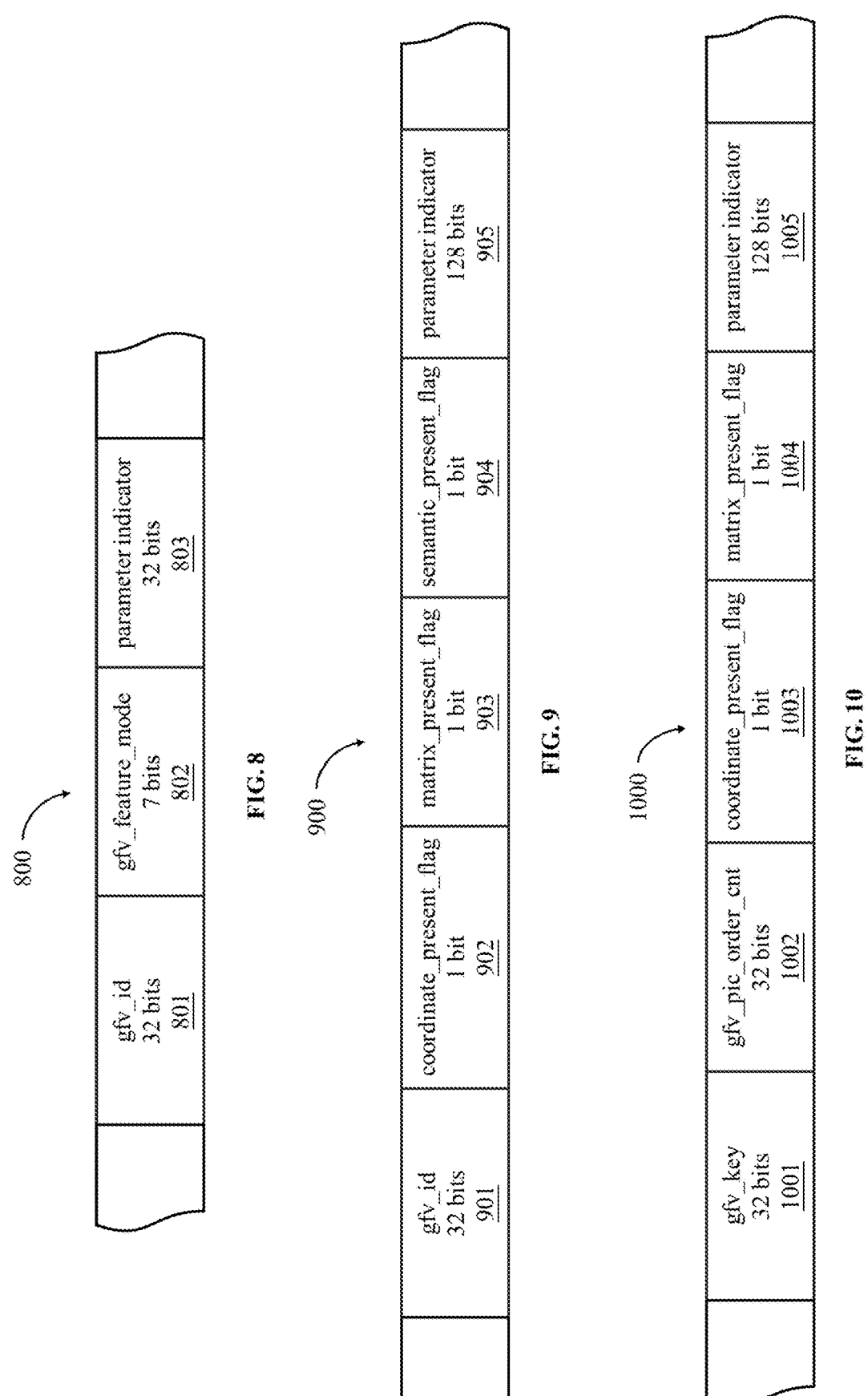
FIG. 8 is a schematic diagram illustrating an exemplary SEI message, according to some embodiments of the present disclosure.
FIG. 9 is a schematic diagram illustrating another exemplary SEI message, according to some embodiments of the present disclosure.
FIG. 10 is a schematic diagram illustrating another exemplary SEI message, according to some embodiments of the present disclosure.

The syntax of a generative face video SEI message shown in Table 2 can be encoded and signaled in a bitstream, and can be further decoded by the decoder. FIG. 8 is a schematic diagram illustrating an exemplary SEI message 800, according to some embodiments of the present disclosure. As shown in FIG. 8, SEI message 800 may include an identifying number indicator (gfv_id) 801, a mode indicator (gfv_feature_mode) 802, a parameter indicator 803, etc. The corresponding bit length of these parameters are also shown in FIG. 8 as an example. As appreciated, the bit length of these parameters can be otherwise designed. Parameter indicator 803 is signaled in line with mode indicator 802. The other parameters are not shown in FIG. 8 to avoid causing any ambiguity.

Table 5 shows an exemplary syntax of the SEI message. As shown in Table 5, an identifying number indicator gfv_id can be generated by an encoder and signaled to a decoder. In some embodiments, gfv_id can be used to indicate whether the SEI is used to code the face picture. As described above, gfv_id can be used to distinguish between a traditional SEI message and a generative face video SEI message. Referencing back to FIG. 7A, the decoder may determine whether the SEI message is used to code the face picture based on the identifying number indicator in step 706. In some embodiments, the identifying number indicator may be used to indicate a generative face video filter.

With further reference to Table 5, the SEI message may include at least one parameter present indicator (e.g., coordinate_present_flag, matrix_present_flag, or semantic_present_flag). The mode used to code the face picture can be determined based on the parameter present indicator in step 708 by the decoder. Under different modes indicated by the parameter present indicator, a parameter indicator can be included in the SEI message to convey the face information parameters. For example, if coordinate_present_flag==1 (meanwhile, matrix_present_flag==0 and semantic_present_ flag==0), which means the SEI message carries the coordinate parameters, then parameter indicators (1) coordinate_quantization_factor, (2) is_3D_coordinate_flag, (3) coordinate_point_num, and (4) x[i], y[i], z[i] can be included in the SEI message and can be decoded as the face information parameters.

In some embodiments, the SEI message in Table 5 can be utilized by the following operations. First, the generative face video SEI message contains an identifying number gfv_id that can be used to identify the generative face video SEI message. Second, the parameter present flags coordinate_present_flag, matrix_present_flag, and semantic_present_flag for different parameter types are signaled. If a parameter present flag shows the parameters of a current type is present, then the corresponding parameters are signaled. Otherwise, the signaling of the parameters of the current type is skipped. In this example, the parameters are categorized into three types: key points, matrice and semantics. The semantic type includes parameters indicating the status, motion or location of mouth, eye and head. In addition, the matrix type include affine translation matrix, covariance matrix, translation matrix, rotation matrix, and compact feature matrix. Third, after receiving and decoding the SEI message, the face video can be reconstructed towards high-quality or user-friendly manner via the generation ability of generative adversial network with the parameters signaled in the SEI and the base picture decoded previously as inputs.

TABLE 5

Exemplary syntax of a generative face video SEI message

| Generative_face_video ( payloadSize ) { | Descriptor |
|---|---|
| gfv_id | ue(v) |
| coordinate_present_flag | u(1) |
| if(coordinate_present_flag){ | |
| coordinate_quantization_factor | ue(v) |
| is_3D_coordinate_flag | u(1) |
| coordinate_point_num | ue(v) |
| for(i=0; i< coordinate_point_num;i++){ | |
| x[i] | ue(v) |
| y[i] | ue(v) |
| if(is_3D_coordinate_flag){ | |
| z[i] | ue(v) |
| } | |
| } | |
| } | |
| matrix_present_flag | u(1) |
| if(matrix_present_flag){ | |
| matrix_quantization_factor | ue(v) |
| matrix_type_num | ue(v) |
| for(j=0; j<matrix_type_num;j++){ | |
| matrix_idx[j] | ue(v) |
| if(coordinate_present_flag){ | |
| matrix_num_equal_to_coordinate_point_flage[j] | u(1) |
| if(! coordinate_present_flag \|\| ! | |
| matrix_num_equal_to_coordinate_flag[j]){ | |
| matrix_num[j] | ue(v) |
| MatrixNum[j]=matrix_num[j] | |
| } | |
| else{ | |
| MatrixNum[j]= coordinate_point_num | |
| } | |
| } | |
| matrix_width[j] | ue(v) |
| matrix_height[j] | ue(v) |
| for(k=0; k<MatrixNum[j]; k++){ | |
| for(m=0; m< matrix_height[j];m++){ | |
| for(n=0;n<matrix_width[j];n++){ | |
| matrix_element[j][k][m][n]; | ue(v) |
| } | |
| } | |
| } | |
| } | |
| } | |
| semantic_present_flag | u(1) |
| if(semantic_present_flag){ | |
| semantic_quantization_factor | ue(v) |
| semantic_type_num | ue(v) |
| for(l=0; l<semantic_type_num;l++){ | |
| semantic_idx[l] | ue(v) |
| semantic_width[l] | ue(v) |
| semantic_height[l] | ue(v) |
| for(y=0; y< semantic_width[l];y++){ | |
| for(z=0; z< semantic_height[l];z++){ | |
| semantic_element[l][y][z]; | ue(v) |
| } | |
| } | |
| } | |
| } | |
| } | |

The semantics for the above syntax are described as follows.

In some embodiments, the SEI message may carry facial parameters for different feature representations, such as 2D keypoints, 2D landmarks, 3D keypoints, or facial semantics, which may be used for face generative compression. For these facial representations, they can be categorized into three types, including coordinate parameters, matrix parameters and semantic parameters. Based on the base picture, the facial parameters in the SEI message can be used to reconstruct face picture, and each SEI message is used to generate one face picture.

In some embodiments, gfv_id contains an identifying number that may be used to identify a generative face video SEI message. The value of gfv_id can be in the range of 0 to $2^{32}-2$, inclusive.

The definition and possible values of the parameter indicators under respective modes are illustrated as follows.

In some embodiments, coordinate_present_flag equals 1 indicates that the SEI message carries the coordinate parameters, while coordinate_present_flag equals 0 indicates that the SEI message does not carry the coordinate parameters. When it is decided that coordinate information of keypoints is used to code the face picture, the parameter indicators indicate the coordinate information of keypoints can be generated and signaled by the encoder and then received by the decoder, wherein:

coordinate_quantization_factor specifies the quantization factor to process the facial coordinate parameters (i.e., x[i], y[i] and z[i]). The values of parameters used for face generation are equal to the values of corresponding syntax elements divided by coodrinate_quantization_factor.

is_3D_coordinate_flag equals 1 indicates that the coordinate parameters belong to three dimensional space, which can be represented with (x[i], y[i], z[i]). is_3D_coordinate_flag equals 0 indicates that the coordinate parameters belong to two dimensional space, which can be represented with (x[i], y[i]).

coordinate_point_num specifies the number of facial coordinate parameter set in the SEI message. One set of parameters represents one point in the coordinate. The value of coordinate_point_num can be in the range of 0 to $2^{10}$, inclusive.

x[i] specifies the quantized x-axis value for $i^{th}$ keypoint.

y[i] specifies the quantized y-axis value for $i^{th}$ keypoint.

z[i] specifies the quantized z-axis value for $i^{th}$ keypoint.

In some embodiments, matrix_present_flag equals 1 indicates that the SEI message carries the matrix parameters, while matrix_present_flag equals 0 indicates that the SEI message does not carry the matrix parameters. When it is decided that matrix parameters are used to code the face picture, the parameter indicators indicate the matrix parameters can be generated and signaled by the encoder and then received by the decoder, wherein:

matrix_quantization_factor specifies the quantization factor to process the facial matrix parameters (i.e., matrix_element[j][k][m][n]). The values of parameters used for face generation are equal to the values of corresponding syntax elements divided by matrix_quantization_factor.

matrix_type_num specifies the number of facial matrix types in the SEI message. The value of matrix_type_num can be in the range of 0 to $2^6$, inclusive. In some embodiments, the facial matrix type can be categized into affine translation matrix, covariance matrix, rotation matrix, translation matrix and compact feature matrix. And these matrixes can be further distinguished whether is related with the points in the coordinate.

matrix_idx contains an identifying number regarding which facial matrix may be used in the SEI message.

TABLE 6

| | Definition of matrix_idx |
|---|---|
| matrix_idx | Interpretation |
| 0 | Affine translation matrix corresponding to the coordinate_point_num. Every keypoint in the coordinate may have a group of 2*2 affine translation matrix. |
| 1 | Covariance matrix corresponding to the coordinate_point_num. Every keypoint in the coordinate may have a group of 2*2 covariance matrix. |
| 2 | Rotation matrix with 3*3 dimension to represent the head rotation |
| 3 | Translation matrix with 1*3 dimension to represent the head translation |
| 4 | Compact feature matrix with 4*4 dimension |

Regarding the definition of matrix_idx in Table 6, if there are other facial matrix representations that are different from the given matrix types, the matrix_idx can be further expanded.

matrix_num_equal_to_coordinate_point_flag[j] equals 1 indicates that the number of facial matrices is equal to coordinate_point_num.

matrix_num[j] specifies the number of facial matrix when coordinate_present_flag or matrix_num_equal_to_coordinate_point_flag[j] do not exist. Otherwise, if these two flags both exist, the number of facial matrices is equal to coordinate_point_num.

matrix_width[j] specifies the width (the number of row) of the $j^{th}$ facial matrix and matrix_width[j] can be equal to or larger than 1.

matrix_height[j] specifies the height (the number of column) of the $j^{th}$ facial matrix and matrix_height[j] can be equal to or larger than 1.

matrix_element[j][k][m][n] specifies the quantized element value from the corresponding facial matrix.

In some embodiments, semantic_present_flag equals 1 indicates that the SEI message carries the semantic parameters, while semantic_present_flag equals 0 indicates that the SEI message does not carry the semantic parameters. When it is decided that semantic parameters are used to code the face picture, the parameter indicators indicate the semantic parameters can be generated and signaled by the encoder and then received by the decoder, wherein:

semantic_quantization_factor specifies quantization factor to process the facial semantic parameters (i.e., semantic_element[l][y][z]). The values of parameters used for face generation are equal to the values of corresponding syntax elements divided by semantic_quantization_factor.

semantic_type_num specifies the number of facial semantic type in the SEI message. The value of semantic_type_num can be in the range of 0 to $2^6$, inclusive. In some embodiments, the facial semantic type can be categized into mouth parameters, eye parameters, head rotation parameters, head translation parameters and head location parameters.

semantic_idx contains an identifying number regarding which facial semantic may be used in the SEI message.

TABLE 7

| | Definition of semantic_idx |
|---|---|
| semantic_idx | Interpretation |
| 0 | Mouth parameters with 1*6 dimension |
| 1 | Eye parameters with 1*1 dimension, representing the open-close status. |
| 2 | Head rotation parameters with 1*3 dimension, including yaw, roll and pitch |
| 3 | Head translation parameters with 1*3 dimension, including x-axis, y-axis and z-axis |
| 4 | Head location index with 1*1 dimension used for locate the face from the input image |

Regarding the definition of semantic_idx in Table 7, if there are other facial semantic representations that are different from the given semantic types, the semantic_idx can be further expanded.

semantic_width[l] specifies the width (the number of row) of the $l^{th}$ semantic type and semantic_width[l] can be equal to or larger than 1.

semantic_height[l] specifies the height (the number of column) of the $l^{th}$ semantic type and semantic_height[l] can be equal to or larger than 1.

semantic_element[l][y][z] specifies the quantized element value from the corresponding facial semantic.

The syntax of a generative face video SEI message shown in Table 5 can be encoded and signaled in a bitstream, and can be further decoded by the decoder. FIG. 9 is a schematic diagram illustrating an exemplary SEI message 900, according to some embodiments of the present disclosure. As shown in FIG. 9, SEI message 900 may include an identifying number indicator (gfv_id) 901, a coordinate indicator (coordinate_present_flag) 902, a matrix indicator (matrix_present_flag) 903, a semantic indicator (semantic_present_flag) 904, a parameter indicator 905, etc. The corresponding bit length of these parameters are also shown in FIG. 9 as an example. As appreciated, the bit length of these parameters can be otherwise designed. Coordinate indicator 902, matrix indicator 903, and semantic indicator 904 are collaboratively signaled. That is, in a proper SEI message 900, only one of coordinate indicator 902, matrix indicator 903, and semantic indicator 904 can be activated. Moreover, parameter indicator 905 can be generated and signaled in line the activated mode. The other parameters are not shown in FIG. 9 to avoid causing any ambiguity.

An example of the syntax of the common SEI message for generative face video is shown in Table 8. As shown in Table 8, a key indicator gfv_key can be generated by an encoder and signaled to a decoder. In some embodiments, gfv_key can be used to indicate a neural network used to generate the face information parameter at the encoder's side. In some embodiments, the neural network at the decoder's side may be not in coincidence with the neural network at the encoder's side. As such, gfv_key can be signaled for the decoder's decision for coincidence. Referencing back to FIG. 7A, the decoder may determine whether the SEI message matches with its neural network based on the key indicator in step 706. In some embodiments, as the neural network at the encoder's side is also expected to be the neural network at the decoder's side for decoding the bitstream, the neural network at the encoder's side is also referred to as a target network.

With further reference to Table 8, the SEI message may include an order indicator gfv_pic_order_cnt for indicating a displaying order of the face picture generated according to the SEI message.

In some embodiments, the SEI message may include a parameter present indicator (e.g., coordinate_present_flag or matrix_present_flag). The mode used to code the face picture can be determined based on the parameter present indicator in step 708 by the decoder.

Under different modes indicated by the parameter present indicator, a parameter indicator can be included in the SEI message to convey the face information parameters. For example, if coordinate_present_flag==1 (meanwhile, matrix_present_flag==0), which means the SEI message carries the coordinate parameters, then parameter indicators coordinate_precision_factor_minus1, num_coordinates_minus1, coordinate_z_present_flag, etc. can be included in the SEI message and can be decoded as the face information parameters.

In some embodiments, the SEI message in Table 8 can be utilized by the following operations. First, a key gfv_key that may be used to determine whether the current generative face video SEI message matches with the generative network is signaled. The decoder or the post-processor may generate the face pictures with the received SEI message only if it contains a known gfv_key that is specified in the application; otherwise the parameters in the received SEI message may be extracted with a network that is not matched with the generative network in the decoder or the post-processor and the decoder or the post-process should ignore the received SEI message and not to generate the face pictures. Then, the picture order count gfv_pic_order_cnt is signaled to indicate the order of the picture generated by this SEI message.

Second, the parameter present flags for different parameter types are signaled. If a parameter present flag shows the parameters of the current type is present, then the corresponding parameters are signaled. Otherwise, the signaling of the parameters of the current type is skipped. In some embodiments, the parameters can be categorized into two types: key points and matrice. Compared with some of the embodiments described above in accompany with Table 5, the semantic type is merged into matrix type herein. In some embodiments, the matrix type may include affine translation matrix, covariance matrix, mouth matrix, eye matrix, head rotation matrix, head translation matrix, head location matrix and compact feature matrix. In some embodiments, the matrix type may include affine translation matrix, covariance matrix, compact feature matrix and semantic matrix. The semantic matrix type may further include mouth parameter matrix, eye parameter matrix, head rotation parameter matrix, head translation matrix and head location matrix.

Third, after receiving and decoding the SEI message, the face video can be reconstructed towards high-quality or user-friendly manner via the generation ability of generative adversial network with the parameters signaled in the SEI and the base picture decoded previously as inputs.

TABLE 8

| Exemplary syntax of a generative face video SEI message | |
|---|---|
| | Descriptor |
| generative_face_video ( payloadSize ) { | |
|   gfv_key | u(32) |
|     gfv_pic_order_cnt | u(32) |
|     coordinate_present_flag | u(1) |
|   if ( coordinate_present_flag ) { | |
|     coordinate_precision_factor_minus1 | ue(v) |
|     num_coordinates_minus1 | ue(v) |
|     coordinate_z_present_flag | u(1) |
|     if ( coordinate_z_present_flag ) | |
|       coordinate_z_max_value_minus1 | ue(v) |
|     for ( i=0; i< num_coordinates_minus1; i++ ) { | |
|       coordinate_x_abs[ i ] | u(v) |
|       if ( coordinate_x_abs[ i ] ) | |
|         coordinate_x_sign_flag[ i ] | u(1) |
|       coordinate_y_abs[ i ] | u(v) |
|       if ( coordinate_y_abs[ i ] ) | |
|         coordinate_y_sign_flag[ i ] | u(1) |
|       if ( coordinate_z_present_flag ) { | |
|         coordinate_z_abs[ i ] | u(v) |
|         if ( coordinate_z_abs[ i ] ) | |
|           coordinate_z_sign_flag[ i ] | u(1) |
|       } | |
|     } | |
|   } | |
|   matrix_present_flag | u(1) |
|   if ( matrix_present_flag ) { | |
|     matrix_element_precision_factor_minus1 | ue(v) |
|     num_matrix_types_minus1 | ue(v) |
|     for ( i=0; i <= num_matrix_types_minus1; i++ ) { | |

TABLE 8-continued

| Exemplary syntax of a generative face video SEI message | |
|---|---|
| | Descriptor |
| matrix_type_idx[ i ] | u(6) |
| if ( matrix_type_idx[ i ] == 0 \|\| matrix_type_idx[ i ] == 1) { | |
|   if ( coordinate_present_flag ) | |
|     num_matrices_equal_to_num_coordinates_flag[ i ] | u(1) |
|   if ( !coordinate_present_flag | |
| \|\| !num_matrix_equal_to_num_coordinates_flag[ i ] ) | |
|     num_matrices_info[ i ] | ue(v) |
| } | |
| else if ( matrix_type_idx[ i ] == 2 \|\| matrix_type_idx[ i ] == 3 \|\| | |
| matrix_type_idx[ i ] >= 7 ) { | |
|   if ( matrix_type_idx[ i ] >= 7 ) | |
|     num_matrices_minus1[ i ] | u(1) |
|   matrix_width_minus1[ i ] | ue(v) |
|   matrix_height_minus1[ i ] | ue(v) |
| } | |
| else if ( matrix_type_idx[ i ] >=4 && matrix_type_idx[ i ] <= 6 | |
| && !coordinate_present_flag ) | |
|   matrix_for_3D_space_flag[ i ] | u(1) |
|   for ( j=0; j<= numMatrices[ i ]; j++ ) { | |
|     for ( k=0; k<= matrix_height_minus1[ i ]; k++ ) { | |
|       for ( l=0;l<= matrix_width_minus1[ i ]; l++ ) { | |
|         matrix_element_int[ i ][ j ][ k ][ l ] | ue(v) |
|         matrix_element_dec[ i ][ j ][ k ][ l ] | u (v) |
|         if ( matrix_element_int[ i][ j ][ k ][ l ] \|\| | |
| matrix_element_dec[ i ][ j ][ k ][ l ] ) | |
|           matrix_element_sign_flag[ i ][ j ][ k ][ l ] | u(1) |
|       } | |
|     } | |
|   } | |
|  } | |
| } | |
| } | |

This SEI message specifies the syntax and semantics of a variety of facial representations that may be used by a deep generative network to generate pictures based on a base picture. The base picture is a picture that provides the texture information needed by the deep generative network. The base picture may be coded as a bitstream conforming to Rec. ITU-T H.264, Rec. ITU-T H.265, Rec. ITU-T H.266, etc. Decoder may decode the base picture from the conforming bitstream as the first picture of the sequence and the following pictures may be generated with a deep generative network using syntax elements signaled in generative face video SEI message. Or the decoder may decode the base picture from the conforming bitstream periodically. Based on the base picture, a number of subsequent pictures may be generated with a deep generative network using syntax elements signaled in the generative face video SEI message. The texture of the base picture and the additionally generated pictures are expected to mainly contain talking face.

Use of this SEI message requires the definition of the following variables:

Cropped decoded output base picture width and height in units of luma samples, denoted herein by CroppedWidth and CroppedHeight, respectively.

Luma sample array CroppedYPic and chroma sample arrays CroppedCbPic and CroppedCrPic of the cropped decoded output base picture.

A chroma format indicator, denoted herein by ChromaFormatId.

The variables SubWidthC and SubHeightC derived from ChromaFormatIdc.

In some embodiments, gfv_key indicates a key that may be used to identify the analysis network used to generate the syntax elements of the current generative face video SEI message. The value of gfv_key may be used to determine whether the analysis network at the encoder matches with the generative network at the decoder.

The generative network at the decoder may use the SEI message to generate the video pictures only if it recognizes the value of gfv_key. The value of gfv_key may be specified by the applications that rely on matching networks at the encoder and the decoder. For such applications, if the parameters in the received SEI message are extracted with an analysis network that is not matched with the generative network at the decoder, the generative network may ignore the received SEI message.

In some embodiments, gfv_pic_order_cnt specifies the display order count modulo 1<<31 of the picture generated with the current SEI message.

In some embodiments, coordinate_present_flag equals 1 indicates that the coordinate information of keypoints is present, while coordinate_present_flag equals 0 indicates that coordinate information of keypoints is not present. When it is decided that coordinate information of keypoints is used to code the face picture, the parameter indicators indicate the coordinate information of keypoints can be generated and signaled by the encoder and then received by the decoder, wherein:

It is a requirement of bitstream conformance that when matrix_type_idx[i] for any i from 0 to num_matrix_types_minus1 is equal to 0 or 1, the value of coordinate_present_flag can be equal to 1.

coordinate_precision_factor_minus1 plus 1 indicates the length, in bits, of coordinate_x, coordinate_y and coordinate_z.

In some embodiments, the low bound of precision can be larger than 1. For example, it may be k and the syntax element can be changed to coordinate_precision_factor_minusk. coordinate_precision_factor_minusk plus k indicates the length, in bits, of coordinate_x, coordinate_y and coordinate_z.

num_coordinates_minus1 plus 1 indicates the number of keypoint coordinates. The value of num_coordinates_minus1 can be in the range of 0 to $2^{10}-1$, inclusive.

coordinate_z_present_flag equals 1 indicates that z-axis coordinate information of the keypoints is present. coordinate_z_present_flag equals 0 indicates that the z-axis coordinate information of the keypoints is not present. When coordinate_z_present_flag is not present, it is inferred to be 0.

coordinate_z_max_value_minus1 plus 1 indicates the maximum absolute value of z-axis coordinates of keypoints.

In some embodiments, the lower bound of maximum value of z-axis coordinate may be greater than 1. for example, it can be k and the syntax element signaled is changed to coordinate_z_max_value_minusk. coordinate_z_ max_value_minusk plus k indicates the maximum absolute value of z-axis coordinates of keypoints.

coordinate_x_abs[i] specifies the normalized absolute value of x-axis coordinate of the $i^{th}$ keypoint.

-continued $$coordinateY[i] = \frac{\begin{array}{c}(1 - 2*coordinate\_y\_sign\_flag[i]) * \\ coordinate\_y\_abs[i] * CroppedHeight\end{array}}{1 << (coordinate\_precision\_factor\_minus1 + 1)}$$

$$coordinateZ[i] = \frac{\begin{array}{c}(1 - 2*coordinate\_z\_sign\_flag[i]) * \\ coordinate\_z\_abs[i] * \\ (coordinate\_z\_max\_value\_minus1 + 1)\end{array}}{1 << (coordinate\_precision\_factor\_minus1 + 1)}$$

In some embodiments, matrix_present_flag equals 1 indicates that matrix parameters are present, while matrix_present_flag equals 0 indicates that matrix parameters are not present. When it is decided that matrix parameters are used to code the face picture, the parameter indicators indicate the matrix parameters can be generated and signaled by the encoder and then received by the decoder, wherein:

matrix_element_precision_factor_minus1 plus 1 indicates the length, in bits, of matrix_element_dec[i][j][k][l].

num_matrix_types_minus1 plus 1 indicates the number of matrix types signaled in the SEI message. The value of matrix_type_num_minus1 can be in the range of 0 to $2^6-1$, inclusive.

matrix_type_idx[i] indicates the index of the $i^{th}$ matrix type as specified in Table 9.

TABLE 9

| Specification of matrix_type_idx | |
| --- | --- |
| Value | Specification |
| 0 | Affine translation matrix with the size of 2*2 or 3*3. |
| 1 | Covariance matrix with size of 2*2 or 3*3. |
| 2 | Mouth matrix representing mouth motion. |
| 3 | Eye matrix representing the open-close status and level of the eyes. |
| 4 | Head rotation parameters with the size of 2*2 or 3*3 representing the head rotation in 2D space or 3D space. |
| 5 | Head translation matrix with the size of 1*2 or 1*3 representing head translation in 2D space or 3D sapce. |
| 6 | Head location matrix with size of 1*2 or 1*3 to representing the head location in 2D space or 3D space. |
| 7 | Compact feature matrix with the size being specified by matrix_width_minus1[i] and matrix_height_minus1[i]. |
| 8 . . . 31 | Other undefined matrix with the size being specified by matrix_width_minus1[i] and matrix_height_minus1[i]. |
| 32 . . . 63 | Reserverd | coordinate_x_sign_flag[i] specifies the sign of x-axis coordinate of the $i^{th}$ keypoint. When coordinate_x_sign_flag[i] is not present, it is inferred to be equal to 0.

coordinate_y_abs[i] specifies the normalized absolute value of y-axis coordinate of $i^{th}$ keypoint.

coordinate_y_sign_flag[i] specifies the sign of y-axis coordinate of it keypoint. When coordinate_y_sign_flag[i] is not present, it is inferred to be equal to 0.

coordinate_z_abs[i] specifies the normalized absolute value of z-axis coordinate of i keypoint.

coordinate_z_sign_flag[i] specifies the sign of z-axis coordinate of i key point. When coordinate_z_sign_flag[i] is not present, it is inferred to be equal to 0.

The variable coordiateX[i], coordiateY[i] and coordiateZ[i] indicating the x-axis coordinate, y-axis coordinate and z-axis coordinate of the $i^{th}$ keypoint respectively are derived as follows:

$$coordinateX[i] = \frac{\begin{array}{c}(1 - 2*coordinate\_x\_sign\_flag[i]) * \\ coordinate\_x\_abs[i] * CroppedWidth\end{array}}{1 << (coordinate\_precision\_factor\_minus1 + 1)}$$

The undefined matrxi type is used to represent the matrxi type rather than affine translation matrix, covariance matrix, rotation matrix, translation matrix and compact feature matrix. It is may be used by the user to extend the matrix type.

num_matrices_equal_to_num_coordinates_flag[i] equals 1 indicates that the number of matrices of the $i^{th}$ matrix type is equal to num_coordinates_minus1+1. num_matrices_equal_to_num_coordinates_flag[i] equals 0 indicates that the number of matrices of the it matrix type is not equal to num_coordinates_minus1+1.

num_matrices_info[i] provides information to derive the number of the matrices of the it matrix type.

matrix_width_minus1[i] plus 1 indicates the width of the matrix of i matrix type.

When matrix_width_minus1[i] is not present, it is inferred as follows:

If matrix_type_idx[i] is equal to 0, 1 or 4, and coordinate_z_present_flag is 1, matrix_width_minus1[i] is inferred to be equal to 2 otherwise, if matrix_type_idx[i] is equal to 0, 1 or 4, and coordinate_z_present_flag is 0, matrix_width_minus1[i] is inferred to be equal to 1 otherwise (matrix_type_idx[i] is equal to 5 or 6), matrix_width_minus1[i] is inferred to be equal to 0 matrix_height_minus1[i] plus 1 indicates the height of the matrix of the it matrix type.

When matrix_height_minus1[i] is not present, it is inferred as follows:

If matrix_type_idx is equal to 0, 1, 4, 5 or 6, and coordinate_z_present_flag is 1, matrix_height_minus1 [i] is inferred to be equal to 2.

otherwise (matrix_type_idx is equal to 0, 1, 4, 5 or 6, and coordinate_z_present_flag is 0), matrix_height_minus1 [i] is inferred to be equal to 1.

num_matrices_minus1[i] plus 1 indicates the number of matrices of the it matrix type.

matrix_for_3D_space_flag[i] equals 1 indicates that the matrix of the $i^{th}$ matrix type is a matrix for three-dimension space. matrix_size_flag[i] equals 0 indicates the matrix of the $i^{th}$ matrix type is a matrix for two-dimension space.

The variable numMatrices[i] indicating the number of the matrices of the it matrix type is derived as follows:

```
if ( matrix_type_idx[ i ] == 0 || matrix_type_idx[ i ] == 1 ) {
    if ( coordinate_present_flag )
    numMatrices[ i ] = num_matrices_equal_to_num_coordinates_flag[ i ] ?
num_coordinates_minus1 + 1 : ( num_matrices_idc[ i ] < num_coordinates_minus1 ?
num_matrices_idc[ i ] + 1 : num_matrices_idc[ i ] + 2 )
        else
            numMatrices[ i ] = num_matrices_idc[ i ] + 1
    }
    else if ( matrix_type_idx[ i ] >= 2 && matrix_type_idx[ i ] < 7)
        numMatrices[ i ] = 1
    else
        numMatrices[i] = num_matrices_minus1[i] + 1
```

25 matrix_element_int[i][j][k][l] indicates the integer part of the value of the matrix element at position (k, l) of the $j^{th}$ matrix of the $i^{th}$ matrix type.

matrix_element_dec[i][j][k][l] indicates the decimal part of the value of the matrix element at position (k, l) of the $j^{th}$ matrix of the $i^{th}$ matrix type.

matrix_element_sign_flag[i][j][k][l] indicates the sign of the matrix element at position (k, l) of the $j^{th}$ matrix of the $i^{th}$ matrix type. When matrix_element_sign_flag[i][j][k][l] is not present, it is inferred to be equal to 0.

The variable MatrixElementVal[i][j][k][l] representing the value of the matrix element at position (k, l) of the $j^{th}$ matrix of the $i^{th}$ matrix type is derived as follows:

40

$$matrixElementVal[i][j][k][l] =$$

$$(1 - 2 * matrix\_element\_sign\_flag[i][j][k][l]) *$$

$$\left( matrix\_element\_int[i][j][k][l] + \frac{matrix\_element\_dec[i][j][k][l]}{1 << (matrix\_element\_precision\_factor\_minus1 + 1)} \right)$$

The process DeriveInputTensors( ), for deriving the input tensor inputTensorImgY, inputTensorImgCb, inputTesnsorImgCr, inputTensorKeyPoint, inputTensorMatrix is specified as follows:

```
Initialize inputTensorImgY, inputTensorImgCb, inputTesnsorImgCr,
inputTensorKeyPoint and inputTensorMatrix with 0.
    for ( x = 0; x < CroppedWidth; x++ ) {
        for ( y = 0; y < CroppedHeight; y++ ) {
            inputTsensorImgY[ x ][ y ] = CroppedYPic[ x ][ y ]
        }
    }
    for ( x=0; x < CroppedWidth/ SubWidthC; x++ ) {
        for ( y=0; y < CroppedHeight/ SubHeightC; y++ ) {
            inputTsensorImgCb[ x ][ y ] = CroppedCbPic[ x ][ y ]
            inputTsensorImgCr[ x ][ y ] = CroppedCrPic[ x ][ y ]
        }
    }
    if ( coordinate_present_flag ) {
        for ( i=0; i< =num_coordinates_minus1; i++ ) {
```

-continued

```
            inputTensorKeyPoint[ i ][ 0 ] = coordiateX[ i ]
            inputTensorKeyPoint[ i ][ 1 ] = coordiateY[ i ]
            if ( coordinate_z_present_flag )
                inputTensorKeyPoint[ i ][ 2 ] = coordiateZ[ i ]
        }
    }
    if ( matrix_present_flag ) {
        for ( i=0; i<=num_matrix_types_minus1; i++ ) {
            for ( j=0; j< numMatrices[ i ]; j++ ) {
                for( k=0; k<= matrix_height_minus1[ i ]; k++ ) {
                    for ( l=0;l<=matrix_width_minus1[ i ]; l++) {
                        inputTensorMatrix[ i ][ j ][ k ][ l ] = matrixElementVal[ i ][ j][ k][ l ]
                        }
                    }
                }
            }
        }
        The process StoreOutputTensors( ), for deriving output sample arrays
OutputYPic, OutputCbPic, and OutputCrPic from the output tensor outputTensorY,
outputTensorCb and outputTensorCr is specified as follows:
            for(x=0; x< CroppedWidth; x++){
                for(y=0; y< CroppedHeight; y++){
                    OutputYPic[ x ][ y ] = outputTensorY[ x ][ y ]
                }
            }
            for(x=0; x< CroppedWidth/ SubWidthC; x++){
                for(y=0; y< CroppedHeight/ SubHeightC; y++){
                    OutputCbPic[ x ][ y ] = outputTensorCb[ x ][ y ]
                    OutputCdPic[ x][ y ] = outputTensorCr[ x ][ y ]
                }
```

The following process is used to generate a video picture, where PictureGeneration( ) is a deep generative network based process to output the picture sample values with parameters signaled in the face generation SEI message and the decoded base picture as input.

```
{
    DeriveInputTensors( )
    outputTensor = PictureGeneration ( inputTensorImgY,
    inputTensorImgCb,
inputTesnsorImgCr, inputTensorKeyPoint, inputTensorMatrix)
    StoreOutputTensors( )
}
```

In some embodiments, the generative neural network can be divided into two sub-networks (e.g., a first sub-network and a second sub-network) to overcome the interoperability issue.

In some embodiments, the first sub-network can be a flow translator network which transfers the parameters signaled in SEI message into flow map while the second sub-network can be a generative network which generates the pictures based on the flow map output by the first sub-network. The flow translator network could support different types of facial representations for different algorithms and transfer all these facial representation parameters into a flow map. Thus, the generative network can be fixed regardless of what kind of the facial representation is signaled in the SEI message, as the input of the generative network is always a flow map.

In some embodiments, the first sub-network can be a parameter translator network which translates the facial representation parameters signaled in the SEI message into a specified type of parameters while the second sub-network can be a generative network which generates the picture based on the specified type of facial representation parameters. Consequently, the generative network can be also fixed as it supports the specified type of parameters as inputs.

In some embodiments, the SEI message can be used to directly signal the network or provide a URI to the sub-network to indicate what type of network is signaled in the SEI message. For example, a key indicator (e.g., gfv_key as described herein) can be signaled to indicate what type of network is signaled in the SEI message.

The network signaled or indicated in the SEI message can be updated. A first SEI message in the current CLVS may be used to signal or indicate a network as a base GFV and a subsequent SEI message can be used to update the base GFV by signaling or indicating an updated network.

The syntax of a generative face video SEI message shown in Table 8 can be encoded and signaled in a bitstream, and can be further decoded by the decoder. FIG. 10 is a schematic diagram illustrating an exemplary SEI message 1000, according to some embodiments of the present disclosure. As shown in FIG. 10, SEI message 1000 may include a key indicator (gfv_key) 1001, an order indicator (gfv_pic_order_cnt) 1002, a coordinate indicator (coordinate_present_flag) 1003, a matrix indicator (matrix_present_flag) 1004, etc. The corresponding bit length of these parameters are also shown in FIG. 10 as an example. As appreciated, the bit length of these parameters can be otherwise designed. Coordinate indicator 1003 and matrix indicator 1004 are collaboratively signaled. That is, in a proper SEI message 1000, only one of coordinate indicator 1003 and matrix indicator 1004 can be activated. Moreover, parameter indicator 1005 can be generated and signaled in line the activated mode. The other parameters are not shown in FIG. 10 to avoid causing any ambiguity.

An example of the syntax of the common SEI message for generative face video is shown in Table 10. As shown in Table 10, an identifying number indicator gfv_id can be generated by an encoder and signaled to a decoder. In some embodiments, gfv_id can be used to indicate whether the SEI is used to code the face picture.

In some embodiments, a key present indicator (e.g., gfv_key_present_flag as described below) can be included in the SEI message for indicating the presence of the key indicator (e.g., gfv_key as described herein). Referencing back to FIG. 7A, in step 706, the decoder may determine whether the SEI message matches with the decoder's neural network based on the key indicator, under the premise the key present indicator indicates the presence of the key Indicator. That is, the decoder may skip the determination of matching between neural networks when the key present indicator indicates the key indicator's absence.

In some embodiments, a neural network indicator can be included in the SEI message for indicating a configuration of the target neural network. Hence, the decoder can set (e.g., initialize or update) the neural network based on the neural network indicator, when the key present indicator (e.g., gfv_key_present_flag) indicates the absence of the key indicator (e.g., gfv_key). In some embodiments, the neural network indicator may include gfv_nn_mode_idc, gfv_nn_type_idc, etc. as described below.

TABLE 10

| An example of syntax of a face video generative compression SEI message | Descriptor |
|---|---|
| generative_face_video ( payloadSize ) { | |
|     gfv_id | ue(v) |
|     gfv_key_present_flag | |
|     if( gfv_key_present_flag ) { | |
|         gfv_key | u(32) |
|     else { | |
|         gfv_nn_mode_idc | ue(v) |
|         gfv_nn_type_idc | |
|         if( gfv_nn_mode_idc = = 1 ) { /*specify the complete decoder ( )*/ | |
|         while( !byte_aligned( ) ) | |
|             gfv_nn_reserved_zero_bit_a | u(1) |
|         gfv_nn_tag_uri | st(v) |
|         gfv_nn_uri | st(v) |
|         } | |
|     } | |
|     coordinate_present_flag | u(1) |
|     if ( coordinate_present_flag ) { | |
|     coordinate_precision_factor_minus1 | ue(v) |
|     num_coordinates_minus1 | ue(v) |
|     coordinate_z_present_flag | u(1) |
|     if ( coordinate_z_present_flag ) | |
|         coordinate_z_max_value_minus1 | ue(v) |
|     for ( i=0; i< num_coordinates_minus1; i++ ) { | |
|         coordinate_x_abs[ i ] | u(v) |
|         if ( coordinate_x_abs[ i ] ) | |
|             coordinate_x_sign_flag[ i ] | u(1) |
|         coordinate_y_abs[ i ] | u(v) |
|         if ( coordinate_y_abs[ i ] ) | |
|             coordinate_y_sign_flag[ i ] | u(1) |
|         if ( coordinate_z_present_flag ) { | |
|             coordinate_z_abs[ i ] | u(v) |
|             if ( coordinate_z_abs[ i ] ) | |
|                 coordinate_z_sign_flag[ i ] | u(1) |
|         } | |
|     } | |
|     } | |
|     matrix_present_flag | u(1) |
|     if ( matrix_present_flag ) { | |
|     matrix_element_precision_factor_minus1 | ue(v) |
|     num_matrix_types_minus1 | ue(v) |
|     for ( i=0; i <= num_matrix_types_minus1; i++ ) { | |
|         matrix_type_idx[ i ] | u(6) |
|         if ( matrix_type_idx[ i ] == 0 ‖ matrix_type_idx[ i ] == 1) { | |
|         if ( coordinate_present_flag ) | |
|             num_matrices_equal_to_num_coordinates_flag[ i ] | u(1) |
|         if ( !coordinate_present_flag | |
| ‖ !num_matrix_equal_to_num_coordinates_flag[ i ] ) | |
|             num_matrices_info[ i ] | ue(v) |
|         } | |
|         else if ( matrix_type_idx[ i ] == 2 ‖ matrix_type_idx[ i ] == 3 ‖ | |
| matrix_type_idx[ i ] >= 7 ) { | |
|             matrix_width_minus1[ i ] | ue(v) |
|             matrix_height_minus1[ i ] | ue(v) |
|             if ( matrix_type_idx[ i ] >= 7 ) | |
|                 num_matrices_minus1[ i ] | |
|         } | |
|         for ( j=0; j<= num_matrices_minus1[ i ]; j++ ) { | |
|             for ( k=0; k<= matrix_height_minus1[ i ]; k++ ) { | |
|                 for ( l=0;l<= matrix_width_minus1[ i ]; l++ ) { | |
|                     matrix_element_int[ i ][ j ][ k ][ l ] | ue(v) |
|                     matrix_element_dec[ i ][ j ][ k ][ l ] | u (v) |
|                   if ( matrix_element_int[ i][ j ][ k ][ l ] ‖ | |
| matrix_element_dec[ i ][ j ][ k ][ l ] ) | |
|                     matrix_element_sign_flag[ i ][ j ][ k ][ l ] | u(1) |

TABLE 10-continued

An example of syntax of a face video generative compression SEI message

| | Descriptor |
|---|---|
|         } | |
|       } | |
|     } | |
|   } | |
| } | |
|   if(gfv_nn_mode_idc = = 0 ) { | |
|       while( !byte_aligned( ) ) | |
|         gfv_nn_reserved_zero_bit_b | u(1) |
|       for( i = 0; more_data_in_payload( ); i++ ) | |
|         gfv_nn_payload_byte[ i ] | b(8) |
|     } | |
| } | |

The generative face video (GFV) SEI message indicates facial parameters and specifies a neural network, denoted as Generator( ), which may be used to generate novel output pictures using the indicated facial parameters and previously decoded output pictures. The network Generator( ) is further divided into a translator sub-network Translator( ) and a picture generation network Decoder( ). In one example, Translator( ) converts the facial parameters into a flow-map and Decoder( ) generates pictures based on the flow-map output by Translator( ). In another example, Translator( ) translates the facial parameters signaled in the SEI message into a specified type of parameters and Decoder( ) generates pictures based on specified type of facial parameters output by Translator( ).

It is noted that facial parameters can be determined from source pictures prior to encoding.

It is also noted that when the current picture is not a base picture, the GFV SEI message may be used to generate a novel face picture based on the previously decoded base picture, the facial parameters conveyed by the GFV SEI message or the operation fusion picture.

Base and fusion pictures may be coded conforming to Rec. ITU-T H.264, Rec. ITU-T H.265, Rec. ITU-T H.266, etc.

Use of this SEI message requires the definition of the following variables:

Input picture width and height in units of luma samples, denoted herein by CroppedWidth and CroppedHeight, respectively.

Luma sample array baseCroppedYPic and chroma sample arrays baseCroppedCbPic and baseCroppedCrPic for a decoded output picture, denoted as BasePicture, corresponding to a source base picture.

Luma sample array driveCroppedYPic and chroma sample arrays driveCroppedCbPic and driveCroppedCrPic for a decoded output picture, denoted as DrivePicture, corresponding to a source driving picture.

Bit depth BitDepthY for the luma sample array of the input pictures.

Bit depth BitDepthC for the chroma sample arrays, if any, of the input pictures.

gfv_id contains an identifying number that may be used to identify face feature information and specify a neural network that may be used as Generator( ). The value of gfv_id can be in the range of 0 to $2^{32}-2$, inclusive. Values of gfv_id from 256 to 511, inclusive, and from $2^{31}$ to $2^{32}-2$, inclusive, are reserved for future use by ITU-T|ISO/IEC. Decoders encountering a GFV SEI message with gfv_id in the range of 256 to 511, inclusive, or in the range of $2^{31}$ to $2^{32}-2$, inclusive, may ignore the SEI message.

It is noted that different values of gfv_id in different GFV SEI messages can be used to identify different faces when more than one face is present in an output picture, for example.

In some embodiments, gfv_key_present_flag equals 1 indicates that the syntax element gfv_key is present and the syntax elements gfv_nn_mode_idc, gfv_nn_reserved_zero_bit_a, gfv_nn_tag_uri, gfv_nn_uri, gfv_nn_payload_byte[i] are not present. gfv_key_present_flag equals 0 indicates that the syntax element gfv_key is not present and the syntax elements gfv_nn_mode_idc, gfv_nn_reserved_zero_bit_a, gfv_nn_tag_uri, gfv_nn_uri, gfv_nn_payload_byte[i] can be signaled.

In some embodiments, gfv_key indicates a key that may be used to identify the analysis network used to generate the syntax elements of the current generative face video SEI message.

It is noted that the value of gfv_key may be used to determine whether the analysis network at the encoder matches with the generative network at the decoder. The generative network at the decoder may use the SEI message to generate the video pictures only if it recognizes the value of gfv_key. The value of gfv_key may be specified by the applications that rely on matching networks at the encoder and the decoder. For such applications, if the parameters in the received SEI message are extracted with an analysis network that is not matched with the generative network at the decoder, the generative network can ignore the received SEI message.

In some embodiments, a neural network mode indicator can be included in the SEI message for indicating a format of information regarding the neural network. For example, gfv_nn_mode_idc, when equals 0, indicates that the neural network information is contained in the GFV SEI message, and the neural network information is in the format of an ISO/IEC 15938-17 bitstream. gfv_nn_mode_idc equals 1 indicates that the neural network information is identified by the URI indicated by gfv_nn_uri with the format identified by the tag URI gfv_nn_tag_uri.

The value of gfv_nn_mode_idc is in the range of 0 to 255, inclusive. Values of 2 to 255, inclusive, for gfv_nn_mode_idc are reserved for future use by ITU-T ISO/IEC and is not present in bitstreams conforming to ITU-T|ISO/IEC. Decoders conforming to ITU-T|ISO/IEC can ignore GFV SEI messages with gfv_nn_mode_idc in the range of 2 to 255, inclusive.

In some embodiments, a neural network type indicator can be included in the SEI message for indicating a type of a neural network indicated in the SEI message. For example, gfv_nn_type_idc may indicate the type of network contained or indicated by the GFV SEI message.

When gfv_nn_type_idc equals 0, the Generator( ) is contained or indicated in the GFV SEI message. The network is a complete picture generator with a motion estimation module for converting facial parameters into flow map and a frame generation module for reconstructing face image.

When gfv_nn_type_idc equals 1, the Translator( ) is contained or indicated in the GFV SEI message. And the Translator( ) is a network converting the different types of facial parameters signaled in the SEI message into a flow-map for picture generation.

When gfv_nn_type_idc equals 2, the Translator( ) is contained or indicated in the GFV SEI message. And the Translator( ) is a network converting the different types of facial parameters into a specified type of facial parameters.

When gfv_nn_type_idc equals 3, the Decoder ( ) is contained or indicated in the GFV SEI message. Decoder ( ) generates the pictures based on the flow-map or a specified type of facial parameters as input.

gfv_nn_reserved_zero_bit_a is equal to 0.

gfv_nn_tag_uri contains a tag URI with syntax and semantics as specified in IETF RFC 4151 identifying the format and associated information about the neural network used as a base GFV or an update relative to the base GFV with the same gfv_id value specified by gfv_nn_uri.

For example, if gfv_nn_tag_uri equals to "tag:iso.org, 2023:15938-17", then it indicates that the neural network data is identified by gfv_nn_uri conforms to ISO/IEC 15938-17.

In some embodiments, gfv_nn_uri contains a URI with syntax and semantics as specified in IETF Internet Standard 66 identifying the neural network used as a base GFV or an update relative to the base GFV with the same gfv_id value.

coordinate_present_flag equals 1 indicates that the coordinate information of keypoints is present, while coordinate_present_flag equals 0 indicates that coordinate information of keypoints is not present. When it is decided that coordinate information of keypoints is used to code the face picture, the parameter indicators indicate the coordinate information of keypoints can be generated and signaled by the encoder and then received by the decoder, wherein:

coordinate_precision_factor_minus1 plus 1 indicates the length, in bits, of coordinate_x, coordinate_y and coordinate_z.

In some embodiments, the low bound of precision can be larger than 1. For example, it may be k and the syntax element can be changed to coordinate_precision_factor_minusk. coordinate_precision_factor_minusk plus k indicates the length, in bits, of coordinate_x, coordinate_y and coordinate_z num_coordinates_minus1 plus 1 indicates the number of keypoint coordinates. The value of num_coordinates_minus1 is in the range of 0 to $2^{10}-1$, inclusive.

coordinate_z_present_flag equals 1 indicates that z-axis coordinate information of the keypoints is present. coordinate_z_present_flag equals 0 indicates that the z-axis coordinate information of the keypoints is not present. When coordinate_z_present_flag is not present, it is inferred to be 0.

coordinate_z_max_value_minus1 plus 1 indicates the maximum absolute value of z-axis coordinates of keypoints.

In some embodiments, the lower bound of maximum value of z-axis coordinate may be greater than 1. for example, it can be k and the syntax element signaled is changed to coordinate_z_max_value_minusk. coordinate_z_ max_value_minusk plus k indicates the maximum absolute value of z-axis coordinates of keypoints.

coordinate_x_abs[i] specifies the normalized absolute value of x-axis coordinate of the $i^{th}$ keypoint.

coordinate_x_sign_flag[i] specifies the sign of x-axis coordinate of the $i^{th}$ keypoint. When coordinate_x_sign_flag [i] is not present, it is inferred to be equal to 0.

coordinate_y_abs[i] specifies the normalized absolute value of y-axis coordinate of $i^{th}$ keypoint.

coordinate_y_sign_flag[i] specifies the sign of y-axis coordinate of it keypoint. When coordinate_y_sign_flag[i] is not present, it is inferred to be equal to 0.

coordinate_z_abs[i] specifies the normalized absolute value of z-axis coordinate of ii keypoint.

coordinate_z_sign_flag[i] specifies the sign of z-axis coordinate of it key point. When coordinate_z_sign_flag[i] is not present, it is inferred to be equal to 0.

The variable coordiateX[i], coordiateY[i] and coordiateZ [i] indicating the x-axis coordinate, y-axis coordinate and z-axis coordinate of the $i^{th}$ keypoint respectively are derived as follows:

$$coordinateX[i] = \frac{(1 - 2 * coordinate\_x\_sign\_flag[i]) * coordinate\_x\_abs[i] * CroppedWidth}{1 << (coordinate\_precision\_factor\_minus1 + 1)}$$

$$coordinateY[i] = \frac{(1 - 2 * coordinate\_y\_sign\_flag[i]) * coordinate\_y\_abs[i] * CroppedHeight}{1 << (coordinate\_precision\_factor\_minus1 + 1)}$$

$$coordinateZ[i] = \frac{(1 - 2 * coordinate\_z\_sign\_flag[i]) * coordinate\_z\_abs[i] * (coordinate\_z\_max\_value\_minus1 + 1)}{1 << (coordinate\_precision\_factor\_minus1 + 1)}$$

In some embodiments, matrix_present_flag equals 1 indicates that matrix parameters are present, while matrix_present_flag equals 0 indicates that matrix parameters are not present. When it is decided that matrix parameters are used to code the face picture, the parameter indicators indicate the matrix parameters can be generated and signaled by the encoder and then received by the decoder, wherein:

matrix_element_precision_factor_minus1 plus 1 indicates the length, in bits, of matrix_element_dec[i][j][k][1].

num_matrix_types_minus1 plus 1 indicates the number of matrix types signaled in the SEI message. The value of matrix_type_num_minus1 is in the range of 0 to $2^6-1$, inclusive.

matrix_type_idx indicates the index of matrix type as specified in Table 11.

TABLE 11

| Specification of matrix_type_idx | |
| --- | --- |
| Value | Specification |
| 0 | Affine translation matrix with the size of 2*2 or 3*3. |
| 1 | Covariance matrix with size of 2*2 or 3*3. |
| 2 | Mouth matrix representing mouth motion. |
| 3 | Eye matrix representing the open-close status and level of the eyes. |
| 4 | Head rotation paramters with the size of 2*2 or 3*3 representing the head rotation in 2D space or 3D space. |
| 5 | Head translation matrix with the size of 1*2 or 1*3 representing head translation in 2D space or 3D sapce. |
| 6 | Head location matrix with size of 1*2 or 1*3 to locate the face in 2D space or 3D space. |

TABLE 11-continued

Specification of matrix_type_idx

| Value | Specification |
|---|---|
| 7 | Compact feature matrix with the size being specified by matrix_width_minus1[i] and matrix_height_minus1[i]. |
| 8 . . . 31 | Other undefined matrix with the size being specified by matrix_width_minus1[i] and matrix_height_minus1[i]. |
| 32 . . . 63 | Reserverd |

It is noted that the undefined matrix type is used to represent the matrxi type rather than affine translation matrix, covariance matrix, rotation matrix, translation matrix and compact feature matrix. It may be used by the user to extend the matrix type.

num_matrix_equal_to_num_coordinates_flag[i] equals 1 indicates that the number of matrices of the $i^{th}$ matrix type is equal to num_coordinates_minus1+1. num_matrix_equal_ to_num_coordinates_flag[i] equals 0 indicates that the number of matrices of $i^{th}$ matrix is not equal to num_coordinates_minus1+1.

num_matrices_info[i] provides the information to the number of the matrices of the $i^{th}$ matrix type.

matrix_width_minus1[i] plus 1 indicates the width of the matrix of i matrix type.

When matrix_width_minus1[i] is not present, it is inferred as follows:

If matrix_type_idx[i] is equal to 0, 1 or 4, and coordinate_z_present_flag is 1, matrix_width_minus1[i] is inferred to be equal to 2 otherwise, if matrix_type_idx[i] is equal to 0, 1 or 4, and coordinate_z_present_flag is 0, matrix_width_minus1[i] is inferred to be equal to 1 otherwise (matrix_type_idx[i] is equal to 5 or 6), matrix_width_minus1[i] is inferred to be equal to 0 matrix_height_minus1[i] plus 1 indicates the height of the matrix of the $i^{th}$ matrix type.

When matrix_height_minus1[i] is not present, it is inferred as follows:

If matrix_type_idx is equal to 0, 1, 4, 5 or 6, and coordinate_z_present_flag is 1, matrix_height_minus1[i] is inferred to be equal to 2.

otherwise (matrix_type_idx is equal to 0, 1, 4, 5 or 6, and coordinate_z_present_flag is 0), matrix_height_minus1[i] is inferred to be equal to 1.

num_matrices_minus1[i] plus 1 indicates the number of matrices of the it matrix type.

The variable numMatrice[i] indicating the number of the matrices of the it matrix type is derived as follows:

```
if ( matrix_type_idx[ i ] == 0 || matrix_type_idx[ i ] == 1 ) {
    if ( coordinate_present_flag )
    numMatrice[ i ] = num_matrices_equal_to_num_coordinates_flag[ i ] ?
num_coordinates_minus1 + 1 : ( num_matrices_idc[ i ] < num_coordinates_minus1 ?
num_matrices_idc[ i ] + 1 : num_matrices_idc[ i ] + 2 )
        else
            numMatrice[ i ] = num_matrices_idc[ i ] + 1
}
else if ( matrix_type_idx[ i ] >=2 && matrix_type_idx[ i ] < 7)
    numMatrice[ i ] = 1
else
    numMatrice[i] = num_matrices_minus1[i] + 1
``` matrix_element_int[i][j][k][l] indicates the integer part of the value of the matrix element at position (k, l) of the $j^{th}$ matrix of the $i^{th}$ matrix type.

matrix_element_dec[i][j][k][l] indicates the decimal part of the value of the matrix element at position (k, l) of the $j^{th}$ matrix of the $i^{th}$ matrix type.

matrix_element_sign_flag[i][j][k][l] indicates the sign of the matrix element at position (k, l) of the j matrix of the it matrix type. When matrix_element_sign_flag[i][j][k][l] is not present, it is inferred to be equal to 0.

The variable MatrixElementVal[i][j][k][l] representing the value of the matrix element at position (k, l) of the j matrix of the it matrix type is derived as follows:

$$MatrixElementVal[i][j][k][l] =$$

$$(1 - 2 * matrix\_element\_sign\_flag[i][j][k][l]) *$$

$$\left( matrix\_element\_int[i][j][k][l] + \frac{matrix\_element\_dec[i][j][k][l]}{1 << (matrix\_element\_precision\_factor\_minus1 + 1)} \right)$$

The process DeriveInputTensors( ), for deriving the input tensor inputTensorImgY, inputTensorImgCb, inputTesnsorImgCr, inputTensorKeyPoint, inputTensorMatrix is specified as follows:

```
        Initialize inputTensorImgY, inputTensorImgCb, inputTesnsorImgCr,
inputTensorKeyPoint and inputTensorMatrix with 0.
    for ( x = 0; x< CroppedWidth; x++ ) {
        for ( y = 0; y< CroppedHeight; y++ ) {
            inputTsensorImgY[ x ][ y ] = CroppedYPic[ x ][ y ]
        }
    }
    for ( x=0; x< CroppedWidth/ SubWidthC; x++ ) {
        for ( y=0; y< CroppedHeight/ SubHeightC; y++ ) {
            inputTsensorImgCb[ x ][ y ] = CroppedCbPic[ x ][ y ]
            inputTsensorImgCr[ x ][ y ] = CroppedCrPic[ x ][ y ]
        }
    }
    if ( coordinate_present_flag ) {
        for ( i=0; i< =num_coordinates_minus1; i++ ) {
            inputTensorKeyPoint[ i ][ 0 ] = coordiateX[ i ]
            inputTensorKeyPoint[ i ][ 1 ] = coordiateY[ i ]
            if ( coordinate_z_present_flag )
                inputTensorKeyPoint[ i ][ 2 ] = coordiateZ[ i ]
        }
    }
    if ( matrix_present_flag ) {
        for ( i=0; i<=num_matrix_types_minus1; i++ ) {
            for ( j=0; j< numMatrice[ i ]; j++ ) {
                for( k=0; k <= matrix_height_minus1[ i ]; k++ ) {
                    for ( l=0;l<=matrix_width_minus1[ i ]; l++) {
                        inputTensorMatrix[ i ][ j ][ k ][ l ] = MatrixElementVal[ i ][ j][ k][ l ]
                    }
                }
            }
        }
    }
}
```

When gfv_nn_type_idc is equal to 1, the process TranslateTensors ( ) is used to derive input sensor TransTensorFlow for Decoder( ) from the output of Translator( ); when gfv_nn_type_idc is equal to 2, the process Translate Tensors( ) is to derive input sensor TransTensorKeyPoint and TransTensorMatrix for Decoder( ) from the output of Translator( ). The process can be specified as follows:

```
if ( gfv_nn_type_idc == 1 ) {
    for(x=0; x< CroppedWidth/ SubWidthC; x++){
        for(y=0; y< CroppedHeight/ SubHeightC; y++){
            TransTensorFlow [ x ][ y ][0] = outputensorFlow[ x ][ y ] [0]
            TransTensorFlow [ x ][ y ][1] = outputensorFlow[ x ][ y ] [1]
        }
    }
}
if ( gfv_nn_type_idc == 2 ) {
    if ( coordinate_present_flag ) {
        for ( i=0; i< =num_coordinates_minus1; i++ ) {
            TransTensorKeyPoint [ i ][ 0 ] = outputensorKeyPoint [ i ] [ 0 ]
            TransTensorKeyPoint [ i ][ 1 ] = outputensorKeyPoint [ i ] [ 1 ]
            if ( coordinate_z_present_flag )
                TransTensorKeyPoint [ i ][ 2 ] = outputensorKeyPoint [ i ] [ 2 ]
        }
    }
    if ( matrix_present_flag ) {
        for ( i=0; i<=num_matrix_types_minus1; i++ )
            for ( j=0; j< numMatrice[ i ]; j++ )
                for( k=0; k<= matrix_height_minus1[ i ]; k++ )
                    for ( l=0;l<=matrix_width_minus1[ i ]; l++)
                        TransTensorMatrix [ i ][ j ][ k ][ l ] = outputensorMatrix [ i ][ j][ k][ l ]
    }
}
```

The process StoreOutputTensors( ), for deriving sample values in the generated output sample arrays OutputYPic, OutputCbPic, and OutputCrPic from the output tensor outputTensorY, outputTensorCb and outputTensorCr is specified as follows:

```
for(x=0; x< CroppedWidth; x++){
    for(y=0; y< CroppedHeight; y++){
        OutputYPic[ x ][ y ] = outputTensorY[ x ][ y ]
    }
}
for(x=0; x< CroppedWidth/ SubWidthC; x++){
```

-continued

```
    for(y=0; y< CroppedHeight/ SubHeightC; y++){
        OutputCbPic[ x ][ y ] = outputTensorCb[ x ][ y ]
        OutputCdPic[ x][ y ] = outputTensorCr[ x ][ y ]
    }
}
```

The following process is used to generate a video picture. Generator( ) is used to output the picture sample values with parameters signaled in the GFV SEI message and the decoded base picture as inputs. Translator( ) is used to convert the facial parameters signaled in the SEI message into a flow-map or convert the facial parameters signaled in the SEI message into a specified type of facial parameters.

```
if(gfv_nn_mode_idc==0)
{
    DeriveInputTensors( )
    Generator ( inputTensorImgY, inputTensorImgCb,
    inputTesnsorImgCr,
inputTensorKeyPoint, inputTensorMatrix)
    StoreOutputTensors( outputTensor)
}
    else if (gfv_nn_mode_idc == 1)
    {
    DeriveInputTensors( )
    Translator (inputTensorKeyPoint, inputTensorMatrix)
    TranslateTensors(outputensorFlow)
    outputTensor = Decoder ( inputTensorImgY,
    inputTensorImgCb,
inputTesnsorImgCr, TransTensorFlow)
    StoreOutputTensors( )
}
    else if (gfv_nn_mode_idc == 2)
    {
    DeriveInputTensors( )
    Translator (inputTensorKeyPoint, inputTensorMatrix)
    TranslateTensors(outputensorKeyPoint, outputensorMatrix)
    outputTensor = Decoder ( inputTensorImgY,
    inputTensorImgCb,
inputTesnsorImgCr, TransTensorFlow)
    StoreOutputTensors( )
}
}
```

Although the disclosed face video compression and generation method is described above in connection with the SEI message, it is not limited to the SEI message. Rather, it may be realized in other ways. For example, an extension of the current video coding standard or a new standard may be defined to support the proposed generative video compression. The videos may be encoded with the proposed method in a base layer or a high layer. And all the syntax elements, semantic and decoding methods described above are applicable to the extension or new standard.

In some embodiments, the first sub-network is a parameter translator network that translates the facial representation parameters signaled in the SEI message into a fixed format of parameters. and the second sub-network is a generative network that generates the picture based on the fixed format of parameters.

The first sub-network (i.e., the parameter translator network), which is denoted as TranslatorNN( ), may be signaled in the SEI message or indicated by the URI contained in SEI message. A flag is signaled to indicate whether the translator network is signaled or indicated by the SEI message. Additionally, the information on the fixed parameter format (e.g., the number of the keypoints, the number of the matrices and the size of each matrice) output by the parameter translator can also signaled in the SEI message or output by the translator itself.

Moreover, for the signalling of the coordinates of the key-points and the elements of the matrices, the predictive signalling way is supported. That is, the differences between the coordinates of the key-point or the elements of matrices of the current frame and those of the base picture are signaled. Also, a flag is signaled to indicate whether the difference values or the absolute values are signaled.

Figures 11, 12:
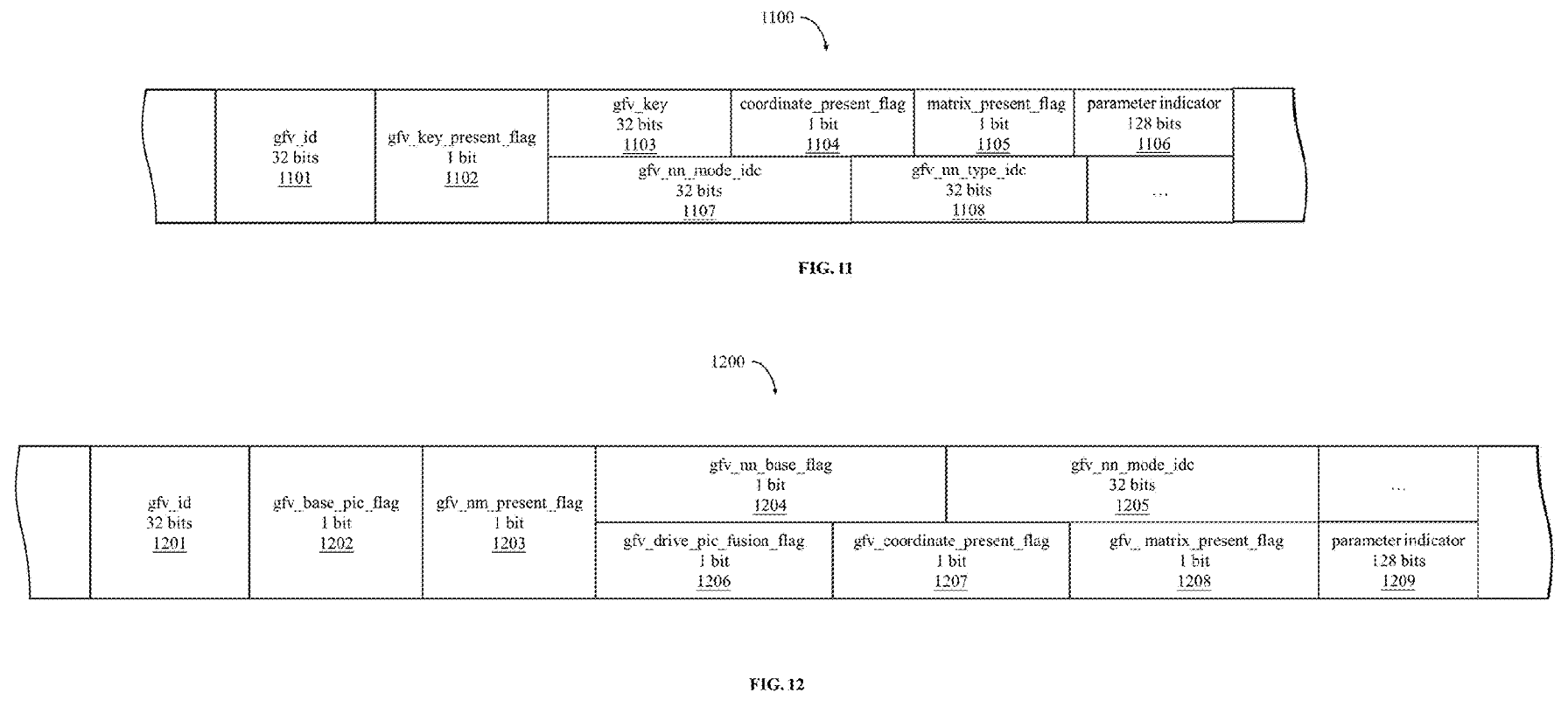

The syntax of a generative face video SEI message shown in Table 10 can be encoded and signaled in a bitstream, and can be further decoded by the decoder. FIG. 11 is a schematic diagram illustrating an exemplary SEI message 1100, according to some embodiments of the present disclosure. As shown in FIG. 11, SEI message 1100 may include, when used to convey the face information parameter, an identifying number indicator (gfv_id) 1101, a key present indicator (gfv_key_present_flag) 1102 indicating the presence of a key indicator, a key indicator (gfv_key) 1103, a coordinate indicator (coordinate_present_flag) 1104, a matrix indicator (matrix_present_flag) 1105, etc. Coordinate indicator 1104 and matrix indicator 1105 are collaboratively signaled. That is, in a proper SEI message 1100, only one of coordinate indicator 1104 and matrix indicator 1105 can be activated. Moreover, parameter indicator 1106 can be generated and signaled in line the activated mode.

In some embodiments, SEI message 1100 may include, when used to convey the configuration of a neural network, an identifying number indicator (gfv_id) 1101, a key present indicator (gfv_key_present_flag) 1102 indicating the absence of a key indicator, a neural network mode indicator (gfv_nn_mode_idc) 1107, a neural network type indicator (gfv_nn_type_idc) 1108, etc. The corresponding bit length of these parameters are also shown in FIG. 11 as an example. As appreciated, the bit length of these parameters can be otherwise designed. The other parameters are not shown in FIG. 11 to avoid causing any ambiguity.

An example of the syntax of the common SEI message for generative face video is shown in Table 12. As shown in Table 12, an identifying number indicator gfv_id can be generated by an encoder and signaled to a decoder. In some embodiments, gfv_id can be used to indicate whether the SEI is used to code the face picture.

As described above, the face picture can be reconstructed based on a base picture. Hence, the pictures encoded and signaled to the decoder can be classified as the base pictures or the pictures that are used to generate the face information parameter (also referred to as driving picture herein). It is appreciated that the face information parameter may not signalled in the SEI message associated with a base picture. Hence, the SEI message associated with a base picture can be used to set (initialize or update) the neural network at the decoder's side.

In some embodiments, a base picture indicator (e.g., gfv_base_pic_flag as described below) can be included in the SEI message for indicating the current SEI message is associated with a base picture. Referencing back to FIG. 7A, in step 706, the decoder may determine the SEI message is applied to the neural network for generating a face picture when the base picture indicator indicates that the current SEI message is not associated with a base picture. Otherwise, the decoder may determine that the current SEI message does not contain any face information parameters.

In some embodiments, when it is determined that the current SEI message is associated with a base picture, the current SEI message may be used to set (initialize or update) the neural network at the decoder's side. In addition, a neural present indicator (e.g., gfv_nn_present_flag as described below) can be included in the SEI message for indicating whether information of the first sub-network is indicated by the SEI message. In some embodiments, the first sub-network can be set (initialized or updated) based on the neural network indicator (e.g., gfv_nn_base_flag, gfv_nn_mode_idc) when the base picture indicator indicates that the SEI message is associated with a base picture and the neural network present indicator indicates that the information of the first sub-network is indicated by the SEI message.

TABLE 12

| An example of syntax of the face video generative compression SEI message | Descriptor |
|---|---|
| generative_face_video ( payloadSize ) { | |
|   gfv_id | ue(v) |
|   gfv_base_pic_flag /*indicate if current decoded output picture is a base picture*/ | u(1) |
|   if( gfv_base_pic_flag ) { /*specify TranslatorNN( )*/ | |
|     gfv_nn_present_flag | u(1) |
|     if( gfv_nn_present_flag ) { | |
|       gfv_nn_base_flag | u(1) |
|       gfv_nn_mode_idc | ue(v) |
|       if( gfv_nn_mode_idc = = 1 ) { | |
|         while( !byte_aligned( ) ) | |
|           gfv_nn_reserved_zero_bit_a | u(1) |
|         gfv_nn_tag_uri | st(v) |
|         gfv_nn_uri | st(v) |
|       } | |
|     } | |
|   } else /* current decoded output picture is a driving picture*/ | |
|     gfv_drive_pic_fusion_flag /*indicate if DrivePicture is input to GenerativeNN( )*/ | ue(v) |
|   gfv_coordinate_present_flag | u(1) |
|   if( gfv_coordinate_present_flag ) { | |
|     gfv_coordinate_precision_factor_minus1 | ue(v) |
|     gfv_num_kp_minus1 | ue(v) |
|     gfv_kp_pred_flag | u(1) |
|     gfv_coordinate_z_present_flag | u(1) |
|     if(gfv_coordinate_z_present_flag ) | |
|       gfv_coordinate_z_max_value_minus1 | ue(v) |
|     for( i= 0; i <= num_kp_minus1; i++ ) { | |
|       if(!gfv_kp_pred_flag) { | |
|         gfv_coordinate_x_abs[ i ] | u(v) |
|         if( gfv_coordinate_x_abs[ i ] ) | |
|           gfv_coordinate_x_sign_flag[ i ] | u(1) |
|         gfv_coordinate_y_abs[ i ] | u(v) |
|         if( gfv_coordinate_y_abs[ i ] ) | |
|           gfv_coordinate_y_sign_flag[ i ] | u(1) |
|         if( gfv_coordinate_z_present_flag ) { | |
|           gfv_coordinate_z_abs[ i ] | u(v) |
|           if( gfv_coordinate_z_abs[ i ] ) | |
|             gfv_coordinate_z_sign_flag[ i ] | u(1) |
|         } | |
|       } else { | |
|         gfv_coordinate_dx_abs[ i ] | u(v) |
|         if(gfv_coordinate_dx_abs[ i ] ) | |
|           gfv_coordinate_dx_sign_flag[ i ] | u(1) |
|         gfv_coordinate_dy_abs[ i ] | u(v) |
|         if( gfv_coordinate_dy_abs[ i ] ) | |
|           gfv_coordinate_dy_sign_flag[ i ] | u(1) |
|         if( gfv_coordinate_z_present_flag ) { | |
|           gfv_coordinate_dz_abs[ i ] | u(v) |
|           if( gfv_coordinate_dz_abs[ i ] ) | |
|             gfv_coordinate_dz_sign_flag[ i ] | u(1) |
|         } | |
|       } | |
|     } | |
|   } | |
|   gfv_matrix_present_flag | u(1) |
|   if(gfv_matrix_present_flag ) { | |
|     gfv_matrix_element_precision_factor_minus1 | ue(v) |
|     gfv_num_matrix_types_minus1 | ue(v) |
|     if( !gfv_base_pic_flag ) | |
|       gfv_matrix_pred_flag | u(1) |
|     for( i = 0; i <= num_matrix_types_minus1; i++ ) { | |
|       gfv_matrix_type_idx[ i ] | u(6) |
|       if( gfv_matrix_type_idx[ i ] = = 0 || gfv_matrix_type_idx[ i ] = = 1 ) { | |
|         if( gfv_coordinate_present_flag ) | |
|           gfv_num_matrices_equal_to_num_kps_flag[ i ] | u(1) |
|   if( !gfv_coordinate_present_flag || !gfv_num_matrix_equal_to_num_kps_flag[ i ] ) | |
|         gfv_num_matrices_info[ i ] | ue(v) |
|       }else | |
|   if( gfv_matrix_type_idx[ i ] = = 2 || gfv_matrix_type_idx[ i ] = = 3 || gfv_matrix_type_idx[ i ] >= 7 ){ | |
|       if( gfv_matrix_type_idx[ i ] >= 7 ) | |
|         gfv_num_matrices_minus1[ i ] | ue(v) |
|       gfv_matrix_width_minus1[ i ] | ue(v) |
|       gfv_matrix_height_minus1[ i ] | ue(v) |

TABLE 12-continued

An example of syntax of the face video generative compression SEI message

| | Descriptor |
|---|---|
| }else | |
| if( gfv_matrix_type_idx[ i ] >= 4 && gfv_matrix_type_idx[ i ] <= 6 && !gf | |
| v_coordinate_present_flag ){ | |
|     gfv_matrix_for_3D_space_flag[ i ] | u(1) |
|     for( j = 0; j < numMatrices[ i ]; j++ ) | |
|     for( k = 0; k < matrixHeight[ i ]; k++ ) | |
|      for( m = 0; m <matrixWidth[ i ]; m++ ) { | |
|       if( !gfv_matrix_pred_flag ) { | |
|        gfv_matrix_element_int[ i ][ j ][ k ][ m ] | ue(v) |
|        gfv_matrix_element_dec[ i ][ j ][ k ][ m ] | u (v) |
|    if( gfv_matrix_element_int[ i][ j ][ k ][ m ] || gfv_matrix_element_dec[ i ][ j ] | |
| [ k ][ m ] ) | |
|         gfv_matrix_element_sign_flag[ i ][ j ][ k ][ m ] | u(1) |
|       } | |
|       else { | |
|        gfv_matrix_delta_element_int[ i ][ j ][ k ][ m ] | |
|        gfv_matrix_delta_element_dec[ i ][ j ][ k ][ m ] | |
|    if( gfv_matrix_element_int[ i][ j ][ k ][ m ] || gfv_matrix_element_dec[ i ][ j ] | |
| [ k ][ m ] ) | |
|         gfv_matrix_delta_element_sign_flag[ i ][ j ][ k ][ m ] | |
|       } | |
|      } | |
|     } | |
|   } | |
| } | |
| if( gfv_nn_present_flag ) { | |
|   gfv_nn_output_info_present_flag | |
|   if( gfv_nn_output_info_present_flag { | |
|    gfv_nn_output_num_kps | ue(v) |
|    gfv_nn_output_num_matrices | ue(v) |
|    for( i=0; i< gfv_nn_output_matrix_num; i++) { | |
|     gfv_nn_output_matrix_width_minus1[ i ] | ue(v) |
|     gfv_nn_output_matrix_height_minus1[ i ] | ue(v) |
|    } | |
|   } | |
| } | |
| if( gfv_nn_present_flag ) | |
|   if( gfv_nn_mode_idc = = 0 ) { | |
|   while( !byte_aligned( ) ) | |
|    gfv_nn_reserved_zero_bit_b | u(1) |
|   for( i = 0; more_data_in_payload( ); i++ ) | |
|    gfv_nn_payload_byte[ i ] | b(8) |
|   } | |
| } | |

The generative face video (GFV) SEI message indicates facial parameters and specifies a facial parameter translator network, denoted as TranslatorNN( ), that may be used to convert various formats of facial parameters signaled in the SEI message into a fixed format of parameters, and a face picture generator neural network, denoted as Generative NN( ), that may be used to generate output pictures using the fixed format of facial parameters and previously decoded output pictures.

It is noted that facial parameters could be determined from source pictures prior to encoding. Such source pictures may be referred to as driving pictures.

Moreover, previously decoded output pictures input to GenerativeNN( ) may be a base picture (a decoded output picture that provides the reference texture from which the face pictures may be generated) and an optional picture that can be fused by GenerativeNN( ) to improve background texture and facial details. When the current picture is not a base picture, the GFV SEI message may be used to generate a face picture based on the previously decoded base picture, the facial parameters conveyed by the GFV SEI message and the optional current decoded picture for fusion purpose.

Use of this SEI message requires the definition of the following variables:

Input picture width and height in units of luma samples, denoted herein by CroppedWidth and CroppedHeight, respectively.

Luma sample array baseCroppedYPic and chroma sample arrays baseCroppedCbPic and baseCroppedCrPic for a decoded output picture, denoted as BasePicture, corresponding to a source base picture.

Luma sample array driveCroppedYPic and chroma sample arrays driveCroppedCbPic and drive-CroppedCrPic for a decoded output picture, denoted as DrivePicture, corresponding to a source driving picture.

Bit depth $BitDepth_Y$ for the luma sample array of the input pictures.

Bit depth $BitDepth_C$ for the chroma sample arrays, if any, of the input pictures.

A chroma format indicator, denoted herein by Chroma-FormatIdc, as described in subclause 7.3.

The variables SubWidthC and SubHeightC are derived from ChromaFormatIdc.

gfv_id contains an identifying number that may be used to identify face feature information and specify a neural network that may be used as GenerativeNN( ). The value of gfv_id can be in the range of 0 to $2^{32}-2$, inclusive. Values of gfv_id from 256 to 511, inclusive, and from $2^{31}$ to $2^{32}-2$, inclusive, are reserved for future use by ITU-T ISO/IEC. Decoders encountering a GFV SEI message with gfv_id in the range of 256 to 511, inclusive, or in the range of 231 to $2^{32}--2$, inclusive, may ignore the SEI message.

It is noted that different values of gfv_id in different GFV SEI messages could be used to identify different faces when more than one face is present in an output picture, for example.

In some embodiments, gfv_base_pic_flag equals 1 indicates that the current decoded output picture corresponds to a base picture. gfv_base_pic_flag equals 0 indicates that the current decoded output picture does not correspond to a base picture.

The following constraints apply to the value of gfv_base_pic_flag:

When a GFV SEI message is the first GFV SEI message, in decoding order, that has a particular gfv_id value within the current CLVS, the value of gfv_base_pic_flag can be equal to 1.

When a GFV SEI message that has a particular gfv_id value has gfv_base_pic_flag being equal to 0, this SEI message pertains to the current decoded picture and all subsequent decoded pictures of the current layer, in output order, until the end of the current CLVS or up to but excluding the decoded picture that follows the current decoded picture in output order within the current CLVS and is associated with a subsequent GFV SEI message, in decoding order, having gfv_base_pic_flag equal to 0 and that particular gfv_id value within the current CLVS, whichever is earlier.

In some embodiments, gfv_nn_present_flag equals 1 indicates that a neural network that may be used as a TranslatorNN( ) is contained or indicated by the SEI message. gfv_nn_present_flag equals 0 indicates that a neural network that may be used as a TranslatorNN( ) is not contained or indicated by the SEI message.

gfv_nn_base_flag, gfv_nn_mode_idc, gfv_nn_reserved_zero_bit_a, gfv_nn_tag_uri, gfv_nn_uri, gfv_nn_payload_byte[i] specify a neural network that may be used as a TranslatorNN( ). gfv_nn_base_flag, gfv_nn_mode_idc, gfv_nn_reserved_zero_bit_a, gfv_nn_tag_uri, gfv_nn_uri, gfv_nn_payload_byte[i] have the same syntax and semantics as nnpfc_base_flag, nnpfc_mode_idc, nnpfc_reserved_zero_bit_a, nnpfc_tag_uri, nnpfc_uri, nnpfc_payload_byte[i], respectively.

In some embodiments, gfv_drive_pic_fusion_flag, when present, equals 1 indicates that the current decoded picture, which corresponds to a driving picture that may be used for fusion, may be input to GenerativeNN( ). gfv_drive_pic_fusion_flag equals 0 indicates that the current decoded picture should not be input to GenerativeNN( ).

It is noted that a gfv_drive_pic_fusion_flag value of 1 can be used, for example, to indicate that the current decoded picture can be used to improve face details or handle background changes.

It is noted that fusion takes the three inputs: the base picture, features from keypoints or matrices carried in the GFV SEI message, and the current decoded picture, and outputs a picture.

It is noted that when current decoded picture corresponds to a driving picture, it should be marked as not for output purpose.

gfv_coordinate_present_flag equals 1 indicates that coordinate information of keypoints is present. gfv_coordinate_present_flag equals 0 indicates that coordinate information of keypoints is not present.

It is a requirement of bitstream conformance that when gfv_matrix_type_idx[i] for any i from 0 to gfv_num_matrix_types_minus1 is equal to 0 or 1, the value of gfv_coordinate_present_flag can be equal to 1.

gfv_coordinate_precision_factor_minus1 plus 1 indicates the length, in bits, of gfv_coordinate_x_abs[i], gfv_coordinate_y_abs[i] and gfv_coordinate_z_abs[i].

gfv_num_kps_minus1 plus 1 indicates the number of keypoints. The value of gfv_num_kp_minus1 can be in the range of 0 to $2^{11}-1$, inclusive.

gfv_kp_pred_flag equals 1 indicates that syntax elements gfv_coordinate_dx_abs[i], gfv_coordinate_dy_abs[i], and gfv_coordinate_dz_abs[i] are present and syntax elements gfv_coordinate_dx_sign_flag[i], gfv_coordinate_dy_sign_flag[i] and gfv_coordinate_dz_sign_flag[i] may be present. gfv_kp_pred_flag equals 0 indicates that gfv_coordinate_x_abs[i], gfv_coordinate_y_abs[i], and gfv_coordinate_z_abs[i] are present and syntax elements gfv_coordinate_x_sign_flag[i], gfv_coordinate_y_sign_flag[i] and gfv_coordinate_z_sign_flag[i] may be present.

gfv_coordinate_z_present_flag equals 1 indicates that z-axis coordinate information of the keypoints is present. coordinate_z_present_flag equals 0 indicates that the z-axis coordinate information of the keypoints is not present.

gfv_coordinate_z_max_value_minus1 plus 1 indicates the maximum absolute value of z-axis coordinates of keypoints.

gfv_coordinate_x_abs[i] indicates the normalized absolute value of the x-axis coordinate of the $i^{th}$ keypoint.

gfv_coordinate_x_sign_flag[i] specifies the sign of the x-axis coordinate of the $i^{th}$ keypoint. When gfv_coordinate_x_sign_flag[i] is not present, it is inferred to be equal to 0.

gfv_coordinate_y_abs[i] specifies the normalized absolute value of y-axis coordinate of $i^{th}$ keypoint.

gfv_coordinate_y_sign_flag[i] specifies the sign of the y-axis coordinate of the $i^{th}$ keypoint. When gfv_coordinate_y_sign_flag[i] is not present, it is inferred to be equal to 0.

gfv_coordinate_z_abs[i] specifies the normalized absolute value of z-axis coordinate of the $i^{th}$ keypoint.

gfv_coordinate_z_sign_flag[i] specifies the sign of the z-axis coordinate of the $i^{th}$ key point. When gfv_coordinate_z_sign_flag[i] is not present, it is inferred to be equal to 0.

gfv_coordinate_dx_abs[i] indicates the absolute difference value of the normalized value of the x-axis coordinate of the $i^{th}$ keypoint.

gfv_coordinate_dx_sign_flag[i] specifies the sign of the difference value of the x-axis coordinate of the $i^{th}$ keypoint. When gfv_coordinate_dx_sign_flag[i] is not present, it is inferred to be equal to 0.

gfv_coordinate_dy_abs[i] specifies the absolute difference value of the normalized y-axis coordinate of the $i^{th}$ keypoint.

gfv_coordinate_dy_sign_flag[i] specifies the sign of the difference value of the y-axis coordinate of the $i^{th}$ keypoint. When gfv_coordinate_yd_sign_flag[i] is not present, it is inferred to be equal to 0.

gfv_coordinate_dz_abs[i] specifies the absolute difference value of the normalized z-axis coordinate of the $i^{th}$ keypoint.

gfv_coordinate_dz_sign_flag[i] specifies the sign of the difference value of the z-axis coordinate of the $i^{th}$ key point. When gfv_coordinate_dz_sign_flag[i] is not present, it is inferred to be equal to 0.

The variables coordinateDeltaX[i], coordinateDeltaY[i] and coordinateDeltaZ[i] indicating the delta x-axis coordinate, delta y-axis coordinate and delta z-axis 114 coordinate of the $i^{th}$ keypoint, respectively, are derived as follows:

$$coordinateDeltaX[i] = \frac{(1 - 2 * gfv\_coordinate\_dx\_sign\_flag[i]) * gfv\_coordinate\_dx\_abs[i] * CroppedWidth}{1 << (gfv\_coordinate\_precision\_factor\_minus1 + 1)}$$

$$coordinateDeltaY[i] = \frac{(1 - 2 * gfv\_coordinate\_dy\_sign\_flag[i]) * gfv\_coordinate\_dy\_abs[i] * CroppedHeight}{1 << (gfv\_coordinate\_precision\_factor\_minus1 + 1)}$$

-continued $$coordinateDeltaZ[i] = \frac{(1 - 2 * coordinate\_dz\_sign\_flag[i]) * gfv\_coordinate\_dz\_abs[i] * (gfv\_coordinate\_z\_max\_value\_minus1 + 1)}{1 << (gfv\_coordinate\_precision\_factor\_minus1 + 1)}$$

The variables coordinateX[i], coordinateY[i] and coordinateZ[i] indicating the x-axis coordinate, y-axis coordinate and z-axis coordinate of the $i^{th}$ keypoint, respectively, are derived as follows:

---

When gfv_kp_pred_flag is equal to 0, $$coordinateX[i] = \frac{(1 - 2 * gfv\_coordinate\_x\_sign\_flag[i]) * gfv\_coordinate\_dx\_abs[i] * CroppedWidth}{1 << (gfv\_coordinate\_precision\_factor\_minus1 + 1)}$$

$$coordinateY[i] = \frac{(1 - 2 * gfv\_coordinate\_y\_sign\_flag[i]) * gfv\_coordinate\_dy\_abs[i] * CroppedHeight}{1 << (gfv\_coordinate\_precision\_factor\_minus1 + 1)}$$

$$coordinateZ[i] = \frac{(1 - 2 * gfv\_coordinate\_z\_sign\_flag[i]) * gfv\_coordinate\_dz\_abs[i] * (gfv\_coordinate\_z\_max\_value\_minus1 + 1)}{1 << (gfv\_coordinate\_precision\_factor\_minus1 + 1)}$$

when gfv_kp_pred_flag is equal to 1,
if( gfv_base_pic_flag ) {
   coordinateX[ i ] = (( i > 0 ) ? coordinateX[ i − 1 ] : 0 ) + coordinateDeltaX[ i ]
   coordinateY[ i ] = (( i > 0) ? coordinateY[ i − 1 ] : 0 ) + coordinateDeltaY[ i ]
   coordinateZ[ i ] = ((i > 0) ? coordinateZ[ i − 1 ] : 0) + coordinateDeltaZ[ i ]
}
else {
   coordinateX[ i ] = BaseKpCoordinateX[ i ] + coordinateDeltaX[ i ]
   coordinateY[ i ] = BaseKpCoordinate Y[ i ] + coordinateDeltaY[ i ]
   coordinateZ[ i ] = BaseKpCoordinateZ[ i ] + coordinateDeltaZ[ i ]
}
   where BaseKpCoordinateX[ i ], BaseKpCoordinate Y[ i ], BaseKpCoordinateZ[ i ]
indicating the x-axis, y-axis and z-axis coordinates, respectively, of the $i^{th}$ keypoint for the base
picture are derived as follows:
  if( gfv_base_pic_flag ) {
    BaseKpCoordinateX[ i ] = coordinateX[ i ]
    BaseKpCoordinateY[ i ] = coordinateY[ i ]
    BaseKpCoordinateZ[ i ] = coordinateZ[ i ]
  }

--- gfv_matrix_present_flag equals 1 indicates that matrix parameters are present. gfv_matrix_present_flag equals 0 indicates that matrix parameters are not present.

gfv_matrix_element_precision_factor_minus1 plus 1 indicates the length, in bits, of gfv_matrix_element_dec[i][j][k][m].

gfv_num_matrix_types_minus1 plus 1 indicates the number of matrix types signalled in the SEI message. The value of gfv_matrix_type_num_minus1 can be in the range of 0 to $2^6 - 1$, inclusive.

gfv_matrix_pred_flag equals 1 indicates that syntax elements gfv_matrix_element_int[i][j][k][m], gfv_matrix_element_dec[i][j][k][m], gfv_matrix_element_sign_flag[i][j][k][m] may be present. gfv_matrix_pred_flag equals 0 indicates that gfv_matrix_delta_element_int[i][j][k][m], gfv_matrix_delta_element_dec[i]j[k][m] are present and syntax element gfv_matrix_delta_element_sign_flag[i]j[k][m] may be present. When gfv_matrix_pred_flag is not present, the value of gfv_matrix_pred_flag is inferred to be 0.

gfv_matrix_type_idx[i] indicates the index of the it matrix type as specified in the following Table 13.

TABLE 13

| Value | Specification |
|---|---|
| | Specification of gfv_matrix_type_idx |
| 0 | Affine translation matrix with the size of 2*2 or 3*3. |
| 1 | Covariance matrix with size of 2*2 or 3*3. |
| 2 | Mouth matrix representing mouth motion. |
| 3 | Eye matrix representing the open-close status and level of eyes. |
| 4 | Head rotation paramters with the size of 2*2 or 3*3 representing the head rotation in 2D space or 3D space. |
| 5 | Head translation matrix with the size of 1*2 or 1*3 representing head translationin 2D space or 3D space. |
| 6 | Head location matrix with size of 1*2 or 1*3 representing the head location in 2D space or 3D space. |
| 7 | Compact feature matrix with the size being specified by gfv_matrix_width_minus1[i] and gfv_matrix_height_minus1[i]. |
| 8 ... 31 | Other matrix that may be used as determined by the application with the size being specified by gfv_matrix_width_minus1[i] and gfv_matrix_height_minus1[i]. |
| 32 ... 63 | Reserved |

It is noted that the undefined matrxi type is used to represent the matrxi type rather than affine translation matrix, covariance matrix, rotation matrix, translation matrix and compact feature matrix. It is may be used by the user to extend the matrix type.

gfv_num_matrices_equal_to_num_kps_flag[i] equals 1 indicates that the number of matrices of the $i^{th}$ matrix type is equal to gfv_num_kps_minus1+1. gfv_num_matrices_equal_to_num_kps_flag[i] equals 0 indicates that the number of matrices of the it matrix type is not equal to gfv_num_coordinates_minus1+1. gfv_num_matrices_info[i] provides information to derive the number of the matrices of the it matrix type.

gfv_matrix_width_minus1[i] plus 1 indicates the width of the matrix of the $i^{th}$ matrix type.

gfv_matrix_height_minus1[i] plus 1 indicates the height of the matrix of the it matrix type.

gfv_matrix_for_3D_space_flag[i] equals 1 indicates that the matrix of the it matrix type is a matrix defined in three-dimensional space. gfv_matrix_for_3D_space_flag[i] equals 0 indicates that the matrix of the $i^{th}$ matrix type is a matrix defined in two-dimensional space.

When gfv_matrix_width_minus1[i] is not present, it is inferred as follows:

If gfv_matrix_type_idx[i] is equal to 0, 1 or 4, and one of coordinate_z_present_flag and gfv_matrix_for_3D_space_flag[i] is present and equal to 0, gfv_matrix_width_minus1[i] is inferred to be equal to 1 otherwise (matrix_type_idx[i] is equal to 5 or 6), gfv_matrix_width_minus1[i] is inferred to be equal to 0

When gfv_matrix_height_minus1[i] is not present, it is inferred as follows:

If matrix_type_idx is equal to 0, 1, 4, 5 or 6, and one of gfv_coordinate_z_present_flag and gfv_matrix_for_3D_space_flag[i] is present and equal to 1, gfv_matrix_height_minus1[i] is inferred to be equal to 2.

otherwise (gfv_matrix_type_idx is equal to 0, 1, 4, 5 or 6, and one of gfv_coordinate_z_present_flag and gfv_matrix_for_3D_space_flag[i] is 0), gfv_matrix_height_minus1[i] is inferred to be equal to 1.

The variables matrixWidth[i] and matrixHeight[i] indicating the width and height of the matrix of the $i^{th}$ matrix type are derived as follows:

$$matrixWidth[i]=gfv\_matrix\_width\_minus1[i]+1$$

$$matrixHeight[i]=gfv\_matrix\_height\_minus1[i]+1$$

gfv_num_matrices_minus1[i] plus 1 indicates the number of matrices of the it matrix type.

The variable numMatrices[i] indicating the number of the matrices of the it matrix type is derived as follows:

```
if( gfv_matrix_type_idx[ i ] == 0 || gfv_matrix_type_idx[ i ] == 1 ) {
    if( gfv_coordinate_present_flag )
        numMatrices[ i ] = gfv_num_matrices_equal_to_num_kps_flag[ i ] ?
gfv_num_kps_minus1 + 1 : ( gfv_num_matrices_info[ i ] < gfv_num_kp_minus1 ?
gfv_num_matrices_info [ i ] + 1 : gfv_num_matrices_info [ i ] + 2 )
    else
        numMatrices[ i ] = gfv_num_matrices_info[ i ] + 1
}
else if( gfv_matrix_type_idx[ i ] >= 2 && gfv_matrix_type_idx[ i ] < 7)
    numMatrices[ i ] = 1
else
    numMatrices[ i ] = gfv_num_matrices_minus1[ i ] + 1
``` gfv_matrix_for_3D_space_flag[i] is present and equal to 1, gfv_matrix_width_minus1[i] is inferred to be equal to 2 otherwise, if matrix_type_idx[i] is equal to 0, 1 or 4, and one of coordinate_z_present_flag and In some of the disclosed embodiments, position (k, m) represents position at the $k^{th}$ row and $m^{th}$ column of the matrix.

gfv_matrix_element_int[I][j][k][m] indicates the integer part of the value of the matrix element at position (k, m) of the $j^{th}$ matrix of the $i^{th}$ matrix type.

gfv_matrix_element_dec[i][j][k][m] indicates the decimal part of the value of the matrix element at position (k, m) of the $j^{th}$ matrix of the it matrix type.

gfv_matrix_element_sign_flag[i][j][k][m] indicates the sign of the matrix element at position (k, m) of the j matrix of the it matrix type. When gfv_matrix_element_sign_flag [i][j][k][m] is not present, it is inferred to be equal to 0.

gfv_matrix_element_int[i][j][k][m] indicates the integer part of the difference value of the matrix element at position (k, m) of the $j^{th}$ matrix of the $i^{th}$ matrix type.

gfv_matrix_element_dec[i][j][k][m] indicates the decimal part of the difference value of the matrix element at position (k, m) of the $j^{th}$ matrix of the $i^{th}$ matrix type.

gfv_matrix_element_sign_flag[i][j][k][m] indicates the sign of the difference value of the matrix element at position (k, m) of the $j^{th}$ matrix of the $i^{th}$ matrix type. When gfv_matrix_element_sign_flag[i][j][k][m] is not present, it is inferred to be equal to 0.

gfv_matrix_pred_flag indicates whether the element values of the matrices are signaled in a predictive way. If the flag is equal to 1, the difference of the element values of the matrices are signaled. The signaled difference value may be the differences between the element values of the matrices of the current picture and the element values of the matrices of the base picture. Alternatively, the signaled different value may be the difference between a value of an element of a matrix of a picture and a value of a previous element of the matrix of the picture. Also, first differences between the element values of the matrices of the current picture and the element values of the matrices of the base picture can be derived first, and then a second difference between the first difference value of a matrix element and the first difference value of a previous matrix element is derived and signaled.

As an example, the variable matrixElementDeltaVal[i][j] [k][m] representing the difference value of the matrix element at position (k, m) of the $j^{th}$ matrix of the $i^{th}$ matrix type is derived as follows:

$$matrixElementDeltaVal[i][j][k][m] =$$
$$(1 - 2 * \text{gfv\_matrix\_delta\_element\_sign\_flag}[i][j][k][m]) *$$
$$\left(\text{gfv\_matrix\_delta\_element\_int}[i][j][k][m] + \frac{\text{gfv\_matrix\_delta\_element\_dec}[i][j][k][m]}{1 << (\text{gfv\_matrix\_element\_precision\_factor\_minus1} + 1)}\right)$$

The variable matrixElementVal[i][j][k][m] representing the value of the matrix element at position (k, m) of the $j^{th}$ matrix of the $i^{th}$ matrix type is derived as follows:

--- when gfv_matrix_pred_flag is equal to 0:

$$matrixElementVal[i][j][k][m] =$$
$$(1 - 2 * \text{gfv\_matrix\_element\_sign\_flag}[i][j][k][m]) *$$
$$\left(\text{gfv\_matrix\_element\_int}[i][j][k][m] + \frac{\text{gfv\_matrix\_element\_dec}[i][j][k][m]}{1 << (\text{gfv\_matrix\_element\_precision\_factor\_minus1} + 1)}\right)$$

when gfv_matrix_pred_flag is equal to 1:
matrixElementVal[ i][ j ][ k ][ m ] = BaseMatrixElementVal[ i][ j ][ k ][ m ] +
matrixElementDeltaVal[ i][ j ][ k ][ m ] +
if( gfv_base_pic_flag )
  BaseMatrixElementVal[ i][ j ][ k ][ m ] = matrixElementVal[ i][ j ][ k ][ m ]

---

In another example, the variable matrixElementDeltaVal [i][j][k][m] representing the difference value of the matrix element at position (k, m) of the $j^{th}$ matrix of the $i^{th}$ matrix type is derived as follows:

$$matrixElementDeltaVal[i][j][k][m] =$$
$$(1 - 2 * \text{gfv\_matrix\_delta\_element\_sign\_flag}[i][j][k][m]) *$$
$$\left(\text{gfv\_matrix\_delta\_element\_int}[i][j][k][m] + \frac{\text{gfv\_matrix\_delta\_element\_dec}[i][j][k][m]}{1 << (\text{gfv\_matrix\_element\_precision\_factor\_minus1} + 1)}\right)$$

The variable matrixElementVal[i][j][k][m] representing the value of the matrix element at position (k, m) of the $j^{th}$ matrix of the $i^{th}$ matrix type is derived as follows:

--- when gfv_matrix_pred_flag is equal to 0

$$matrixElementVal[ i][ j ][ k ][ m ] =$$

-continued $$(1 - 2 * gfv\_matrix\_element\_sign\_flag[\,i\,]\,[\,j\,][\,k\,][\,m\,]) *$$

$$\left(gfv\_matrix\_element\_int[\,i\,][\,j\,][\,k\,][\,m\,] + \right.$$

$$\left. \frac{gfv\_matrix\_element\_dec[\,i\,][\,j\,][\,k\,][\,m\,]}{1 << (gfv\_matrix\_element\_precision\_factor\_minus1 + 1)}\right)$$

```
    when gfv_matrix_pred_flag is equal to 1
matrixElementVal[ i][ j ][ k ][ m ] = BaseMatrixElementVal[ i][ j ][ k ][ m ] +
matrixElementDeltaVal[ i][ j ][ k ][ m ] +
if( gfv_base_pic_flag ) {
    for( k = 0; k < matrixHeight[ i ]; k++) {
        for( m = 0; m <matrix Width[ i ]; m++ ) {
            tempVal[ i][ j ][ k ][ m ] = ((k = = 0) ? matrixElementVal[ i][ j ][ k ][ m ]
:
(tempVal[ i][ j ][ k-1 ][ m ] + matrixElementVal[ i][ j ][ k ][ m ]))
        }
    }
    for( k = 0; k < matrixHeight[ i ]; k++) {
        for( m = 0; m <matrixWidth[ i ]; m++ ) {
            BaseMatrixElementVal[ i][ j ][ k ][ m ] = ((m = = 0) ?
tempVal[ i][ j ][ k ][ m ] : (BaseMatrixElementVal [ i][ j ][ k-1 ][ m ] +
tempVal[ i][ j ][ k ][ m ]))
        }
    }
}
```

In some embodiments, gfv_nn_output_info_present_flag equals 1 indicates that the syntax elements gfv_nn_output_num_kps, gfv_nn_output_num_matrices, gfv_nn_output_matrix_width_minus1[i] and gfv_nn_output_matrix_height_ minus1[i] may be present. gfv_nn_output_info_present_ flag equals 0 indicates that the syntax elements gfv_nn_output_num_kps, gfv_nn_output_num_matrices, gfv_nn_output_matrix_width_minus1[i]

and gfv_nn_output_matrix_height_minus1[i] are not present, which can be used to set the first sub-network.

gfv_nn_output_num_kps indicates the number of keypoints output by TranslatorNN( ). The value of gfv_nn_output_num_kps can be in the range of 0 to $2^{10}$, inclusive.

gfv_nn_output_num_matrices indicates the number of matrices output by TranslatorNN( ). The value of gfv_nn_output_num_matrices can be in the range of 0 to $2^{10}$, inclusive.

gfv_nn_output_matrix_width_minus1[i] plus 1 indicates the width of the $i^{th}$ matrix output by TranslatorNN( ). The value of gfv_nn_output_matrix_width_minus1[i] can be in the range of 0 to $2^{10}-1$, inclusive.

gfv_nn_output_matrix_height_minus1[i] plus 1 indicates the height of the $i^{th}$ matrix output by TranslatorNN( ). The value of gfv_nn_output_matrix_height_minus1[i] can be in the range of 0 to $2^{10}-1$, inclusive.

The following process is used to generate a video picture:

```
DeriveSigParam( )
TranslatorNN (sigKeyPoint, sigMatrix)
DeriveInputTensors( )
if( gfv_base_pic_flag == 0 && gfv_drive_pic_fusion_flag == 0) {
    if(ChromaFormatIdc == 0 )
        GenerativeNN( inputBaseY, inputBaseKeyPoint, inputBaseMatrix, inputDriveKeyPoint,
inputDriveMatrix)
    else
        GenerativeNN( inputBaseY, inputBaseCb, inputBaseCr, inputBaseKeyPoint,
inputBaseMatrix, inputDriveKeyPoint, inputDriveMatrix)
}
else if(gfv_base_pic_flag == 0 && gfv_drive_pic_fusion_flag == 1) {
    if(ChromaFormatIdc == 0 )
        GenerativeNN( inputBaseY, inputDriveY, inputBaseKeyPoint, inputBaseMatrix,
inputDriveKeyPoint, inputDriveMatrix)
    else
        GenerativeNN( inputBaseY, inputBaseCb, inputBaseCr, inputDriveY, inputDriveCb,
inputDriveCr , inputBaseKeyPoint, inputBaseMatrix,, inputDriveKeyPoint,
inputDriveMatrix)
}
StoreOutputTensors( )
```

The process DeriveSigParam ( ) for deriving the inputs of TranslatorNN ( ) is specified as follows:

The keypoint coordinate array sigKeyPoint and the matrix sigMatrix are derived as follows:

```
if( gfv_coordinate_present_flag ) {
    for ( i=0; i< = gfv_num_kps_minus1; i++ ) {
        sigKeyPoint[ i ][ 0 ] =125oordinateX[ i ]
        sigKeyPoint[ i ][ 1 ] = coordinateY[ i ]
        if ( gfv_coordinate_z_present_flag )
            sigKeyPoint[ i ][ 2 ] = coordinateZ[ i ]
```

-continued

```
         }
      }
   else {
      for ( i=0; i< =num_kps_minus1; i++ ) {
         sigKeyPoint [ i ][ 0 ] = 0
         sigKeyPoint [ i ][ 1 ] = 0
         if ( gfv_coordinate_z_present_flag )
            sigKeyPoint [ i ][ 2 ] = 0
      }
   }
   if( gfv_matrix_present_flag ) {
      for ( i=0; i<= gfv_num_matrix_types_minus1; i++ ) {
         for ( j=0; j< numMatrices[ i ]; j++ ) {
            for( k=0; k< matrixHeight [ i ]; k++ ) {
               for ( l=0;l< matrixWidth [ i ]; l++) {
                  sigMatrix[ i ][ j ][ k ][ l ] =
                  matrixElementVal[ i ][ j][ k][ l ]
               }
            }
         }
      }
   }
   else {
      for ( i=0; i<=gfv_num_matrix_types_minus1; i++ ) {
         for ( j=0; j< numMatrices[ i ]; j++ ) {
```

-continued

```
            for( k=0; k< matrixHeight [ i ]; k++ ) {
               for ( l=0;l< matrix Width [ i ]; l++) {
                  sigMatrix [ i ][ j ][ k ][ l ] = 0
               }
            }
         }
      }
   }
```

As an example, TranslatorNN( ) is a process to translate the various formats of the facial parameters carried in the SEI message to the fixed format of the facial parameters to be input to the generative network to generate the output picture.

The input to TranslatorNN(includes sigKeyPoint and sigMatrix. And the output of TranslatorNN(includes convKeyPoint and convMatrix.

The process DeriveInputTensors( ) for deriving the inputs of GenerativeNN ( ) is specified as follows:

When gfv_base_pic_flag is equal to 1, the BasePicture input tensor inputBaseY, inputBaseCb and inputBaseCr are derived as follows:

```
for( x = 0; x< CroppedWidth; x++ ) {
   for ( y = 0; y< CroppedHeight; y++ ) {
      inputBaseY[ x ][ y ] = InpY( baseCroppedYPic[ x ][ y ] )
   }
}
if (ChromaFormatIdc !=0) {
   for( x=0; x< CroppedWidth/ SubWidthC; x++ ) {
      for ( y=0; y< CroppedHeight/ SubHeightC; y++ ) {
         inputBaseCb[ x][ y ] = InpC( baseCroppedCbPic[ x][ y ] )
         inputBaseCr[ x][ y ] = InpC( baseCroppedCrPic[ x ][ y ] )
      }
   }
}
      When gfv_drive_pic_fusion_flag is equal to 1, the DrivePicture luma sample array
inputDriveY, inputDriveCb and input DriveCr are derived as follows:
for( x = 0; x< CroppedWidth; x++ ) {
   for ( y = 0; y< CroppedHeight; y++ ) {
      inputDriveY[ x ][ y ] = InpY( driveCroppedYPic[ x ][ y ] )
   }
}
if (ChromaFormatIdc !=0) {
   for( x=0; x< CroppedWidth/ SubWidthC; x++ ) {
      for ( y=0; y< CroppedHeight/ SubHeightC; y++ ) {
         InputDriveCb[ x][ y ] = InpC( driveCroppedCbPic[ x][ y ] )
         InputDriveCr[ x][ y ] = InpC( driveCroppedCrPic[ x ][ y ] )
      }
   }
}
      When gfv_base_pic_flag is equal to 0, the keypoint coordinate array inputDriveKeyPoint
and the matrix inputDriveMatrix for the current picture are derived as follows:
   for ( i = 0; i< = gfv_nn_output_num_kps; i++ ) {
      inputDriveKeyPoint[ i ][ 0 ] = convKeyPoint[ i ][ 0 ]
      inputDriveKeyPoint [ i ][ 1 ] = convKeyPoint[ i ][ 0 ]
      inputDriveKeyPoint [ i ][ 2 ] = convKeyPoint[ i ][ 0 ]
   }
   for( i=0; i<gfv_nn_output_num_matrices; i++)
      for( k = 0; k < gfv_nn_output_matrix_height_minus1[ i ]; k++ ) {
         for ( l = 0;l < gfv_nn_output_matrix_width_minus1[ i ]; l++)
            inputDriveMatrix[ i ][ k ][ l ] = convMatrix [ i ][ k ][ l ]
   }
      When gfv_base_pic_flag is equal to 1, the keypoint coordinate array inputBaseKeyPoint
and the matrix inputBaseMatrix for the base picture are derived as follows:
   for ( i=0; i< = gfv_nn_output_num_kps; i++ ) {
      inputBaseKeyPoint[ i ][ 0 ] = convKeyPoint[ i ][ 0 ]
      inputBaseKeyPoint [ i ][ 1 ] = convKeyPoint[ i ][ 0 ]
      inputBaseKeyPoint [ i ][ 2 ] = convKeyPoint[ i ][ 0 ]
   }
   for( i=0; i<gfv_nn_output_num_matrices; i++)
      for( k = 0; k < gfv_nn_output_matrix_height_minus1[ i ]; k++ )
         for ( l = 0;l < gfv_nn_output_matrix_width_minus1[ i ]; l++)
            inputBaseMatrix[ i ][ k ][ l ] = convMatrix [ i ][ k ][ l ]
```

-continued

```
  }
}
      The functions InpY( ) and InpC( ) are specified as follows:
      InpY( x ) = x ÷ ( ( 1 << BitDepth_Y ) − 1 )
      InpC( x ) = x ÷ ( ( 1 << BitDepth_C ) − 1 )
```

In another example, when the translator outputs the fixed format of facial parameters to be input to the generative network, it also outputs the information of the fixed format of facial parameter which it outputs, such as number of key-points, the number of matrices and the size of each matrix. Thus, this information needn't be signaled in the SEI message. So, the syntax element gfv_nn_output_num_kps, gfv_nn_output_num_matrices, gfv_nn_output_matrix_width_minus1[i] and gfv_nn_output_matrix_height_minus1[i] can be skipped. In this example:

Inputs to TranslatorNN( ) are:
  sigKeyPoint and sigMatrix

Outputs of TranslatorNN( ) are:
  convKeyPoint, numConvKeyPoint
  convMatrix, numConvMatrix and array convMatrixWidth [i] and convMatrixHeight[i] (for i=0 to numConvMatrix−1 if numConvMatrix>0)

The process DeriveInputTensors( ) for deriving the inputs of GenerativeNN ( ) is specified as follows:

When gfv_base_pic_flag is equal to 0, the keypoint coordinate array inputDriveKeyPoint and the matrix inputDriveMatrix for the current picture are derived as follows:

Inputs to GenerativeNN( ) are:

When gfv_base_pic_flag is equal to 0 and gfv_drive_pic_fusion_flag is equal to 0 and ChromaFormatIdc is equal to 0: inputBaseY, inputBaseKeyPoint, inputBaseMatrix, inputDriveKeyPoint, inputDriveMatrix.

When gfv_base_pic_flag is equal to 0 and gfv_drive_pic_fusion_flag is equal to 0 and ChromaFormatIdc is not equal to 0: inputBaseY, inputBaseCb, inputBaseCr, inputBaseKeyPoint, inputBaseMatrix, inputDriveKeyPoint, inputDriveMatrix.

When gfv_base_pic_flag is equal to 0 and gfv_drive_pic_fusion_flag is equal to 1 and ChromaFormatIdc is equal to 0: inputBaseY, inputDriveY, inputBaseKeyPoint, inputBaseMatrix, inputDriveKeyPoint, inputDriveMatrix.

When gfv_base_pic_flag is equal to 0 and gfv_drive_pic_fusion_flag is equal to 1 and ChromaFormatIdc is not equal to 0: inputBaseY, inputBaseCb, inputBaseCr, inputDriveY, inputDriveCb, inputDriveCr, inputBaseKeyPoint, inputBaseMatrix, inputDriveKeyPoint, inputDriveMatrix.

```
for ( i = 0; i< = numConvKeyPoint; i++ ) {
    inputDriveKeyPoint[ i ][ 0 ] = convKeyPoint[ i ][ 0 ]
    inputDriveKeyPoint [ i ][ 1 ] = convKeyPoint[ i ][ 0 ]
    inputDriveKeyPoint [ i ][ 2 ] = convKeyPoint[ i ][ 0 ]
  }
for( i=0; i< numConvMatrix; i++)
  for( k = 0; k < convMatrixHeight[i]; k++ ) {
    for ( l = 0;l < convMatrixWidth[i]; l++)
      inputDriveMatrix[ i ][ k ][ l ] = convMatrix [ i ][ k ][ l ]
}
            When gfv_base_pic_flag is equal to 1, the keypoint coordinate array inputBaseKeyPoint
and the matrix inputBaseMatrix for the base picture are derived as follows:
-       for ( i=0; i< = numConvKeyPoint; i++ ) {
            inputBaseKeyPoint[ i ][ 0 ] = convKeyPoint[ i ][ 0 ]
            inputBaseKeyPoint [ i ][ 1 ] = convKeyPoint[ i ][ 0 ]
            inputBaseKeyPoint [ i ][ 2 ] = convKeyPoint[ i ][ 0 ]
          }
        for( i=0; i< numConvMatrix; i++)
          for( k = 0; k < convMatrixHeight[i]; k++ )
            for ( l = 0;l < convMatrixWidth[i]; l++)
              inputBaseMatrix[ i ][ k ][ l ] = convMatrix [ i ][ k ][ l ]
          }
      }
```

GenerativeNN ( ) is a process to generate the sample values of an output picture corresponding to a driving picture. It is only invoked when gfc_base_pic_flag is equal to 0. Input value to GenerativeNN( ) and output values from GenerativeNN( ) is real numbers.

Outputs of GenerativeNN( ) are:
  A luma sample array genY
  When ChromaFormatIdc is not equal to 0, two chroma sample arrays genCb and genCr.
  The process StoreOutputTensors( ) for deriving the output is specified as follows:

```
            when gfv_base_pic_flag is equal to 0, the output sample array outYPic[ x ][ y ],
outCbPic[ x ][ y ], and outCrPic[ x ][ y ] are derived as follows:
        for(x=0; x< Cropped Width; x++){
          for(y=0; y< CroppedHeight; y++){
            outputYPic[ x ][ y ] = OutY( genY[ x ][ y ] )
          }
        }
```

-continued

```
if(ChromaFormatIdc != 0) {
    for(x=0; x< CroppedWidth/ SubWidthC; x++){
        for(y=0; y< CroppedHeight/ SubHeightC; y++){
            outputCbPic[ x ][ y ] = OutC( genCb[ x ][ y ] )
            outputCrPic[ x][ y ] = OutC( genCr[ x ][ y ] )
        }
    }
}
when gfv__base__pic__flag is equal to 1, the output sample array outYPic[ x ][ y ],
outCbPic[ x ][ y ], and outCrPic[ x ][ y ] are derived as follows:
    for(x=0; x< CroppedWidth; x++){
        for(y=0; y< CroppedHeight; y++){
            outputYPic[ x ][ y ] = baseCroppedYPic [ x ][ y ]
        }
    }
if(ChromaFormatIdc != 0) {
  for(x=0; x< CroppedWidth/ SubWidthC; x++){
    for(y=0; y< CroppedHeight/ SubHeightC; y++){
        outputCbPic[ x ][ y ] = baseCroppedCbPic [ x ][ y ]
        outputCrPic[ x ][ y ] = baseCroppedCbPic [ x ][ y ]
    }
  }
}
```

The functions OutY( ) and OutC( ) are specified as follows:
OutY( x ) = Clip3( 0, ( 1 << BitDepth$_Y$ ) − 1 , x * ( ( 1 << BitDepth$_Y$ ) − 1 )
OutC( x ) = Clip3( 0, ( 1 << BitDepth$_C$ ) − 1 , x * ( ( 1 << BitDepth$_C$ ) − 1 )

The syntax of a generative face video SEI message shown in Table 12 can be encoded and signaled in a bitstream, and can be further decoded by the decoder. FIG. 12 is a schematic diagram illustrating an exemplary SEI message 1200, according to some embodiments of the present disclosure. As shown in FIG. 12, SEI message 1200 may include, when used to convey the configuration of a neural network, an identifying number indicator (gfv_id) 1201, a base picture indicator (e.g., gfv_base_pic_flag) 1202 indicating that SEI message 1200 is associated with a base picture, a neural present indicator (e.g., gfv_nn_present_flag) 1203 indicating information of the first sub-network is indicated by SEI message 1200, neural network indicators (e.g., gfv_nn_mode_idc 1204 and gfv_nn_mode_idc 1205), etc.

In some embodiments, SEI message 1100 may include, when used to convey the face information parameter, an identifying number indicator (gfv_id) 1201, a base picture indicator (e.g., gfv_base_pic_flag) 1202 indicating that SEI message 1200 is not associated with a base picture, a neural present indicator (e.g., gfv_nn_present_flag) 1203 indicating information of the first sub-network is not indicated by SEI message 1200, gfv_drive_pic_fusion_flag 1206, a coordinate indicator (coordinate_present_flag) 1207, a matrix indicator (matrix_present_flag) 1208, etc. Coordinate indicator 1207 and matrix indicator 1208 are collaboratively signaled. That is, in a proper SEI message 1200, only one of coordinate indicator 1207 and matrix indicator 1208 can be activated. Moreover, parameter indicator 1209 can be generated and signaled in line the activated mode. The corresponding bit length of these parameters are also shown in FIG. 12 as an example. As appreciated, the bit length of these parameters can be otherwise designed. The other parameters are not shown in FIG. 12 to avoid causing any ambiguity.

Figure 13:
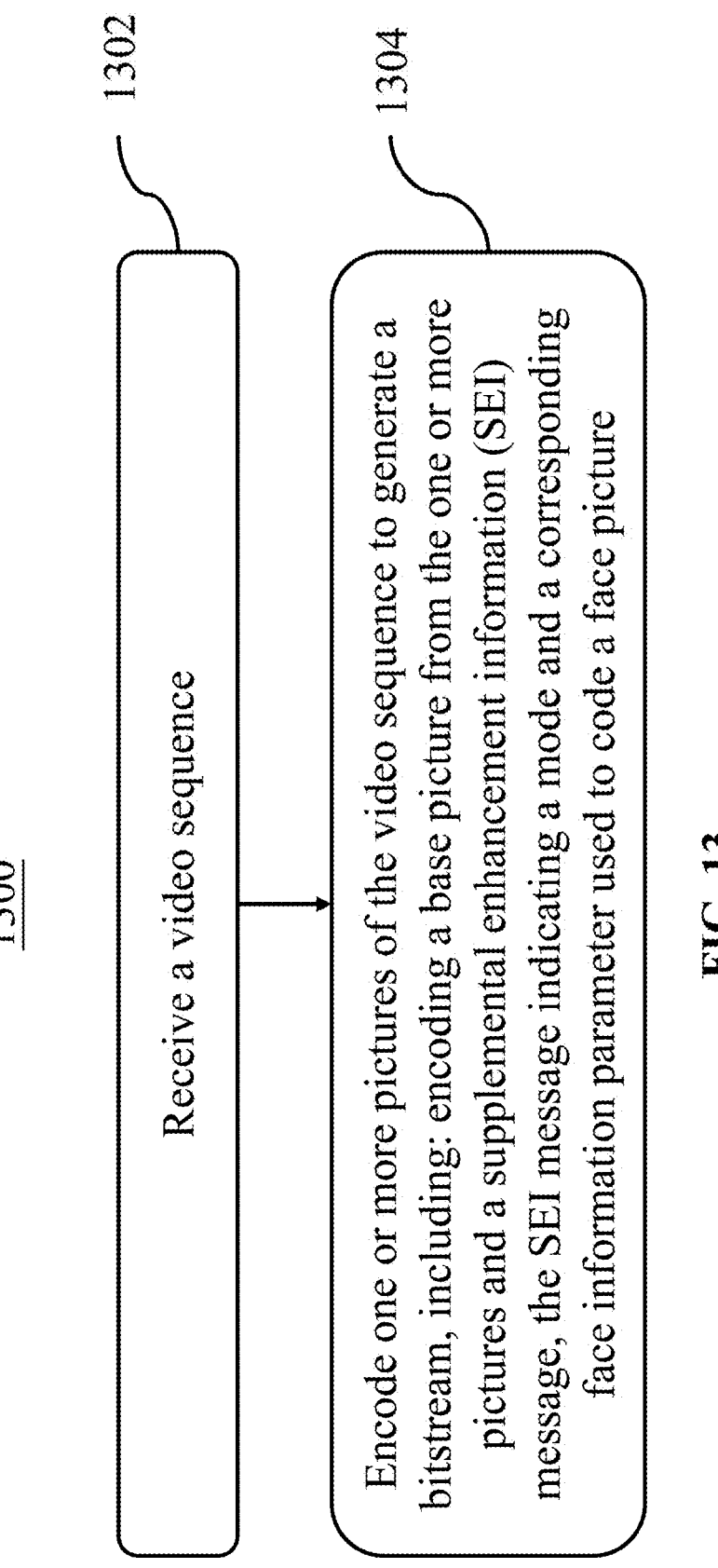
FIG. 13 is a flowchart of an exemplary method for encoding a video sequence into a bitstream, according to some embodiments of the present disclosure.

In some embodiments, a method of encoding a video sequence into a bitstream is also provided. FIG. 13 is a flowchart of an exemplary method 1300 for encoding a video sequence into a bitstream, according to some embodiments of the present disclosure. As shown in FIG. 13, method 1300 may include steps 1302 and 1304, which can be implemented by an encoder (e.g., image/video encoder 124 in FIG. 1 or apparatus 400 in FIG. 4).

In step 1302, the encoder receives a video sequence.

In step 1304, the encoder may encode one or more pictures of the video sequence to generate a bitstream. The encoder may encode a base picture from the one or more pictures and a supplemental enhancement information (SEI) message. The SEI message is used for indicating a mode and a corresponding face information parameter used to code a face picture.

The bitstream is used for generating the face picture by a neural network at a decoder (e.g., image/video decoder 144 in FIG. 1 or apparatus 400 in FIG. 4) based on the base picture and the face information parameter.

As can be appreciated, the SEI message can be encoded according to the description with respect to FIGS. 8-12 and the specification illustrated above in the form of tables.

In some embodiments, a non-transitory computer-readable storage medium storing a bitstream is also provided. The bitstream can be encoded and decoded according to the above-described generative face video supplemental enhancement information (SEI) messages (e.g., FIGS. 8 to 12).

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method for generating a face picture, including:

receiving a bitstream;

decoding coded information of the bitstream to obtain a base picture and a supplemental enhancement information (SEI) message;

determining whether the SEI message applies to a neural network for generating a face picture;

in response to the SEI message applying to the neural network for generating the face picture, determining a mode used to code the face picture and a corresponding face information parameter based on the SEI message; and generating, using the neural network, the face picture based on the base picture and the face information parameter.

2. The method according to clause 1, wherein the SEI message includes an identifying number indicator for indicating whether the SEI message is used to code the face picture; and determining whether the SEI message applies to the neural network for generating the face picture includes: determining, based on the identifying number indicator, whether the SEI message is used to code the face picture.

3. The method according to clause 2, wherein the identifying number indicator indicates a generative face video filter.

4. The method according to any of clauses 1 to 3, wherein the SEI message includes a mode indicator, and wherein determining the mode used to code the face picture includes: determining the mode based on the mode indicator.

5. The method according to clause 4, wherein the SEI message further includes a parameter indicator corresponding to the mode indicator, and the face information parameter is determined based on the parameter indicator.

6. The method according to clause 4, wherein the mode indicator indicates at least one of the following as the mode: 2D facial landmarks, 2D keypoints, consistent regions, 3D keypoints, compact features, or facial semantics.

7. The method according to clause 4, wherein the mode indicator includes at least one of a coordinate indicator for indicating whether the SEI message carries coordinate parameters for coding the face picture, a matrix indicator for indicating whether the SEI message carries matrix parameters for coding the face picture, or a semantic indicator for indicating whether the SEI message carries semantic parameters for coding the face picture.

8. The method according to clause 7, wherein the SEI message further includes a parameter indicator for conveying the coordinate parameters, in response to the coordinate indicator indicating that the SEI message carries coordinate parameters; and wherein the coordinate parameters are determined as the face information parameters based on the parameter indicator.

9. The method according to clause 7, wherein the SEI message further includes a parameter indicator for conveying the matrix parameters, in response to the matrix indicator indicates that the SEI message carries matrix parameters; and wherein the matrix parameters are determined as the face information parameters based on the parameter indicator.

10. The method according to clause 7, wherein the SEI message further includes a parameter indicator for conveying the semantic parameters, in response to the semantic indicator indicates that the SEI message carries semantic parameters; and wherein the semantic parameters are determined as the face information parameters based on the parameter indicator.

11. The method according to clause 7, wherein the coordinate parameters include at least one of a facial representation of 2D facial landmarks, a facial representation of 2D keypoints, a facial representation of consistent regions, or a facial representation of 3D keypoints.

12. The method according to clause 7, wherein the matrix parameters include at least one of affine translation matrix, covariance matrix, translation matrix, rotation matrix or compact feature matrix.

13. The method according to clause 7, wherein the semantic parameters include at least one of semantic description of a mouth, semantic description of an eye; or semantic description of a head.

14. The method according to clause 7, wherein the matrix parameters include at least one of affine translation matrix, covariance matrix, compact feature matrix, or semantic matrix.

15. The method according to clause 14, wherein the semantic matrix include at least one of mouth matrix, eye matrix, head rotation matrix, head translation matrix, or head location matrix, 16. The method according to any of clauses 1 to 15, wherein the SEI message includes a key indicator for identifying a target neural network used to generate the face information parameter; and wherein determining whether the SEI message applies to the neural network for generating the face picture includes:

determining whether the neural network matches with the target neural network based on the key indicator.

17. The method according to any of clauses 1 to 16, wherein the SEI message includes an order indicator for indicating a displaying order of the face picture, the method further including: displaying the face picture according to the displaying order.

18. The method according to any of clauses 1 to 17, wherein the neural network includes a first sub-network and a second sub-network; and wherein generating the face picture based on the base picture and the face information parameter by the neural network includes:

translating the face information parameter into a predetermined format of parameter by the first sub-network; and generating the face picture based on the predetermined format of parameter and the base picture by the second sub-network.

19. The method according to clause 18, wherein the predetermined format is a flow map.

20. The method according to clause 18, wherein the SEI message includes a key present indicator for indicating a presence of a key indicator; and wherein determining whether the SEI message applies to the neural network for generating the face picture includes:

obtaining the key indicator for identifying a target neural network used to generate the face information parameter from the SEI message, in response to the key present indicator indicates the presence of the key indicator; and determining whether the neural network matches with the target neural network based on the key indicator.

21. The method according to clause 20, wherein the SEI message further includes a neural network indicator for indicating the target neural network; and wherein the method further includes:

setting the neural network based on the neural network indicator in response to the key present indicator indicating the absence of the key indicator.

22. The method according to clause 21, the neural network indicator includes at least one of a neural network mode indicator for indicating a format of the target neural network or a neural network type indicator for indicating a type of the target neural network.

23. The method according to clause 18, wherein the predetermined format of parameter includes at least one of:

a predetermined number of keypoints used for describing a face feature;

a predetermined number of matrices used for describing the face feature; or a predetermined size of a matrix used for describing the face feature.

24. The method according to clause 18, wherein translating the face information parameter into the predetermined format of parameter by the first sub-network includes:

decoding a syntax element indicating a difference between the predetermined format of parameter and a format of parameter associated with the base picture; and determining the predetermined format of parameter based on the difference and the format of parameter associated with the base picture.

25. The method according to clause 18, wherein the SEI message includes a base picture indicator for indicating whether the SEI message is associated with a base picture and a neural network present indicator for indicating whether information of the first sub-network is indicated by the SEI message; and wherein the method further includes:

setting the first sub-network based on the neural network indicator in response to the base picture indicator indicates the SEI message is associated with a base picture and the neural network present indicator indicates the information of the first sub-network is indicated by the SEI message.

26. A method of encoding a video sequence into a bitstream, including:

receiving a video sequence; and encoding one or more pictures of the video sequence to generate a bitstream, including:

encoding a base picture from the one or more pictures and a supplemental enhancement information (SEI) message, the SEI message indicating a mode and a corresponding face information parameter used to code a face picture, and wherein the bitstream is used for generating the face picture by a neural network based on the base picture and the face information parameter.

27. The method according to clause 26, wherein the SEI message includes an identifying number indicator for indicating whether the SEI message is used to code the face picture.

28. The method according to clause 27, wherein the identifying number indicator indicates a generative face video filter.

29. The method according to any of clauses 26 to 28, wherein the SEI message includes a mode indicator for indicating the mode used to code the face picture.

30. The method according to clause 29, wherein the SEI message further includes a parameter indicator corresponding to the mode indicator for conveying the face information parameter.

31. The method according to clause 30, wherein the mode indicator indicates at least one of the following as the mode: 2D facial landmarks, 2D keypoints, consistent regions, 3D keypoints, compact features, or facial semantics.

32. The method according to clause 29, wherein the mode indicator includes at least one of a coordinate indicator for indicating whether the SEI message carries coordinate parameters for coding the face picture, a matrix indicator for indicating whether the SEI message carries matrix parameters for coding the face picture, or a semantic indicator for indicating whether the SEI message carries semantic parameters for coding the face picture.

33. The method according to clause 32, wherein the SEI message further includes a parameter indicator for conveying the coordinate parameters, in response to the coordinate indicator indicates that the SEI message carries coordinate parameters.

34. The method according to clause 32, wherein the SEI message further includes a parameter indicator for conveying the matrix parameters, in response to the matrix indicator indicates that the SEI message carries matrix parameters.

35. The method according to clause 32, wherein the SEI message further includes a parameter indicator for conveying the semantic parameters, in response to the semantic indicator indicates that the SEI message carries semantic parameters.

36. The method according to clause 32, wherein the coordinate parameters include at least one of a facial representation of 2D facial landmarks, a facial representation of 2D keypoints, a facial representation of consistent regions, or a facial representation of 3D keypoints.

37. The method according to clause 32, wherein the matrix parameters include at least one of affine translation matrix, covariance matrix, translation matrix, rotation matrix or compact feature matrix.

38. The method according to clause 32, wherein the semantic parameters include at least one of semantic description of a mouth, semantic description of an eye; or semantic description of a head.

39. The method according to clause 32, wherein the matrix parameters include at least one of affine translation matrix, covariance matrix, compact feature matrix, or semantic matrix.

40. The method according to clause 39, wherein the semantic matrix include at least one of mouth matrix, eye matrix, head rotation matrix, head translation matrix, or head location matrix.

41. The method according to any of clauses 26 to 40, wherein the SEI message includes a key indicator for identifying the neural network.

42. The method according to any of clauses 26 to 41, wherein the SEI message includes an order indicator for indicating a displaying order of the face picture.

43. The method according to any of clauses 26 to 42, wherein the neural network includes:

a first sub-network configured to translate the face information parameter into a predetermined format of parameter; and a second sub-network configured to generate the face picture based on the predetermined format of parameter and the base picture.

44. The method according to clause 43, wherein the predetermined format is a flow map.

45. The method according to clause 43, wherein the SEI message includes a key present indicator for indicating a presence of a key indicator, and wherein the SEI message further includes the key indicator for identifying the neural network, in response to the key present indicator indicates the presence of the key indicator.

46. The method according to clause 45, wherein the SEI message further includes a neural network indicator for indicating the neural network, in response to the key present indicator indicates the absence of the key indicator, and wherein the neural network indicator is used for setting a neural network for decoding the bitstream.

47. The method according to clause 46, the neural network indicator includes at least one of a neural network mode indicator for indicating a format of the neural network or a neural network type indicator for indicating a type of the neural network.

48. The method according to clause 43, wherein the predetermined format of parameter includes at least one of:

a predetermined number of keypoints used for describing a face feature;

a predetermined number of matrices used for describing the face feature; or a predetermined size of a matrix used for describing the face feature.

49. The method according to clause 43, wherein the SEI message includes a syntax element indicating a difference between the predetermined format of parameter and a format of parameter associated with the base picture.

50. The method according to clause 43, wherein the SEI message includes a base picture indicator for indicating whether the SEI message is associated with a base picture, and the SEI message further includes a neural network present indicator for indicating whether information of the first sub-network is indicated by the SEI message, in response to the base picture indicator indicates that the SEI message is associated with a base picture.

51. The method according to clause 43, wherein the SEI message further includes a neural network indicator for indicating the neural network, in response to neural network present indicator indicates that the information of the first sub-network is indicated by the SEI message, and wherein the neural network indicator is used for setting a neural network for decoding the bitstream.

52. A non-transitory computer readable storage medium storing a bitstream of a video, the bitstream including:

a base picture and a supplemental enhancement information (SEI) message, the SEI message indicating a mode and a corresponding face information parameter used to code a face picture, and wherein the bitstream is used for generating the face picture by a neural network based on the base picture and the face information parameter.

53. The non-transitory computer readable storage medium according to clause 52, wherein the SEI message includes an identifying number indicator for indicating whether the SEI message is used to code the face picture.

54. The non-transitory computer readable storage medium according to clause 53, wherein the identifying number indicator indicates a generative face video filter.

55. The non-transitory computer readable storage medium according to clause 54, wherein the SEI message includes a mode indicator for indicating a mode used to code the face picture.

56. The non-transitory computer readable storage medium according to clause 55, wherein the SEI message further includes a parameter indicator corresponding to the mode indicator for conveying the face information parameter.

57. The non-transitory computer readable storage medium according to clause 56, wherein the mode indicator indicates at least one of the following as the mode: 2D facial landmarks, 2D keypoints, consistent regions, 3D keypoints, compact features, or facial semantics.

58. The non-transitory computer readable storage medium according to clause 55, wherein the mode indicator includes at least one of a coordinate indicator for indicating whether the SEI message carries coordinate parameters for coding the face picture, a matrix indicator for indicating whether the SEI message carries matrix parameters for coding the face picture, or a semantic indicator for indicating whether the SEI message carries semantic parameters for coding the face picture.

59. The non-transitory computer readable storage medium according to clause 58, wherein the SEI message further includes a parameter indicator for conveying the coordinate parameters, in response to the coordinate indicator indicates that the SEI message carries coordinate parameters.

60. The non-transitory computer readable storage medium according to clause 58, wherein the SEI message further includes a parameter indicator for conveying the matrix parameters, in response to the matrix indicator indicates that the SEI message carries matrix parameters.

61. The non-transitory computer readable storage medium according to clause 58, wherein the SEI message further includes a parameter indicator for conveying the semantic parameters, in response to the semantic indicator indicates that the SEI message carries semantic parameters.

62. The non-transitory computer readable storage medium according to clause 58, wherein the coordinate parameters include at least one of a facial representation of 2D facial landmarks, a facial representation of 2D keypoints, a facial representation of consistent regions, or a facial representation of 3D keypoints.

63. The non-transitory computer readable storage medium according to clause 58, wherein the matrix parameters include at least one of affine translation matrix, covariance matrix, translation matrix, rotation matrix or compact feature matrix.

64. The non-transitory computer readable storage medium according to clause 58, wherein the semantic parameters include at least one of semantic description of a mouth, semantic description of an eye; or semantic description of a head.

65. The non-transitory computer readable storage medium according to clause 58, wherein the matrix parameters include at least one of affine translation matrix, covariance matrix, compact feature matrix, or semantic matrix.

66. The non-transitory computer readable storage medium according to clause 65, wherein the semantic matrix include at least one of mouth matrix, eye matrix, head rotation matrix, head translation matrix, or head location matrix, 67. The non-transitory computer readable storage medium according to any of clauses 52 to 66, wherein the SEI message includes a key indicator for identifying the neural network.

68. The non-transitory computer readable storage medium according to any of clauses 52 to 67, wherein the SEI message includes an order indicator for indicating a displaying order of the face picture.

69. The non-transitory computer readable storage medium according to any of clauses 52 to 68, wherein the neural network includes:

a first sub-network configured to translate the face information parameter into a predetermined format of parameter; and a second sub-network configured to generate the face picture based on the predetermined format of parameter and the base picture.

70. The non-transitory computer readable storage medium according to clause 69, wherein the predetermined format is a flow map.

71. The non-transitory computer readable storage medium according to clause 69, wherein the SEI message includes a key present indicator for indicating a presence of a key indicator, and wherein the SEI message further includes the key indicator for identifying the neural network, in response to the key present indicator indicates the presence of the key indicator.

72. The non-transitory computer readable storage medium according to clause 71, wherein the SEI message further includes a neural network indicator for indicating the neural network, in response to the key present indicator indicates the absence of the key indicator, and wherein the neural network indicator is used for setting a neural network for decoding the bitstream.

73. The non-transitory computer readable storage medium according to clause 72, the neural network indicator includes at least one of a neural network mode indicator for indicating a format of the neural network or a neural network type indicator for indicating a type of the neural network.

74. The non-transitory computer readable storage medium according to clause 69, wherein the predetermined format of parameter includes at least one of:

a predetermined number of keypoints used for describing a face feature;

a predetermined number of matrices used for describing the face feature; or a predetermined size of a matrix used for describing the face feature.

75. The non-transitory computer readable storage medium according to clause 69, wherein the SEI message includes a syntax element indicating a difference between the predetermined format of parameter and a format of parameter associated with the base picture.

76. The non-transitory computer readable storage medium according to clause 69, wherein the SEI message includes a base picture indicator for indicating whether the SEI message is associated with a base picture, and the SEI message further includes a neural network present indicator for indicating whether information of the first sub-network is indicated by the SEI message, in response to the base picture indicator indicates that the SEI message is associated with a base picture.

77. The non-transitory computer readable storage medium according to clause 69, wherein the SEI message further includes a neural network indicator for indicating the neural network, in response to neural network present indicator indicates that the information of the first sub-network is indicated by the SEI message, and wherein the neural network indicator is used for setting a neural network for decoding the bitstream.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor, can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for generating a face picture, comprising:
receiving a bitstream;
decoding coded information of the bitstream to obtain a base picture and a supplemental enhancement information (SEI) message;
determining whether the SEI message applies to a neural network for generating a face picture;
in response to the SEI message applying to the neural network for generating the face picture, determining a mode used to code the face picture and a corresponding face information parameter based on the SEI message; and
generating, using the neural network, the face picture based on the base picture and the face information parameter.

2. The method according to claim 1, wherein the SEI message comprises an identifying number indicator for indicating whether the SEI message is used to code the face picture; and
determining whether the SEI message applies to the neural network for generating the face picture comprises: determining, based on the identifying number indicator, whether the SEI message is used to code the face picture.

3. The method according to claim 2, wherein the identifying number indicator indicates a generative face video filter.

4. The method according to claim 1, wherein the SEI message comprises a mode indicator, and
wherein determining the mode used to code the face picture comprises: determining the mode based on the mode indicator.

5. The method according to claim 4, wherein the SEI message further comprises a parameter indicator corresponding to the mode indicator, and the face information parameter is determined based on the parameter indicator.

6. The method according to claim 4, wherein the mode indicator indicates at least one of the following as the mode: 2D facial landmarks, 2D keypoints, consistent regions, 3D keypoints, compact features, or facial semantics.

7. The method according to claim 4, wherein the mode indicator comprises at least one of a coordinate indicator for indicating whether the SEI message carries coordinate parameters for coding the face picture, a matrix indicator for indicating whether the SEI message carries matrix parameters for coding the face picture, or a semantic indicator for indicating whether the SEI message carries semantic parameters for coding the face picture.

8. The method according to claim 7, wherein the SEI message further comprises a parameter indicator for conveying the coordinate parameters, in response to the coordinate indicator indicates that the SEI message carries coordinate parameters; and
wherein the coordinate parameters are determined as the face information parameters based on the parameter indicator.

9. The method according to claim 7, wherein the SEI message further comprises a parameter indicator for conveying the matrix parameters, in response to the matrix indicator indicating that the SEI message carries matrix parameters; and
wherein the matrix parameters are determined as the face information parameters based on the parameter indicator.

10. A method of encoding a video sequence into a bitstream, comprising:
receiving a video sequence; and
encoding one or more pictures of the video sequence to generate a bitstream, comprising:
encoding a base picture from the one or more pictures and a supplemental enhancement information (SEI) message, the SEI message indicating a mode and a corresponding face information parameter used to code a face picture, and
wherein the bitstream is used for generating the face picture by a neural network based on the base picture and the face information parameter.

11. The method according to claim 10, wherein the SEI message comprises an identifying number indicator for indicating whether the SEI message is used to code the face picture.

12. The method according to claim 11, wherein the identifying number indicator indicates a generative face video filter.

13. The method according to claim 10, wherein the SEI message comprises a mode indicator for indicating the mode used to code the face picture.

14. The method according to claim 13, wherein the SEI message further comprises a parameter indicator corresponding to the mode indicator for conveying the face information parameter.

15. The method according to claim 14, wherein the mode indicator indicates at least one of the following as the mode: 2D facial landmarks, 2D keypoints, consistent regions, 3D keypoints, compact features, or facial semantics.

16. The method according to claim 13, wherein the mode indicator comprises at least one of a coordinate indicator for indicating whether the SEI message carries coordinate parameters for coding the face picture, a matrix indicator for indicating whether the SEI message carries matrix parameters for coding the face picture, or a semantic indicator for indicating whether the SEI message carries semantic parameters for coding the face picture.

17. The method according to claim 16, wherein the SEI message further comprises a parameter indicator for conveying the coordinate parameters, in response to the coordinate indicator indicates that the SEI message carries coordinate parameters.

18. The method according to claim 16, wherein the SEI message further comprises a parameter indicator for conveying the matrix parameters, in response to the matrix indicator indicates that the SEI message carries matrix parameters.

19. A non-transitory computer readable storage medium storing a bitstream of a video, the bitstream comprising:
a base picture and a supplemental enhancement information (SEI) message, the SEI message indicating a mode and a corresponding face information parameter used to code a face picture, and
wherein the bitstream is used for generating the face picture by a neural network based on the base picture and the face information parameter.

20. The non-transitory computer readable storage medium according to claim 19, wherein the SEI message comprises an identifying number indicator for indicating whether the SEI message is used to code the face picture.

\* \* \* \* \*